(12) United States Patent
Mendez et al.

(10) Patent No.: US 8,745,167 B2
(45) Date of Patent: Jun. 3, 2014

(54) SYSTEM AND METHOD FOR GLOBALLY AND SECURELY ACCESSING UNIFIED INFORMATION IN A COMPUTER NETWORK

(75) Inventors: Daniel J. Mendez, Menlo Park, CA (US); Mark D. Riggins, Mercer Island, WA (US); Prasad Wagle, Santa Clara, CA (US); Hong Q. Bui, Cupertino, CA (US); Mason Ng, Mountain View, CA (US); Sean Michael Quinlan, San Francisco, CA (US); Christine C. Ying, Foster City, CA (US); Christopher R. Zuleeg, San Jose, CA (US); David J. Cowan, Menlo Park, CA (US); Joanna A. Aptekar-Strober, Menlo Park, CA (US); R. Stanley Bailes, San Jose, CA (US)

(73) Assignee: Good Technology Corporation, Dover, DE (US)

( * ) Notice: Subject to any disclaimer, the term of this patent is extended or adjusted under 35 U.S.C. 154(b) by 0 days.

(21) Appl. No.: 12/480,500

(22) Filed: Jun. 8, 2009

(65) Prior Publication Data

US 2009/0307362 A1      Dec. 10, 2009

Related U.S. Application Data

(63) Continuation of application No. 11/340,083, filed on Jan. 25, 2006, now abandoned, which is a continuation of application No. 10/741,113, filed on Dec. 19, 2003, now Pat. No. 7,039,679, which is a continuation of application No. 09/666,877, filed on Sep. 20, 2000, now Pat. No. 6,708,221, which is a continuation of application No. 08/903,118, filed on Jul. 30, 1997, now abandoned, which is a continuation-in-part of application No. 08/865,075, filed on May 29, 1997, now Pat. No. 6,023,708, which is a continuation-in-part of application No. 08/835,997, filed on Apr. 11, 1997, now Pat. No. 6,085,192, which is a continuation-in-part of application No. 08/841,950, filed on Apr. 8, 1997, now Pat. No. 7,287,271, which is a continuation-in-part of application No. 08/766,307, filed on Dec. 13, 1996, now Pat. No. 6,131,116.

(51) Int. Cl.
*G06F 15/16* (2006.01)

(52) U.S. Cl.
USPC ............................ 709/219; 709/203; 709/229

(58) Field of Classification Search
USPC ........................................................ 709/248
See application file for complete search history.

(56) References Cited

U.S. PATENT DOCUMENTS

| | | |
|---|---|---|
| 2,292,387 A | 8/1942 | Markey et al. |
| 4,106,060 A | 8/1978 | Chapman, Jr. |
| 4,417,349 A | 11/1983 | Hills et al. |
| 4,438,433 A | 3/1984 | Smoot et al. |
| 4,532,588 A | 7/1985 | Foster |
| 4,558,413 A | 12/1985 | Schmidt et al. |
| 4,558,454 A | 12/1985 | Hills et al. |
| 4,644,351 A | 2/1987 | Zabarsky et al. |
| 4,652,698 A | 3/1987 | Hale et al. |
| 4,665,519 A | 5/1987 | Kirchner et al. |
| 4,695,880 A | 9/1987 | Johnson et al. |
| 4,697,281 A | 9/1987 | O'Sullivan |
| 4,698,839 A | 10/1987 | DeVaney et al. |
| 4,713,780 A | 12/1987 | Schultz et al. |
| 4,714,995 A | 12/1987 | Materna et al. |
| 4,714,996 A | 12/1987 | Gladney et al. |
| 4,768,087 A | 8/1988 | Taub et al. |
| 4,821,308 A | 4/1989 | Hashimoto |
| 4,825,456 A | 4/1989 | Rosenberg |
| 4,831,582 A | 5/1989 | Miller et al. |
| 4,837,797 A | 6/1989 | Freeny, Jr. |
| 4,837,798 A | 6/1989 | Cohen et al. |
| 4,837,800 A | 6/1989 | Freeburg et al. |
| 4,837,811 A | 6/1989 | Butler et al. |
| 4,845,658 A | 7/1989 | Gifford |
| 4,853,843 A | 8/1989 | Ecklund |
| 4,856,047 A | 8/1989 | Saunders |
| 4,875,039 A | 10/1989 | Andros et al. |
| 4,875,159 A | 10/1989 | Cary et al. |

| Patent No. | Date | Inventor(s) |
|---|---|---|
| 4,882,674 A | 11/1989 | Quint et al. |
| 4,882,744 A | 11/1989 | Hashimoto |
| 4,882,752 A | 11/1989 | Lindman et al. |
| 4,897,781 A | 1/1990 | Chang et al. |
| 4,916,738 A | 4/1990 | Chandra et al. |
| 4,928,096 A | 5/1990 | Leonardo et al. |
| 4,942,598 A | 7/1990 | Davis |
| 4,951,044 A | 8/1990 | Nelson et al. |
| 4,961,216 A | 10/1990 | Baehr et al. |
| 4,972,457 A | 11/1990 | O'Sullivan |
| 4,980,907 A | 12/1990 | Raith et al. |
| 5,008,814 A | 4/1991 | Mathur |
| 5,008,926 A | 4/1991 | Misholi |
| 5,032,979 A | 7/1991 | Hecht et al. |
| 5,043,721 A | 8/1991 | May |
| 5,048,085 A | 9/1991 | Abraham et al. |
| 5,068,916 A | 11/1991 | Harrison et al. |
| 5,086,502 A | 2/1992 | Malcolm |
| 5,113,041 A | 5/1992 | Blonder et al. |
| 5,125,021 A | 6/1992 | Lebowitz |
| 5,127,041 A | 6/1992 | O'Sullivan |
| 5,128,981 A | 7/1992 | Tsukamoto et al. |
| 5,130,993 A | 7/1992 | Gutman et al. |
| 5,136,291 A | 8/1992 | Teague |
| 5,148,479 A | 9/1992 | Bird et al. |
| 5,150,407 A | 9/1992 | Chan |
| 5,155,847 A | 10/1992 | Kirouac et al. |
| 5,157,660 A | 10/1992 | Kuwahara et al. |
| 5,159,592 A | 10/1992 | Perkins |
| 5,166,931 A | 11/1992 | Riddle |
| 5,177,680 A | 1/1993 | Tsukino et al. |
| 5,181,200 A | 1/1993 | Harrison |
| 5,220,501 A | 6/1993 | Lawlor |
| 5,220,603 A | 6/1993 | Parker |
| 5,237,614 A | 8/1993 | Weiss |
| 5,263,157 A | 11/1993 | Janis |
| 5,263,165 A | 11/1993 | Janis |
| 5,265,033 A | 11/1993 | Vajk et al. |
| 5,265,159 A | 11/1993 | Kung |
| 5,274,806 A | 12/1993 | Hill |
| 5,283,887 A | 2/1994 | Zachery |
| 5,293,250 A | 3/1994 | Okumura et al. |
| 5,299,255 A | 3/1994 | Iwaki et al. |
| 5,307,059 A | 4/1994 | Connary et al. |
| 5,313,582 A | 5/1994 | Hendel et al. |
| 5,315,635 A | 5/1994 | Kane et al. |
| 5,317,729 A | 5/1994 | Mukherjee et al. |
| 5,333,152 A | 7/1994 | Wilber |
| 5,333,266 A | 7/1994 | Boaz et al. |
| 5,377,354 A | 12/1994 | Scannell et al. |
| 5,386,564 A | 1/1995 | Shearer et al. |
| 5,388,255 A | 2/1995 | Pytlik |
| 5,392,390 A | 2/1995 | Crozier |
| 5,404,508 A | 4/1995 | Konrad et al. |
| 5,406,557 A | 4/1995 | Baudoin |
| 5,410,543 A | 4/1995 | Seitz et al. |
| 5,416,473 A | 5/1995 | Dulaney, III et al. |
| 5,416,842 A | 5/1995 | Aziz |
| 5,420,927 A | 5/1995 | Micali |
| 5,424,724 A | 6/1995 | Williams et al. |
| 5,425,102 A | 6/1995 | Moy |
| 5,432,999 A | 7/1995 | Capps et al. |
| 5,434,918 A | 7/1995 | Kung et al. |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,440,730 A | 8/1995 | Elmasri et al. |
| 5,446,888 A | 8/1995 | Pyne |
| 5,452,356 A | 9/1995 | Albert |
| 5,452,448 A | 9/1995 | Sakuraba et al. |
| 5,452,450 A | 9/1995 | Delory |
| 5,479,472 A | 12/1995 | Campana, Jr. et al. |
| 5,481,700 A | 1/1996 | Thuraisingham |
| 5,483,596 A | 1/1996 | Rosenow et al. |
| 5,485,370 A | 1/1996 | Moss et al. |
| 5,487,100 A | 1/1996 | Kane |
| 5,491,752 A | 2/1996 | Kaufman et al. |
| 5,493,692 A | 2/1996 | Theimer et al. |
| 5,495,484 A | 2/1996 | Self et al. |
| 5,495,533 A | 2/1996 | Linehan et al. |
| 5,495,610 A | 2/1996 | Shing et al. |
| 5,510,777 A | 4/1996 | Pilc et al. |
| 5,519,606 A | 5/1996 | Frid-Nielsen et al. |
| 5,533,019 A | 7/1996 | Jayapalan |
| 5,537,097 A | 7/1996 | Eriksson et al. |
| 5,544,320 A | 8/1996 | Konrad |
| 5,544,322 A | 8/1996 | Cheng et al. |
| 5,557,724 A * | 9/1996 | Sampat et al. .................. 725/43 |
| 5,560,005 A | 9/1996 | Hoover et al. |
| 5,561,795 A | 10/1996 | Sarkar |
| 5,561,797 A | 10/1996 | Gilles et al. |
| 5,572,528 A | 11/1996 | Shuen |
| 5,572,643 A | 11/1996 | Judson |
| 5,579,472 A | 11/1996 | Keyworth, II et al. |
| 5,581,749 A | 12/1996 | Hossain et al. |
| 5,588,132 A | 12/1996 | Cardoza |
| 5,590,274 A | 12/1996 | Skarpelos et al. |
| 5,590,403 A | 12/1996 | Cameron et al. |
| 5,596,318 A | 1/1997 | Mitchell |
| 5,598,536 A | 1/1997 | Slaughter, III et al. |
| 5,600,834 A | 2/1997 | Howard |
| 5,603,054 A | 2/1997 | Theimer et al. |
| 5,604,491 A | 2/1997 | Coonley et al. |
| 5,604,788 A | 2/1997 | Tett |
| 5,613,012 A | 3/1997 | Hoffman et al. |
| 5,613,108 A | 3/1997 | Morikawa |
| 5,623,601 A | 4/1997 | Vu |
| 5,625,670 A | 4/1997 | Campana, Jr. et al. |
| 5,627,658 A | 5/1997 | Connors et al. |
| 5,627,829 A | 5/1997 | Gleeson et al. |
| 5,627,997 A | 5/1997 | Bray et al. |
| 5,630,060 A | 5/1997 | Tang et al. |
| 5,631,946 A | 5/1997 | Campana, Jr. et al. |
| 5,631,947 A | 5/1997 | Wittstein et al. |
| 5,632,011 A | 5/1997 | Landfield et al. |
| 5,633,810 A | 5/1997 | Mandal et al. |
| 5,634,053 A | 5/1997 | Noble et al. |
| 5,638,450 A | 6/1997 | Robson |
| 5,641,946 A | 6/1997 | Shim |
| 5,644,354 A | 7/1997 | Thompson et al. |
| 5,647,002 A | 7/1997 | Brunson |
| 5,649,195 A | 7/1997 | Scott et al. |
| 5,652,884 A | 7/1997 | Palevich |
| 5,657,390 A | 8/1997 | Elgamal et al. |
| 5,664,207 A | 9/1997 | Crumpler et al. |
| 5,664,228 A | 9/1997 | Mital |
| 5,666,530 A * | 9/1997 | Clark et al. ........................... 1/1 |
| 5,666,553 A * | 9/1997 | Crozier ........................ 715/229 |
| 5,673,322 A | 9/1997 | Pepe et al. |
| 5,675,362 A | 10/1997 | Clough et al. |
| 5,675,507 A | 10/1997 | Bobo, II |
| 5,675,782 A | 10/1997 | Montague et al. |
| 5,677,955 A | 10/1997 | Doggett et al. |
| 5,678,039 A | 10/1997 | Hinks et al. |
| 5,680,542 A | 10/1997 | Mulchandani |
| 5,682,379 A | 10/1997 | Mahany et al. |
| 5,682,478 A | 10/1997 | Watson et al. |
| 5,682,524 A | 10/1997 | Freund et al. |
| 5,684,951 A | 11/1997 | Goldman et al. |
| 5,684,984 A | 11/1997 | Jones et al. |
| 5,684,990 A | 11/1997 | Boothby |
| 5,687,322 A | 11/1997 | Deaton |
| 5,701,400 A | 12/1997 | Amado |
| 5,701,423 A | 12/1997 | Crozier |
| 5,705,995 A | 1/1998 | Laflin et al. |
| 5,706,211 A | 1/1998 | Beletic et al. |
| 5,706,427 A | 1/1998 | Tabuki |
| 5,706,502 A | 1/1998 | Foley et al. |
| 5,710,918 A | 1/1998 | Lagarde et al. |
| 5,710,922 A | 1/1998 | Alley et al. |
| 5,713,019 A | 1/1998 | Keaten |
| 5,714,943 A | 2/1998 | Rasor |
| 5,715,403 A | 2/1998 | Stefik |
| 5,717,925 A | 2/1998 | Harper et al. |
| 5,721,779 A | 2/1998 | Funk |
| 5,721,907 A | 2/1998 | Pyne |
| 5,721,908 A | 2/1998 | Lagarde et al. |
| 5,721,914 A | 2/1998 | DeVries |

| | | | |
|---|---|---|---|
| 5,726,893 A | 3/1998 | Schuchman et al. | |
| 5,727,202 A * | 3/1998 | Kucala ................................ 1/1 | |
| 5,729,735 A | 3/1998 | Meyering | |
| 5,737,531 A | 4/1998 | Ehley | |
| 5,740,231 A | 4/1998 | Cohn et al. | |
| 5,742,668 A | 4/1998 | Pepe et al. | |
| 5,742,905 A | 4/1998 | Pepe et al. | |
| 5,745,360 A | 4/1998 | Leone et al. | |
| 5,745,689 A | 4/1998 | Yeager et al. | |
| 5,745,884 A | 4/1998 | Carnegie et al. | |
| 5,751,960 A | 5/1998 | Matsunaga | |
| 5,751,971 A | 5/1998 | Dobbins et al. | |
| 5,752,059 A | 5/1998 | Holleran et al. | |
| 5,752,246 A | 5/1998 | Rogers et al. | |
| 5,754,306 A | 5/1998 | Taylor et al. | |
| 5,754,830 A | 5/1998 | Butts et al. | |
| 5,754,954 A | 5/1998 | Cannon et al. | |
| 5,757,669 A | 5/1998 | Christie et al. | |
| 5,757,901 A | 5/1998 | Hiroshige | |
| 5,757,916 A | 5/1998 | MacDoran et al. | |
| 5,758,088 A | 5/1998 | Bezaire et al. | |
| 5,758,150 A | 5/1998 | Bell et al. | |
| 5,758,354 A | 5/1998 | Huang et al. | |
| 5,758,355 A | 5/1998 | Buchanan | |
| 5,764,902 A | 6/1998 | Rothrock | |
| 5,765,171 A | 6/1998 | Gehani et al. | |
| 5,768,510 A | 6/1998 | Gish | |
| 5,771,354 A | 6/1998 | Crawford | |
| 5,784,463 A | 7/1998 | Chen et al. | |
| 5,784,464 A | 7/1998 | Akiyama et al. | |
| 5,787,172 A | 7/1998 | Arnold | |
| 5,787,441 A | 7/1998 | Beckhardt | |
| 5,790,790 A | 8/1998 | Smith et al. | |
| 5,790,974 A | 8/1998 | Tognazzini | |
| 5,794,252 A | 8/1998 | Mosher | |
| 5,799,086 A | 8/1998 | Sudia | |
| 5,799,318 A | 8/1998 | Cardinal et al. | |
| 5,802,530 A | 9/1998 | Van Hoff | |
| 5,812,398 A | 9/1998 | Nielsen | |
| 5,812,668 A | 9/1998 | Weber | |
| 5,812,773 A | 9/1998 | Norin | |
| 5,815,683 A | 9/1998 | Vogler | |
| 5,818,935 A | 10/1998 | Maa | |
| 5,825,840 A | 10/1998 | Anagnostopoulos | |
| 5,826,014 A | 10/1998 | Coley et al. | |
| 5,828,840 A | 10/1998 | Cowan et al. | |
| 5,832,483 A | 11/1998 | Barker | |
| 5,835,087 A | 11/1998 | Herz et al. | |
| 5,835,601 A | 11/1998 | Shimbo et al. | |
| 5,845,282 A | 12/1998 | Alley et al. | |
| 5,845,293 A | 12/1998 | Veghte et al. | |
| 5,857,201 A | 1/1999 | Wright, Jr. et al. | |
| 5,862,325 A | 1/1999 | Reed et al. | |
| 5,862,346 A * | 1/1999 | Kley et al. .................. 709/245 | |
| 5,870,544 A | 2/1999 | Curtis | |
| 5,870,759 A | 2/1999 | Bauer et al. | |
| 5,870,765 A | 2/1999 | Bauer et al. | |
| 5,875,159 A | 2/1999 | Doi | |
| 5,878,230 A | 3/1999 | Weber et al. | |
| 5,903,881 A | 5/1999 | Schrader et al. | |
| 5,909,689 A | 6/1999 | Van Ryzin | |
| 5,917,629 A | 6/1999 | Hortensius et al. | |
| 5,924,103 A | 7/1999 | Ahmed et al. | |
| 5,928,329 A | 7/1999 | Clark et al. | |
| 5,940,074 A | 8/1999 | Britt, Jr. et al. | |
| 5,943,676 A | 8/1999 | Boothby | |
| 5,944,823 A * | 8/1999 | Jade et al. .................. 726/15 | |
| 5,951,652 A | 9/1999 | Ingrassia, Jr. et al. | |
| 5,953,507 A | 9/1999 | Cheung et al. | |
| 5,958,007 A | 9/1999 | Lee et al. | |
| 5,960,177 A | 9/1999 | Tanno | |
| 5,961,590 A | 10/1999 | Mendez et al. | |
| 5,966,714 A * | 10/1999 | Huang et al. ................ 1/1 | |
| 5,968,131 A | 10/1999 | Mendez et al. | |
| 5,974,238 A * | 10/1999 | Chase, Jr. .................. 709/248 | |
| 5,982,898 A | 11/1999 | Hsu et al. | |
| 5,987,609 A | 11/1999 | Hasebe | |
| 5,991,410 A | 11/1999 | Albert et al. | |
| 5,999,932 A | 12/1999 | Paul | |
| 5,999,947 A | 12/1999 | Zollinger et al. | |
| 6,006,017 A | 12/1999 | Joshi et al. | |
| 6,006,274 A * | 12/1999 | Hawkins et al. ............... 709/248 | |
| 6,009,528 A | 12/1999 | Teraoka | |
| 6,012,083 A | 1/2000 | Savitzky et al. | |
| 6,020,885 A | 2/2000 | Honda | |
| 6,021,427 A | 2/2000 | Spagna et al. | |
| 6,023,700 A | 2/2000 | Owens et al. | |
| 6,023,708 A | 2/2000 | Mendez et al. | |
| 6,034,621 A | 3/2000 | Kaufman | |
| 6,044,205 A | 3/2000 | Reed et al. | |
| 6,049,671 A | 4/2000 | Slivka et al. | |
| 6,052,735 A | 4/2000 | Ulrich et al. | |
| 6,061,798 A | 5/2000 | Coley et al. | |
| 6,073,165 A | 6/2000 | Narasimhan et al. | |
| 6,094,477 A | 7/2000 | Nada et al. | |
| 6,108,691 A | 8/2000 | Lee et al. | |
| 6,108,709 A | 8/2000 | Shinomura et al. | |
| 6,115,611 A * | 9/2000 | Kimoto et al. .............. 455/456.3 | |
| 6,118,856 A | 9/2000 | Paarsmarkt et al. | |
| 6,125,281 A | 9/2000 | Wells et al. | |
| 6,125,388 A | 9/2000 | Reisman | |
| 6,131,096 A | 10/2000 | Ng et al. | |
| 6,131,116 A | 10/2000 | Riggins et al. | |
| 6,138,124 A | 10/2000 | Beckhardt | |
| 6,138,146 A | 10/2000 | Moon et al. | |
| 6,151,606 A | 11/2000 | Mendez | |
| 6,154,844 A | 11/2000 | Touboul et al. | |
| 6,169,986 B1 | 1/2001 | Bowman et al. | |
| 6,182,118 B1 | 1/2001 | Finney et al. | |
| 6,188,909 B1 * | 2/2001 | Alanara et al. ............... 455/466 | |
| 6,212,529 B1 | 4/2001 | Boothby et al. | |
| 6,249,805 B1 | 6/2001 | Fleming | |
| 6,279,029 B1 * | 8/2001 | Sampat et al. .................. 709/203 | |
| 6,295,541 B1 | 9/2001 | Bodnar et al. | |
| 6,304,881 B1 | 10/2001 | Halim et al. | |
| 6,311,186 B1 | 10/2001 | Melampy et al. | |
| 6,317,592 B1 | 11/2001 | Campana, Jr. et al. | |
| 6,317,793 B1 | 11/2001 | Toyosawa et al. | |
| 6,321,257 B1 * | 11/2001 | Kotola et al. .................. 709/219 | |
| 6,324,542 B1 | 11/2001 | Wright, Jr. et al. | |
| 6,330,568 B1 | 12/2001 | Boothby et al. | |
| 6,334,140 B1 | 12/2001 | Kawamata | |
| 6,343,313 B1 | 1/2002 | Salesky et al. | |
| 6,389,455 B1 | 5/2002 | Fuisz | |
| 6,438,583 B1 | 8/2002 | McDowell et al. | |
| 6,442,616 B1 | 8/2002 | Inoue et al. | |
| 6,446,090 B1 | 9/2002 | Hart | |
| 6,477,545 B1 | 11/2002 | LaRue | |
| 6,489,671 B2 | 12/2002 | Aoki et al. | |
| 6,496,704 B2 | 12/2002 | Yuan | |
| 6,496,875 B2 | 12/2002 | Cheng et al. | |
| 6,510,455 B1 | 1/2003 | Chen et al. | |
| 6,564,218 B1 | 5/2003 | Roth | |
| 6,631,416 B2 | 10/2003 | Bendinelli et al. | |
| 6,697,942 B1 | 2/2004 | L'Heureux et al. | |
| 6,708,221 B1 | 3/2004 | Mendez et al. | |
| 6,813,487 B1 | 11/2004 | Trommelen et al. | |
| 7,039,679 B2 | 5/2006 | Mendez et al. | |
| 7,136,645 B2 | 11/2006 | Hanson et al. | |
| 7,480,907 B1 | 1/2009 | Marolia et al. | |
| 7,496,957 B2 | 2/2009 | Howard et al. | |
| 7,603,112 B2 | 10/2009 | Huomo et al. | |
| 7,624,393 B2 | 11/2009 | Egan et al. | |
| 7,698,702 B2 | 4/2010 | Wetherly et al. | |
| 7,844,964 B2 | 11/2010 | Marolia et al. | |
| 7,987,449 B1 | 7/2011 | Marolia et al. | |
| 8,117,344 B2 * | 2/2012 | Mendez et al. ............... 709/248 | |
| 8,225,089 B2 * | 7/2012 | Wang et al. .................. 713/161 | |
| 8,250,565 B2 | 8/2012 | Marolia et al. | |
| 8,255,798 B2 * | 8/2012 | Ording ..................... 715/700 | |
| 8,509,750 B2 | 8/2013 | Ramer et al. .............. 455/414.1 | |
| 2002/0023215 A1 * | 2/2002 | Wang et al. .................. 713/171 | |
| 2003/0097358 A1 | 5/2003 | Mendez | |
| 2003/0130984 A1 | 7/2003 | Quinlan et al. | |
| 2004/0068721 A1 | 4/2004 | O'Neill et al. | |
| 2004/0098715 A1 | 5/2004 | Aghera et al. | |
| 2004/0117310 A1 | 6/2004 | Mendez et al. | |
| 2006/0195595 A1 | 8/2006 | Mendez et al. | |

| | | | |
|---|---|---|---|
| 2007/0093243 A1 | 4/2007 | Kapadekar et al. | |
| 2007/0174433 A1 | 7/2007 | Mendez et al. | |
| 2009/0307362 A1* | 12/2009 | Mendez et al. | 709/229 |
| 2010/0023630 A1* | 1/2010 | Mendez et al. | 709/229 |
| 2011/0153779 A1* | 6/2011 | Mendez et al. | 709/218 |

FOREIGN PATENT DOCUMENTS

| | | | |
|---|---|---|---|
| AU | 78434/98 | | 7/1998 |
| CA | 2149337 | A1 | 6/1994 |
| CA | 2 179 349 | | 6/1996 |
| CA | 2191505 | | 6/1997 |
| CA | 2 291 717 | | 12/1998 |
| CA | 2210763 | | 1/1999 |
| CA | 2210763 | | 2/2000 |
| CA | 2340711 | | 3/2000 |
| CA | 2191505 | | 8/2000 |
| EP | 0 617 373 | | 3/1994 |
| EP | 0 736 989 | | 10/1996 |
| EP | 0 778 527 | | 11/1996 |
| EP | 0 772 327 | | 5/1997 |
| EP | 0 777 394 | | 6/1997 |
| EP | 0 788 287 | | 8/1997 |
| EP | 0 793 387 | | 9/1997 |
| EP | 0 801 478 | | 10/1997 |
| EP | 0 801 478 | A2 | 10/1997 |
| EP | 0801478 | | 10/1997 |
| EP | 0 813 133 | | 12/1997 |
| EP | 0 813 133 | A2 | 12/1997 |
| EP | 0 820 028 | A2 | 1/1998 |
| EP | 0820028 | | 1/1998 |
| EP | 0 825 788 | | 2/1998 |
| EP | 0 838 774 | | 4/1998 |
| EP | 0 838 934 | | 4/1998 |
| EP | 1 130 512 | | 9/2001 |
| EP | 1 130 512 | A2 | 9/2001 |
| EP | 0 996 905 | | 5/2006 |
| JP | 63209263 | | 8/1988 |
| JP | 1125049 | | 5/1989 |
| JP | 5-73598 | | 3/1993 |
| JP | 5-110564 | | 4/1993 |
| JP | 06-290118 | | 10/1994 |
| JP | 06-276242 | | 11/1994 |
| JP | 6-332858 | | 12/1994 |
| JP | 4-175461 | | 6/1995 |
| JP | 08-31928 | | 2/1996 |
| JP | H08137732 | A | 5/1996 |
| JP | 09-008842 | | 1/1997 |
| JP | 9-81560 | | 3/1997 |
| JP | 09214556 | | 8/1997 |
| JP | 09-233115 | | 9/1997 |
| JP | 9305155 | A | 11/1997 |
| JP | 02000003314 | | 1/2000 |
| JP | 2003005905 | A | 1/2003 |
| WO | 96/17306 | | 6/1996 |
| WO | 96/19064 | | 6/1996 |
| WO | WO 96/17306 | | 6/1996 |
| WO | 97/04389 | | 2/1997 |
| WO | WO 97/04389 | | 2/1997 |
| WO | 97/24678 | | 7/1997 |
| WO | 97/26709 | | 7/1997 |
| WO | 97/27717 | | 7/1997 |
| WO | WO 97/24678 | | 7/1997 |
| WO | 97/32251 | | 9/1997 |
| WO | 97/33421 | | 9/1997 |
| WO | 97/35265 | | 9/1997 |
| WO | WO 97/35265 | | 9/1997 |
| WO | 97/41654 | | 11/1997 |
| WO | 97/44942 | | 11/1997 |
| WO | 98/00787 | | 1/1998 |
| WO | 98/21911 | | 5/1998 |
| WO | 98/23108 | | 5/1998 |
| WO | WO 98/54662 | | 12/1998 |
| WO | 99/05620 | | 2/1999 |
| WO | WO 99/05620 | | 2/1999 |
| WO | 99/45451 | | 9/1999 |
| WO | 99/45482 | | 9/1999 |
| WO | WO 99/45451 | | 9/1999 |
| WO | 00/22543 | | 4/2000 |
| WO | WO 00/22543 | | 4/2000 |
| WO | 02/138599 | | 9/2002 |
| WO | 02/174372 | | 11/2002 |

OTHER PUBLICATIONS

Kohji Ohtani, Special Edition: "Mobile Computing", Part III—Messages/DB Replication, Nikkei Open Systems, Japan, Nikkei BP, Dec. 15, 1996, No. 45, pp. 222-231 (w/Partial English Translation).

Radosevich, Linda, "Users want unified mail directories," Computerworld, Aug. 30, 1993, p. 12.

Bruno, Charles, "Firm pushes E-mail limits beyond rivals'," Network World, Aug. 12, 1991, pp. 33, 53.

Sliwa, Carol and Cole, Barb, "MESA declares a groupware detente," Network World, Aug. 5, 1996, p. 29.

Grosse, Eric, "Repository Mirroring," ACM Transactions on Mathematical Software, vol. 21, No. 1, Mar. 1995, pp. 89-97.

Schilit, Bill N. and Theimer, Marvin M., "Disseminating Active Map Information to Mobile Hosts," IEEE Network, Sep./Oct. 1994, pp. 22-32.

Levy, Eliezer and Silberschatz, Abraham, "Distributed File Systems: Concepts and Examples," ACM Computing Surveys, vol. 22, No. 4, Dec. 1990, pp. 321-374.

Rymer, John R., "The Muddle in the Middle," Byte, Apr. 1996, pp. 67-70.

Baum, David, "Intranet Politics and Technologies," Byte, May 1997, pp. 88A-88H.

Udell, Jon, "Push Me, Pull You," Byte, Sep. 1996, pp. 117-120.

Kador, John, "The Ultimate Middleware," Byte, Apr. 1996, pp. 79-83.

Brown, Mark, "Using Netscape 2," Que Corporation, 1995, pp. 885-907.

Kramer, Douglas, "The Java Platform," Javasoft, May 1996, pp. 1-25. Package java.applet; java.net, http://www-nrg.ee.lbl.gov/j4/apibook/javaf.htm, javam.htm, Apr. 22, 1996.

Servlet Tutorial, http://mech.postech.ac.kr/Java/java.sun.com/products/jeeves/currentrelease/doc/servlet_tutorial/servlet_tutorial.html.

Freier et al., entitled "The SSL Protocol, Version 3.0," Netscape Communications, dated Nov. 18, 1996, pp. 1-59, Downloaded from URL=http://www.home.netscape.com/eng/ssl3/draft302.txt.

Java Servlet Application Programming Interface White Paper, http://mech.postech.ac.kr/Java/java.sun.com/products/jeeves/CurrentRelease/doc/api.html, Aug. 1996, pp. 1-6.

Singhal, M., "Update transport: A new technique for update synchronization in replicated database systems," IEEE Transactions on Software Engineering, vol. 16, No. 12, Dec. 1990, pp. 1325-1336.

Rao, H. & Skarra, A., "A transparent service for synchronized replication across loosely-connected file systems," IEEE Transactions on Software Engineering, Apr. 1995, pp. 110-117.

Crispin, M., "Internet Message Access Protocol—RFC 1730 Version 4," Dec. 1994, pp. 1-52, http://www.faqs.org/rfcs/rfc1730.html.

Rao, Venkat & Aline, Mary, "Burrowing through firewalls," Dec. 1996, pp. 1-5, http://java.sun.com/developer/technicalArticles/InnerWorkings/Burrowing/.

Brown, Margaret J., "The Visto Briefcase Pro Puts Your PIM On The Internet," Aug. 13, 1998, 1 page, URL:http://www.zdnet.com/zdnn/stories/zdnn_display/0,3440,341892,00.html.

Tanenbaum, Andrew, "Computer Networks," Third Edition, Prentice-Hall, 1996, see entire document.

Knudsen, Jonathan, "Java Cryptography," O'Reilly, 1998, p. 79-91, 112, 160.

Verisign Press Release, "Verisign Enhances Digital IDS to Enable Universal Website Login and One-step Registration," <www.verisign.com/press/product/isv.html>, especially 2nd paragraph.

Crispin, M., "IMAP4 Compatibility With IMAP2BIS", Network Working Group RFC 2061, Dec. 1996, XP002154026, <URL:http://www.imc.org/rfc2061>, retrieved Nov. 28, 2000, p. 1, last paragraph.

"Configuration of a wireless-connected mobile computer," IBM Technical Disclosure Bulletin, US, IBM Corp., New York, vol. 38, No. 4, Apr. 1, 1995, pp. 15-17, XP000516057, ISSN: 0018-8689, the whole document.

Mason, Justin, "Tunneling over HTTP," Dec. 11, 1996, pp. 1-2 http://www.netsys.com/firewalls/firewalls-9612/0488.html.

Elgamal, Taher, "The Secure Sockets Layer Protocol (SSL)," agenda for the Danvers IETF meeting, Apr. 1995, pp. 1-5—http://www.ietf.cnri.reston.va.us/proceedings/95apr/sec/cat.elgamal.slides.html.

Research Disclosure: "Provide Auto-Forwarding Based On Criteria Selected by the User"; Oct. 1, 1989; 1 page; No. 306; Kenneth Mason Publications; XP000085405; ISSN 0374-4353.

Chan, M.C. et al., "Application of Compaction Technique to Optimizing Wireless Email Transfer," IEEE Wireless Communications and Networking Conference 1999, p. 1535 Section A.

Crispin, M., "Internet Message Access Protocol Version 4rev1," 1996 Section 2.3.1.1.

Jaeger and Prakash, "Implementation of a Discretionary Access Control Model for Script-based Systems," IEEE Jun. 1995.

Adams, Charlotte, "Multilevel Secure Networking Charges Ahead," Federal Computer Week, Apr. 12, 1993.

Kohl, John, "The Evolution of the Kerberos Authentication Service," 1991.

Young et al., "Deniable Password Snatching: On the Possibility of Evasive Electronic Espionage," 1997, IEEE, pp. 224-235.

Abel, Amee, "E-mail anywhere," May 1998, Time, pp. 1-4.

Satyanarayanan, M., "Integrating Security in a Large Distributed System," ACM Transactions on Computer Systems, vol. 7, No. 3, Aug. 1989, pp. 247-280.

Kistler, James J. and Satyanarayanan, M., "Disconnected Operation in the Coda File System," ACM Transactions on Computer Systems, vol. 10, No. 1, Feb. 1992, pp. 3-25.

Hills, Alex and Johnson, David B., "Wireless Data Network Infrastructure at Carnegie Mellon University," IEEE Personal Communications, 3(1), Feb. 1996.

Satyanarayanan, Mahadev, "Mobile Information Access," IEEE Personal Communications, Feb. 1996, pp. 26-33.

Satyanarayanan, Mahadev et al., "Coda: A Highly Available File System for a Distributed Workstation Environment," IEEE Transactions on Computers, vol. 39, No. 4, Apr. 1990, pp. 447-459.

Satyanarayanan, Mahadev, "Scalable, Secure, and Highly Available Distributed File Access," Computer, May 1990, pp. 9-21.

Mummert, Lily B. et al., "Exploiting Weak Connectivity for Mobile File Access," SIGOPS '95, Dec. 1995, pp. 143-155.

Terry, Douglas B. et al., "Managing Update Conflicts in Bayou, a Weakly Connected Replicated Storage System," SIGOPS '95, Dec. 1995, pp. 172-183.

Demers, Alan et al., "The Bayou Architecture: Support for Data Sharing among Mobile Users," Proceedings of the Workshop on Mobile Computing Systems and Applications, Santa Cruz, California, Dec. 1994, pp. 2-7.

Petersen, Karin et al., "Bayou: Replicated Database Services for World-wide Applications," Proceedings Seventh ACM SIGOPS European Workshop (EuroSIGOPS '96), Connemara, Ireland, Sep. 1996, pp. 275-280.

Crocker, David H., "RFC822: Standard for ARPA Internet Text Messages," http://www.w3.org/Protocols/rfc822/.

Theisen, Tim, "AFS distributed filesystem FAQ (1/2)," posted to uwisc.general newsgroup, Jul. 25, 1994.

Theisen, Tim, "AFS distributed filesystem FAQ (2/2)," posted to uwisc.general newsgroup, Jul. 25, 1994.

Schubert, Eric, "Re: telnet/internet and . . . ," posted to comp.sys.hp.mpe newsgroup, Jun. 30, 1995.

Glazman, Daniel, "Software: HHTPtool [sic] 1.1, a file transfer utility over HTTP using PUT and GET," posted to comp.infosystems.www.announce newsgroup, May 17, 1995.

Glazman, Daniel, "Software: HTTPtool v1.0 for Windows3.x, file transfer utility over HTTP," posted to comp.infosystems.www.announce newsgroup, Mar. 21, 1996.

Angus, Jeffrey G., "Sales force automation has a GoldMine," Computerworld, Oct. 7, 1996, p. 59.

Salamone, Salvatore, "Middle(ware) Management," Byte, Apr. 1996, pp. 71-76.

Nance, Barry, "Balance the Load with Transaction Server," Byte, Jun. 1997, pp. 81-84.

Francett, Barbara, "Replication on the Run," Software Magazine, Aug. 1996, pp. 63-66.

Darling, Charles B., EDA/SQL Loses a Little and Gains a Lot, Datamation, May 1, 1996, p. 12.

Varney, Sarah E., "Arm your salesforce with the Web," Datamation, Oct. 1996, pp. 72-74.

Fulcher, Jim, "Is it or isn't it?," Manufacturing Systems, Oct. 1996, pp. 56-61.

Lamb, John and Cusato, Tony, "LAN-Based Office for the Enterprise, A Case Study," Proceedings, 19th Conference on Local Computer Networks, Minneapolis, Minnesota, Oct. 2-5, 1994, pp. 440-447.

Kawell Jr., Leonard et al., "Replicated Document Management In A Group Communication System," presented at the Second Conference on Computer-Supported Cooperative Work, Portland, Oregon, Sep. 26-28, 1988, as printed in Groupware: Software for Computer-Supported Cooperative Work, IEEE Computer Society Press, pp. 226-235.

Hong, Jack et al., "Personal Electronic Notebook with Sharing," Proceedings of the Fourth Workshop on Enabling Technologies: Infrastructure for Collaborative Enterprises, Berkeley Springs, West Virginia, Apr. 20-22, 1995, pp. 88-94.

Mace, Scott, "DataSync 2.0 enhances synchronization of data," InfoWorld, Jun. 6, 1994, p. 28.

Mace, Scott, "Database replication products debut," InfoWorld, Nov. 15, 1993, p. 19.

Gryphon, Robert, "DataSync line matches up," InfoWorld, May 23, 1994, p. 161.

Patterson, John F. et al., "Notification Servers for Synchronous Groupware," Proceedings, ACM 1996 Conference on Computer Supported Cooperative Work, Boston, Massachusetts, Nov. 16-20, 1996, pp. 122-129.

Zhao, Jian and Hoppe, H. Ulrich, "Supporting Flexible Communication in Heterogeneous Multi-User Environments," 1994 IEEE, pp. 442-449.

Gong, Li, "Enclaves: Enabling Secure Collaboration Over the Internet," IEEE Journal on Selected Areas in Communications, vol. 15, No. 3, Apr. 1997, pp. 567-575.

Bruno, Lee, "Directory Services Tie It All Together," Data Communications, Mar. 1997, pp. 75-83.

Guy, Richard G. et al., "Implementation of the Ficus Replicated File System," Proceedings of the Summer 1990 USENIX Conference, Anaheim, California, Jun. 11-15, 1990, pp. 63-70.

Page, Thomas W. Jr. et al., "Management of Replicated Volume Location Data in the Ficus Replicated Data System," Conference Proceedings, USENIX Summer 1991 Technical Conference, Nashville, Tennessee, Jun. 10-14, 1991, pp. 17-29.

Reiher, Peter et al., "Resolving File Conflicts in the Ficus File System," Conference Proceedings, USENIX Summer 1994 Technical Conference, Boston, Massachusetts, Jun. 6-10, 1994, pp. 183-195.

Walker, Bruce et al., "The LOCUS Distributed Operating System," Proceedings of the Ninth ACM Symposium on Operating Systems Principles, Bretton Woods, New Hampshire, Oct. 10-13, 1983, pp. 49-70.

Parker, D. Stott Jr. et al., "Detection of Mutual Inconsistency in Distributed Systems," IEEE Transactions on Software Engineering, vol. SE-9, No. 3, May 1983, pp. 240-246.

Ceri, Stefano et al., "The Case for Independent Updates", Second Workshop on the Management of Replicated Data, Monterey, California, Nov. 12-13, 1992, pp. 17-19.

Downing, Alan R. et al., "OSCAR: A System for Weak-Consistency Replication", Proceedings, Workshop on the Management of Replicated Data, Houston, Texas, Nov. 8-9, 1990, pp. 26-30.

Siegel, Alex et al., "Deceit: A Flexible Distributed File System", Proceedings of the Summer 1990 USENIX Conference, Anaheim, California, Jun. 11-15, 1990, pp. 51-61.

Chutani, Sailesh, "The Episode File System", Conference Proceedings, USENIX Winter 1992 Technical Conference, San Francisco, California, Jan. 20-24, 1992, pp. 43-59.

Seltzer, Margo, "An Implementation of a Log-Structured File System for UNIX", Conference Proceedings, USENIX Winter 1993 Technical Conference, San Diego, California, Jan. 25-29, 1993, pp. 307-326.

Vahalia, Uresh, "Metadata Logging in an NFS Server", Conference Proceedings, USENIX 1995 Technical Conference on UNIX and Advanced Computing Systems, New Orleans, Louisiana, Jan. 16-20, 1995, pp. 265-276.

Lotus Development Corporation, InterNotes Web Publisher Release 4, "InterNotes Web Publisher Guide", 1996, Cambridge, MA.

Lotus Development Corporation, Lotus Notes Release 4, "Database Manager's Guide", 1995, Cambridge, MA.

Lotus Development Corporation, Lotus Notes Release 4, "Administrator's Guide", 1995, Cambridge, MA.

IBM Lotus Technical Library, Lotus Documentation, "Lotus Notes Internet Cookbook for Notes Release 3", Jan. 16, 1996, pp. 1-26 http://www-12.lotus.com/ldd/doc/domino_notes/cookbook/cbookv4,nsf/e125003289bf7b3a385256.

John Wiley & Sons, Inc.—Wiley Computer Publishing, Falkner, Mike, "How to Plan, Develop, and Implement Lotus Notes in Your Organization", 1996, USA4.

Lotus Development Corporation, Lotus Notes Release 4, "Deployment Guide", 1995, Cambridge, MA.

McGraw-Hill, Lamb, John P. and Lew, Peter W., "Lotus Notes Network Design for Notes Release 3 and 4", 1996, Quebecor-Fairfield, PA.

Lotus Notes, "Overview—What is Lotus NotesPump?", including "notes Pump 1.0 Release Notes".

Lotus Development Corporation, Lotus Notes Release 3.1, The groupware standard, "Site and System Planning Guide", 1994, Cambridge, MA.

Lotus Development Corporation, Lotus Notes Release 3.1. The groupwarestandard, "Administrator's Guide Server for NetWare, OS/2, and UNIX", 1994, Cambridge, MA.

IBM Lotus Technical Library, Lotus Documentation, "Lotus Notes Internet Cookbook for Notes Release 4", Feb. 14, 1996, pp. 1-30 http://www-12.lotus.com/ldd/doc/domino_notes/cookbook/cbookv4,nsf/e125003289bf7b3a385256.

IntelliLink Corporation, IntelliLink for Windows Release 3.0, "User's Guide", 1994, Nashua, NH.

Lotus Development Corporation, Lotus Notes Release 4, "Application Developer's Guide", 1995, Cambridge, MA.

Lotus Development Corporation, Lotus Notes Release 3.3 North American Server Edition, "Lotus Notes, the Groupware Standard", 1994, Cambridge, MA.

Sams Publishing, Dahl, Andrew, "Lotus Notes 4 Administrator's Survival Guide", 1996, Indianapolis, IN.

Sams Publishing, Tmaura, et al., "Lotus Notes 4 Unleashed", 1996, Indianapolis, IN.

Advisor Publications—Lotus Notes Advisor, Pyle, Hugh, "The Notes Architecture", 1995.

Advisor Publications—Lotus Notes Advisor, Augun, Adury, "Intergrating Lotus Notes with Enterprise Data", 1996.

Advisor Publications—Lotus Notes Advisor, Opyt, Barbara and Dale, Robert, "Use the Internet as Your Lotus Notes WAN", 1996.

Lotus Development Corporation, Lotus Notes Knowledge Base, "What is the Notes Replicator?", 1995, Cambridge, MA.

Lotus Development Corporation, Lotus Notes Knowledge Base, "Firewall Security Overview and How Firewalls Relate to Lotus Notes", 1996, Cambridge, MA.

Network Computing, Frenkel, Garry, "Pumping for Info: Notes and Databse Integration", 1996.

IBM Corporation, Hawker, et al., "Secrets to Running Lotus Notes: The Decisions No One Tells You How to Make", 1996, Research Triangle Park, NC.

Google Search, Mailing List Management Software FAQ, (Nov. 20, 2006), pp. 1-25.

Allman, Eric, Sendmail, Installation and Operation Guide, Version 8.103, (Apr. 15, 1997), pp. 1-206.

ARRL Amateur Radio, $10^{th}$ Computer Networking Conference, San Jose, CA, (Sep. 27, 1991-Sep. 29, 1991); pp. 1-169.

ARRL Amateur Radio, Computer Networking Conferences 1-4, Pioneer Papers on Packet Radio (1981-1985); pp. 1-513 (1981).

ARRL Amateur Radio, Computer Networking Conferences 1-4, Pioneer Papers on Packet Radio (1981-1985) (1983); pp. 1-513.

ARRL Amateur Radio, Computer Networking Conferences 1-4, Pioneer Papers on Packet Radio (1981-1985), (1984); pp. 1-513.

ARRL Amateur Radio, Computer Networking Conferences 1-4, Pioneer Papers on Packet Radio (1981-1985) (1985); pp. 1-513.

ARRL Amateur Radio, $5^{th}$ Computer Networking Conference, Orlando, FL, (Mar. 9, 1986); pp. 1-144.

ARRL Amateur Radio, $6^{h}$ Computer Networking Conference, Redondo Beach, FL, (Aug. 29, 1987); pp. 1-187.

ARRL Amateur Radio, $7^{h}$ Computer Networking Conference, Columbia, MD, (Oct. 1, 1988); pp. 1-230.

ARRL Amateur Radio, $8^{h}$ Computer Networking Conference, Colorado Springs, CO, (Oct. 7, 1989); pp. 1-229.

ARRL Amateur Radio, $9^{h}$ Computer Networking Conference, London, Ontario, CN, (Sep. 22, 1990); pp. 1-294.

Business Wire, (Nov. 13, 1995), Highbeam Research, Inc., Ardis Announces Availability of New LAN-Based E-Mail Software for PDAs on its Nationwide Wireless Network; First Two-Way Wireless Data Network that Offers Solution for Microsoft Mail and Lotus cc: Mail Users; pp. 1-2.

Atkinson, R., Naval Research Laboratory, (Aug. 1995), Security Architecture for the Internet Protocol, pp. 1-23.

Atkinson, R., Naval Research Laboratory, (Aug. 1995), IP Authentication Header, pp. 1-14.

Atkinson, R., Naval Research Laboratory, (Aug. 1995), IP Encapsulating Security Payload (ESP), pp. 1-13.

Google Search, Motorola Envoy Commercial Availability, (Jan. 11, 2007), pp. 1-5.

Google Search, Motorola Envoy Press Clippings, (Jan. 11, 2007), pp. 1-7.

E-Mail over HF Radio, (May 12, 1998), pp. 1-6.

Bhushan, Abbay, et al., (Nov. 17, 1971), The File Transfer Protocol, pp. 1-12.

Callaghan, B., et al., Sun Microsystems, Inc., (Jun. 1995), NFS Version 3 Protocol Specification, pp. 1-6.

Chapman, D. Brent, Great Circle Associates, Majordomo: How I Manage 17 Mailing Lists Without Answering "-request" Mail, 1992 LISA VI, Oct. 19-23, 1992, Long Beach, CA, pp. 135-144.

Cheshire Stuart, et al., Computer Science Dept., Stanford Univ., Stanford, CA, Internet Mobility 4×4, pp. 1-12.

Communications News: Wireless Packet Network Helps Red Cross Keep Communicating—IBM's 9075 PCradio (Apr. 1993), pp. 1-2.

The Cook Report on Internet: Wireless As An Internet On-Ramp & Local Loop By Pass, A Survey of the Technologies, The Players and the Prospects—Including an in Depth Look at Metricom, pp. 1-38.

Daigle, J. et al., Toward High-Speed Wireless Networks, IEEE Communications Magazine, (Mar. 1995), pp. 86-87.

Google Search, Need to Rewrite from Field on Outgoing Mail, (Nov. 12, 2006), pp. 1-3.

Enfield, R. Medford, Software Works, Inc. Development of the AT&T Personal Link Services Online Documentation System, Doc. 95-10/95, Savannah, GA, U.S.A., pp. 39-48.

Google Search, Motorola Unveils Envoy (R), Two-Way Wireless Personal Communicator, (Mar. 11, 1994), pp. 1-19.

Google Search, WDC 95 Wireless Data Comm Conference Update, (Sep. 24, 2007), pp. 1-5.

Garbee, B., KB0G, President's Corner APRS QSY, 1997-1999, APRS Working Group North American Digital Systems Directory, (Nov. 20, 2006), pp. 1-20.

Garbee, B., New Release of KA9Q Internet Package, (Sep. 2, 1987), pp. 1-5.

Gifford, David K., et al., The Cedar File System, Communications of the ACM, Mar. 1988, vol. 31, No. 3, pp. 288-298.

Glasser, Alan L., The Evolution of a Source Code Control System, Bell Laboratories, Holmdel, NJ, pp. 122-125.

Goldberg, Y. et al., Active Mail—Framework for Implementing Groupware, CSCW 92 Proceedings, Nov. 1992, pp. 75-83.

Google Search, RadioMail Two-Way Service Providing Wireless Link to E-Mail Now Available, (Jan. 11, 2007), pp. 1-3.

Google Search, Two-Way Wireless Electronic Mail Service, (Feb. 11, 1992), pp. 1-3.

Google Search, RadioMail Two-Way Service Providing Wireless Link to E-Mail Now Available, (Oct. 29, 1992), pp. 1-4.

Google Search, Frequently Asked Questions List (FAQ) for Comp. Mail.Mine, (Apr. 21, 1993), pp. 1-27.

Google Search, Frequently Asked Questions List (FAQ) for Comp. Mail.Mine, (Apr. 21, 1993), pp. 1-23.
Grosse, Eric, AT&T Bell Laboratories, Repository Mirroring, ACM Transactions on Mathematical Software, vol. 21, Mar. 1995, pp. 89-97.
Google Search, RadioMail (TM)—Wireless Electronic Mail Announcement, (Oct. 9, 1991), pp. 1-3.
Howard, John H., Using Reconciliation to Share Files Between Occasionally Connected Computers, (May 27, 1993), Mitsubishi Electric Research Labs Inc., Cambridge Research Center, Cambridge, MA.
Google Search, Wireless RadioMail for PowerBooks uses Eudora, (Jun. 30, 1993), pp. 1-2.
KA9Q NOS, User Manual for the KA9Q CWRU/BIOC, Network Operating System, (Aug. 1994).
Jones, Greg, WD5IVD, Packet Radio: Introduction to Packet Radio, Articles and Information on General Packet Radio Topics TAPR, Publication #95-1. 1995, pp. 1-9.
Joseph, Anthony D., et al., Rover: A Toolkit for Mobile Information Access, SIGOPS '95, Dec. 1995, CO, USA, pp. 156-171.
Karn, P., et al., (Aug. 1995), The ESP DES-CBC Transform, pp. 1-11.
Karn, P., et al., (Sep. 1995), The ESP Triple DES Transform, pp. 1-11.
The KA9Q NOS TCP/IP Package, (Mar. 15, 2002), pp. 1-2.
Article: PACTOR, (Nov. 20, 2006), pp. 1-6.
Kastenholz, F., FTP Software, Inc. (Feb. 1996), Variance for The PPP Connection Control Protocol and The PPP Encryption Control Protocol, pp. 1-7.
Kim, Won, Highly Available Systems for Database Applications, Computing Surveys, vol. 16, No. 1, (Mar. 1984), pp. 1-28.
Lampson, Butler W., et al., Organizing Software in a Distributed Environment, (1983) ACM, pp. 1-13.
Public Wireless Packet Data Services, (Nov. 20, 2006), pp. 1-6.
Lebano, Tito N., (Dec. 1988), A TCP/IP, Gateway Interconnecting AX.25 Packet Radio Networks to the Defense Data Network, Dept. of the Air Force Air University, Air Force, Institute of Technology, pp. 1-105.
Lee, Chin-Hwa, et al., Modeling of Two Distributed Schemes for Data Synchronization in a Computer Network, Dept. of Electrical & Computer Engineering Syracuse University, (1978), pp. 293-304.
Levy, Eliezer, et al., Distributed File Systems: Concepts and Examples, ACM Computing Services Surveys, vol. 22, No. 4, Dec. 1990, pp. 1-54.
Linn, J., Privacy Enhancement for Internet Electronic Mail: Part I: Message Encryption and Authentication Procedures, (Feb. 1993), pp. 1-84.
Liskov, Barbara, et al., Replication in the Harp File System, ACM (1991), pp. 226-238.
Lloyd, B., et al., PPP Authentication Protocols, (Oct. 1992), pp. 1-14.
Metzger, P., et al., IP Authentication Using Keyed MD5, (Aug. 1995), pp. 1-6.
Meyer, G., The PPP Encryption Control Protocol (ECP), (Jun. 1996), pp. 1-9.
Murray, John, Source Control Using VM/SP and CMS, Software Engineering Notes, vol. 13, No. 2, ACM Sigsoft, (Apr. 1988), pp. 51-54.
Myers, J., POP3 Authentication Command, (Dec. 1994), pp. 1-6.
Myers, J., et al., Post Office Protocol, Ver. 3, (May 1996), pp. 1-24.
Article: New York Times, Company News; Motorola to Acquire I.B.M. Stake in Ardis Network, (Jul. 7, 1994), p. 1 of 1.
Article: NSF Wireless Field Tests in Mongolia, (Nov. 20, 2006), p. 1 of 1.
Article: Part III—Technical Information, (Nov. 20, 2006), pp. 68-95.
Pahlavan, K. et al., Trends in Local Wireless Networks, IEEE Communications Magazine, (Mar. 1995), pp. 88-95.
Pahlavan, K. et al., Wireless Communications for Office Information Networks, IEEE Communications Magazine, (Jun. 1985), vol. 23, No. 6, pp. 19-27.
Ploedereder, Erhard, Ph.D., et al., The Data Model of the configuration Management Assistant, (1989) ACM, pp. 5-14.
Postel J., et al., File Transfer Protocol (FTP), (Oct. 1985), pp. 1-69.
Price, H., PACSAT Protocol Suite—An Overview, (1990), pp. 1-5.
Rand, D., The PPP Compression Control Protocol (CCP), Jun. 1996), pp. 1-8.
Rangan, P. Venkat, et al., Media Synchronization in Distributed Multimedia File Systems, ACM SIGCOMM, Computer Communication Review, pp. 88-89.
Reich, Richard, UnixWorld, SendMail V8: A (Smoother) Engine Powers Network Email, (Dec. 11, 2006), pp. 1-16.
River Run Software Group: Products, Mail on the Run!, (Nov. 20, 2006), pp. 1-3.
Rodriguez, Luis C., et al., An Empirical Comparison of Advanced Event File Synchronization Structures, Proceedings of the 1982 Winter Simulation Conference, IEEE (1982), pp. 189-194.
Rose M., Post Office Protocol—Version 3, (Jun. 1993), pp. 1-18.
Hegardt, Mary, et al., MH for NM Users, (Apr. 12, 1990), pp. 1-16.
Rose, Marshall T., Changes to The Rand MH Message Handling System: MH #6.5 for 4.3BSD UNIX, (Apr. 12, 1990), pp. 1-15.
Printout: Maintenance Commands, MH-GEN (8), pp. 1-16.
Sweet, Jerry, A Multi-Media E-Mail Tutorial With MH, (Mar. 17, 1993), pp. 1-64.
Rose, Marshall T., et al, MH: A Multifarious User Agent, pp. 1-28.
Stefferud, Einar, et al., MZnet: Mail Service for Personal Micro-Computer Systems, pp. 1-17.
Rose, Marshall T., et al., MH.5: How to Process 200 Messages a day and still get some real work done, pp. 1-33.
Rose, Marshall T., et al, Design of the TTI Prototype Trusted Mail Agent, pp. 1-30.
Rose, Marshall T., et al, The Rand MH Message Handling System: Tutorial, (May 21, 1986), pp. 1-19.
The Rand MH, Message Handling System: Administrator's Guide, UCI Version (Nov. 30, 1993), pp. 1-39.
Rose, Marshall T., The Rand MH Message Handling System: The UCI BBoards Facility, (May 21, 1986), pp. 1-14.
Hegardt, Mary et al., MH for Beginners, (Apr. 12, 1990), pp. 1-15.
Romine, John L., Changes to the RAND MH Message Handling System: UCI Version MH 6.8, (Dec. 1, 1993), pp. 1-14.
The RAND MH, Message Handling System: User's Manual, UCI Version (Nov. 30, 1993), pp. 1-144.
Rysavy, Peter, Making the Call with Two-Way Paging, (Jan. 15, 1997), pp. 1-5.
Rysavy, Peter, Network Design Manual, Wide-Area Wireless Computing, Profile of Wireless Networks, (Nov. 20, 2006), pp. 1-11.
Schryver, V., PPP BSD Compression Protocol, (Aug. 1996), pp. 1-23.
Seybold Andrew M., Using Wireless Communications in Business, (1994), pp. 1-74.
Shoshani, A. et al., Information Retrieval, Synchronization in a Parallel-Accessed Data Base, Communications of the ACM, vol. 12, No. 11, (Nov. 1969), pp. 604-607.
Skarra Andrea, et al., A File System Interface for Concurrent Access, pp. 128-133.
Smolik, Thomas, An Object-Orientated File System—an Example of Using the Class Hierarchy Framework Concept, pp. 33-53.
Souvatzis, Ignatios, comp.protocols.ppp part 5 of 8 of frequently wanted information, (Nov. 20, 2006), pp. 1-13.
Tichy Walter F., Design, Implementation, and Evaluation of a Revision Control System, (1982) IEEE, pp. 58-67.
U.S. Dept. of Energy, CIAC Notes, (Apr. 21, 1994), pp. 1-14.
Walker, Bruce, et al., The LOCUS Distributed Operating System, (1983) ACM, pp. 49-70.
Google Search: MH Frequently Asked Questions (FAQ) with Answers, (Sep. 24, 2007), pp. 1-54.
SendMail FAQ, Section 6, (Nov. 20, 2006), pp. 1-13.
Satyanarayanan, M., Integrating Security in a Large Distributed System, ACM Transactions on Computer Systems, vol. 7, No. 3, (Aug. 1989), pp. 247-280.
Kistler, James J., et al., Disconnected Operation in the Coda File System, ACM Transactions on Computer Systems, vol. 10, No. 1, (Feb. 1992), pp. 3-25.
Hills Alex, et al., Wireless Data Network Infrastructure at Carnegie Mellon University, IEEE Personal Communications, 3(1), (Feb. 1996), pp. 1-14.
Satyanarayanan, M., Accessing Information on Demand at any Location, Mobile Information Access, IEEE Personal Communications, (Feb. 1996), pp. 26-33.

Satyanarayanan, M., et al., Coda: A Highly Available File System for a Distributed Workstation Environment, IEEE Transactions on Computers, vol. 39, No. 4, (Apr. 1990).
Satyanarayanan, M., Scalable, Secure, and Highly Available Distributed File Access, (May 1990), pp. 9-20.
Mummert Lily B., et al., Exploiting Weak Connectivity for Mobile File Access, SIGOPS (Dec. 1995), pp. 143-155.
Terry Douglas B., et al., Managing Update Conflicts in Bayou, a Weakly Connected Replicated Storage System, SIGOPS (Dec. 1995), pp. 172-183.
Demers, Alan, et al., The Bayou Architecture: Support for Data Sharing among Mobile Users, pp. 1-6.
Petersen, Karin, et al., Bayou: Replicated Database Services for World-wide Applications, pp. 175-280.
Crocker, David H., RFC822, Standard for the Format of ARPA Internet Text Messages, (Aug. 13, 1982), pp. 1-49.
British Telecom Press Notices, Message Link, British Telecommunications Engineering, vol. 4, Jan. 1986, 1 Pg.
Mobile Data Report, vol. 3, No. 15, Cue Combines Capabilities of Pagers, PCs for Voice Mail/E-Mail/Fax Alerts, Messages, (Apr. 22, 1991), pp. 1-12.
The Computer Law and Security Report, Technology Update, Cellular Radio, 5 CLSR, pp. 18-19.
Von Horst Spanyar, Tele-Laptop, Mobil den Wettbewerb Entscheiden, (1989), pp. 35-39.
Answer 37 of 104, Copyright 1994 IEEE, (Mar. 1989), vol. 7, No. 3, pp. 1-2.
Printout: GSM Report 03-42, Advanced MHS Access, (Jan. 20, 1989), pp. 1-14.
Message Handling System and Service Overview, (Jan. 8, 2007), pp. 3-74.
Crisp, Graham, et al., Proceedings, Third Nordic Seminar on Digital Land Mobile Radio Communication (Sep. 12, 1988-Sep. 15, 1998), Copenhagen, pp. 1-10.
Printout: The Alohanet, pp. 1-6.
Slewiorek, Daniel, et al., Computer Structures: Principles and Examples, McGraw-Hill Book Co., pp. 1-46, (1982).
Binder, Richard, et al., The Alohanet Menehune—Version II, (Sep. 1974), pp. 1-61.
Binder, Richard, Alohanet Protocols, (Sep. 1974), pp. 1-42.
Binder, Richard, A Simple Mixed-Traffic Technique for Ground-Based Aloha Channels, (Jan. 1975), pp. 1-9.
Binder, Richard, et al., The Alohanet Menehune—Version II, (Sep. 1974), pp. 1-10.
SAM Reference Manual, Teknow, Inc., Sep. 1989 Edition, pp. 1-182.
SAM Reference User's Manual, Teknow, Inc., (1987-1988).
SAM, Send Alphanumeric Pages From Your Computer, 8 Pgs.
SAM, AlphaBox, Add Alpha to Your Paging System Today!, 1 Pg.
Printout: Teknow!, pp. 1-5.
Motorola, Operating Instructions, For Your "PMR 2000" Series Display Radio Pagers Personal Message Center, pp. 1-25.
Printout: Teknow! Inc. and Celtronics Announce Full-Duplex Microwave Radio Link to the AlphaBox, (Mar. 20, 1990), 1 Pg.
Motorola, Operating Instructions, "PMR 2000" Series, POCSAG Alphanumeric Display Personal Message Receiver, pp. 1-18.
Motorola, PMR 2000 Personal Message Receiver, (1987), pp. 1-2.
FCC Radio Frequency Interference Statement, pp. 1-33, US Gov. Printing Office, 004-000-00345-Y.
AlphaBox, Add Alpha to Your Paging System Today!, Teknow!, pp. 1-2.
Ford, Gary E., Beginner's Guide to TCP/IP on the Amateur Packet Radio Network Using the KA9Q Internet Software, Version 1.0, (May 9, 1990), pp. 1-73.
Garbee, Bdale, The KA9Q Internet Software Package, (May 8, 1989), pp. 1-109.
Mayo, Jonathon L., Portable RTTY Operation, Say You Saw it in CQ, Portable RTTY Operation, (Nov. 1995), pp. 46-47.
Horzepa, Stan, Your Gateway to Packet Radio, (1987), pp. 1-7.
Clark, Tom, et al., PSR Quarterly, Packet Status Register, SAREX 2—Packet Radio From the Shuttle, Tucson Amateur Packet Radio Corporation, (Jan. 1986), pp. 2-4.
Verjinski, Richard D., PHASE, A Portable Host Access System Environment, IEEE (1989), pp. 806-809.

Cole, Robert, et al., An Architecture for a Mobile OSI Mail Access System, IEEE Journal on Selected Areas in Communications, vol. 1, No. 2, (Feb. 1989), pp. 249-256.
Quarterman, John S., et al., Notable Computer Networks, Communications of the ACM, vol. 29, No. 10, (Oct. 1986), pp. 932-971.
Berntson, Göran, Mobile Radio Systems Data Communication Systems, Ericsson Review No. 1, (1989), pp. 1-9.
Shoch, John F., et al., Interconnecting Local Networks via the Packet Radio Network, Sixth Data Communications Symposium, IEEE (Nov. 1979), pp. 153-158.
Braden, R., Requirements for Internet Hosts—Communication Layers, (Oct. 1989), pp. 1-115.
Braden, R., Requirements for Internet Hosts—Application and Support, (Oct. 1989), pp. 1-97.
Braden, R., et al., Requirements for Internet Gateways, (Jun. 1987), pp. 1-53.
Information Sciences Institute, Internet Protocol, DARPA Internet Program Protocol Specification, (Sep. 1981), pp. 1-49.
Postel, J., Internet Control Message Protocol, DARPA Internet Program Protocol Specification, (Sep. 1891), pp. 1-21.
Information Sciences Institute, Transmission Control Protocol, DARPA Internet Program Protocol Specification, (Sep. 1981), pp. 1-88.
Hinden, Robert, et al., The DARPA Internet Gateway, RFC823, (Sep. 1982), pp. 1-44.
Postel, J., Simple Mail Transfer Protocol, (Nov. 1981), pp. 1-62.
Postel, J., Address Mappings, (Sep. 1981), pp. 1-7.
Postel, J., User Datagram Protocol, (Aug. 28, 1980), pp. 1-3.
Clark, David, D., MIT Laboratory for Computer Science Computer Systems and Communications Group, IP Datagram Reassembly Algorithms, (Jul. 1982), pp. 1-8.
Plummer, David C., An Ethernet Address Resolution Protocol—or—Converting Network Protocol Addresses to 48.bit Ethernet Addresses for Transmission on Ethernet Hardware, (Nov. 1982), pp. 1-8.
Mogul, Jeffrey, Broadcasting Internet Datagrams, (Oct. 1984), pp. 1-8.
Gads, Toward an Internet Standard Scheme for Subnetting, (Apr. 1985), pp. 1-3.
Killian, E., Telnet Send-Location Option, (Apr. 1981), pp. 1-2.
Mokapetris, P., Domain Names—Concepts and Facilities, (Nov. 1983), pp. 1-30.
Mokapetris, P., Domain Names—Implementation and Specification, (Nov. 1983), pp. 1-73.
Henriksen, Terji, et al., Norwegian Telecommunications Administration Research Department Report No. 30/86, Mobile Data Network System Description, (Apr. 1986), pp. 1-165.
Kaspersen, Stig et al., TF-Report (Mar. 1989), Mobile Data Network Description, vol. 1.: Network Architecture, Addressing and Routing, pp. 1-58.
Kaspersen, Stig et al., TF-Report (Apr. 1989), Mobile Data Network Description, vol. 2.: Services and Service Elements, pp. 1-134.
Thorud, Geir Ivar, et al., TF-Report (May 1989), Mobile Data Network Description, vol. 3.: Protocols and Protocol Hierarchy within the MDN, pp. 1-146.
Thorud, Geir Ivar, et al., TF-Report (Jun. 1989), Mobile Data Network Description, vol. 4.: Specification and DTL and DTP within the MDN, pp. 1-107.
Kaspersen, Stig et al., TF-Report (Jul. 1989), Mobile Data Network Description, vol. 6.: Requirements to the Base Stations, pp. 1-49.
Kaspersen, Stig et al., TF-Report (Sep. 1989), Mobile Data Network Description, vol. 7.: Requirements to the Mobile Stations, pp. 1-33.
Thorud, Geir Ivar, et al., TF-Report (Aug. 1989), Mobile Data Network Description, vol. 8.: Specification of the MDN-MHS Interworking, pp. 1-136.
International Telecommunication Union, CCITT, The International Telegraph and Telephone Consultative Committee, Red Book, vol. 3, Fascicle VIII.7, Data Communication Networks Message Handling Systems, (Oct. 1984), pp. 1-790.
Comer, Douglas E., Internetworking with TCP/IP, Principles, Protocols, and Architecture, Dept. of Computer Science, Purdue University, Prentice Hall, (Apr. 11, 2005), pp. 1-13.
Tanenbaum, Andrew S., Computer Networks, Vriji Univerwity, Second Edition, Prentice Hall, (Apr. 11, 1989), pp. 1-5.

Newton, Harry, Newton's Telecom Dictionary, The Official Dictionary of Telecommunications, 14th Updated & Expanded Edition, (Mar. 1998), pp. 319, 580 & 680.
Socolofsky, T., A TCP/IP Tutorial, (Jan. 1991), pp. 1-28.
RFC Editor, et al., 30 Years of RFC's, (Apr. 7, 1999), pp. 1-17.
Priddy, Charles E., Telephony, Marketing a New System Entails some Trial and Error, and Changes, (Aug. 8, 1983), pp. 1-4.
Heinze Edward, Private- and Common-Carrier Paging, pp. 65, 68 & 73.
Telecom AM Digest, (Jan. 4, 1982), vol. 2: Issue 1, pp. 1-255.
SAMpage, Free Demo Disk, Send Messages From Your Computer to an Alphanumeric Pager with SAMpage, 2.0, (1984), pp. 1-17.
Martin, James, Communications Satellite Systems, (1978) by Prentice Hall, Inc., pp. 1-8.
Roberts, Lawrence, G., Extensions of Packet Communication Technology to a Hand Held Personal Terminal, pp. 1-4.
Cerf Vinton G., et al., Proceedings of the IEEE, Issues in Packet-Network Interconnection, (Nov. 1978), pp. 1-26.
Allman, Eric, Sendmail—An Internetwork Mail Router, pp. 1-13.
Zakon, R., Hobbes' Internet Timeline, (Nov. 1997), pp. 1-21.
Kahn, Robert E., et al., Advances in Packet Radio Terminology, pp. 1-28 (1978).
Kahn, Robert E., The Organization of Computer Resources into a Packet Radio Network, pp. 1-10 (1975).
Frank, Howard, et al., AFIPS Conference Proceedings, 1975 National Computer Conference, Packet Radio System—Network Considerations, (May 19, 1975-May 22, 1975), pp. 217-231.
Gifford, David K., The Application of Digital Broadcast Communication to Large Scale Information System, IEEE Journal in Selected Areas in Communications, vol. SAC-3, No. 3, May 1985, pp. 457-467.
Peatman, John B., Design with Microcontrollers, McGraw Hill, Inc. (1998), pp. 1-27.
An MHS-Related Service within the GSM, (May 1987), pp. 1-11, Source: Norway.
MHS Access for Users of Mobile Terminals via the PLMN, (Sep. 1987), pp. 1-3, Source: UK.
Trosby N., GSM 03.41, Technical Realization of Basic MHS Access, (Nov. 27, 1987), pp. 1-7.
Trosby N., GSM 03.42, Technical Realization of Advanced MHS Access, (Feb. 22, 1988), pp. 1-6.
Report from the DGMH Meeting, (Feb. 19, 1988-Feb. 24, 1988), pp. 1-23.
On GSM RBC. 03.42, (Oct. 24, 1988-Oct. 28, 1988), 1 Pg. (Paris).
Perkins, C., IP Mobility Support, (Oct. 1996), pp. 1-74.
Chapter 3, How Notes will Change You and Your Company, pp. 65-345.
Lotus Notes 4 Release, The Power of People Working Together, Database Manager's Guide, (1995), pp. 1-115.
Inter Notes 4 Release, Web Publisher, The Best Way to Create and Manage an Enterprise Web Site, InterNotes Web Publishers Guide, (1996), pp. 1-122.
Overview, What is Lotus NotesPump?, pp. 1-38.
NotesPump Administrator, How to Delete Documents, pp. 1-59, (Lotus—Doc 6).
Chapter 9, Enhance It!, Using Project Tracking, pp. 346-525, (Lotus—Doc 5).
Revision History, (1989, 1993, 1994), pp. 1-260, (Lotus—1994A).
Administrator's Guide, Resolving Replication Conflicts, pp. 1-249, (Lotus—1995B).
Lotus Notes 4 Release, Administrator's Guide, (1995), pp. 1-220.
Chapter 8: Using a Remote Connections, pp. 211-497, (Lotus—1995B).
Lotus, IBM, Secrets to Running Lotus Notes: The Decisions No One Tells You How to Make, International Technical Support Organization, First Edition, (Oct. 1996), pp. 1-193.
Spooner, John, B., Workgroup Computing, 3Com PalmPilot Gets Wireless Link for E-Mail, 1 Pg.
Sullivan, Kristina, Neteek, Have Your Pager Call My Pager, Buyers' Guide: Devices Gain Several New Capabilities, Thanks to Wireless Messaging Software, pp. 106, 110 & 113.
Arnum, Eric, HighBeam Research, Business Communications Review, The Universal Mailbox Arrives . . . Sort of. (unified messaging), (Mar. 1, 2007), pp. 1-6.
Company Overview, http: www.dtswireless.com/9_adts/91pg_adts.html, (Dec. 30, 1997), pp. 1-28.
Kramer, Matt, Wireless E-mail Services Gain Window Clients; RadioMail, Wynd Client Products Improve on Their DOS Forebears. , Apr. 17, 1995.
L6 Answer 5 of 99, Socket Communications, Inc.—History & Debt, (Feb. 28, 1998), 2 Pgs.
Mosher, Sue, Microsoft Exchange User's Handbook, 1st Edition, (1997), 5 pgs. ISBN: 1-882419-52-9.
L6 Answer 20 of 99, E-Mail Merges with Voice Through Infinite Technologies, vol. 17, No. 11, (May 26, 1998), 2 Pgs.
L6 Answer 27 of 99, Vodapage: Vodapage Demos Increasing Convergence of Pagers and Mobile Communication at TMA 29, (Nov. 28, 1996), 2 Pgs.
Louderback, Jim, PC Week, Mind the Gap, Products that Plug You in to Universal Access, (Nov. 10, 1997), p. 27.
Buckler, Grant, Computing Canada, A Virtually Perfect Briefcase for Road Warriors, (Mar. 30, 1998), p. 31.
Kramer, Matt, PC Week, Visto Briefcase Lets Users Travel Light, (Mar. 18, 1998), p. 44.
Kramer, Matt, PC Week, They're Here: Portable E-mail and Voice Mail (Electronic Mail) (The Wide View) (Column), (Feb. 12, 1990), pp. 1-2.
Greene Marvin, V., Black Enterprise, The Telecommunications Revolution, (Aug. 1997), pp. 38 & 42.
Perdue, Lewis, ProQuest, Wired on the Run, (Feb. 24, 1997), pp. 1-3.
Rubin, M., Thomson Gale, New Pagers and Message Systems Expand in Corporate Environment, (Aug. 1984), pp. 1-5.
Moore, Mark, PC Week, Networks & Services, Software, Services Take Web Wireless, (Jun. 17, 1996), pp. 48 & 56.
Visto Corporation, Launch Tour, (Oct. 1997), pp. 1-18.
Patterson, David A., et al., A Case for Redundant Arrays of Inexpensive Disks (RAID), (1988), pp. 109-116.
Levitt, Jason, Moving Mail with No Strings Attached: Users Love Wireless Electronicmail's Convenience, but the Technology is Limited in Many Ways, (Jan. 24, 1994), pp. 1-4.
Francett, Barbara, Thomson Gale, Software Magazine Replication on the Run (Database Vendors Addressing Bidirectional Replication for Mobile Computing Market) (Includes Related Article on Case Study of Becton Dickinson) (Technology Information), (Aug. 1996), pp. 1-6.
Fisher, Susan E., Investor's Business Daily, Renting: A New Option for Software Users, (Mar. 23, 1998), pp. 1-6.
Bernier, Paula, Google Search, AT&T Wireless Launches PocketNet for the Individual, (Oct. 12, 1997), pp. 1-5.
Quick, Gregory, Thomson Gale, Computer Retail Week, PDA Users Seek Wireless Solutions, (Industry Trend or Event), (Sep. 8, 1997), 4 Pgs.
Company Overview, http://www.dtswireles.com/9_adts/91pg_adts.html, (Dec. 30, 1997), 28 Pgs.
Feibus, Andy, Information Week Labs, A Desktop in Your Palm, (Aug. 24, 1997), 5 Pgs.
Behr, Alyson, Informationweek, Handheld Solutions, (Oct. 27, 1997), pp. 1-6.
Claxton, R.M., Messaging App's for Voice Networks, Telecommunications 1998, Mar. 29-Apr. 1, 1998, Conference Publication No. 451, IEEE 1998, pp. 116-120.
Egevang, K., The IP Network Address Translator (NAT), (May 1994), pp. 1-9.
Taylor, Mark S., et al., Internetwork Mobility, The CDPD Approach, (Jun. 11, 1996), 334 Pgs.
Briere, Daniel, et al., One Mailbox, Just Like Old Times, Network World, (Apr. 21, 1997), pp. 1-2.
Beck-Ruff, Cheryl, News Release, Motorola Everywhere, 4 Pgs, Jun. 14, 2001.
Kirstein, Allyson, News Release, Motorola Announces PageWriter™ 250, The World's Smallest Pager with Full Keyboard, (Feb. 27, 1997), pp. 1-2.
Dewey, Barney, Newton Technology Journal, Newton Directions, Communications Strategies for Newton 2.0, (Jun. 1996), 1 Pg.

Gifford, David K. et al., An Architecture for Large Scale Information Systems, (1985), pp. 161-170.
Dunker, Jessica et al., News Release, CE Software Announces Mobile Vision™, (Jan. 4, 1995), 3 Pgs.
Lee, Curtis et al., News Release, CE Software Announces Mobile Vision™, (Jan. 4, 1995), 3 Pgs.
Irving, Clay, Newton Reference, (1997), pp. 1-4.
PC Pro Issue 31: Realworld Computing, PDA Column, Real World Computing Paul Lynch—PDA's, (Jul. 9, 2001), pp. 1-7.
Mossberg, Walter S., The Wall Street Journal, Now There's a Way to Reach Your Files From all your PCs, (Apr. 2, 1998), pp. 1-2.
Woo, Thomas Y.C., et al., Providing Internet Services to Mobile Phones: A Case Study with Email, (1998) IEEE, pp. 99-105.
Cheek, Michael, Cell Phone Receives Wireless E-Mail, (AT&T's PocketNet, Post Office Protocol) (Evaluation), (Apr. 27, 1998), 1 Pg.
Wheelwright, Geof, National Post, Putting World of E-Mail in the Palm of Your Hand: New System from B.C.s Infowave Wireless Claims to be Answer to Problem of Staying in Touch from Remote Sites, (Aug. 9, 2007), 2 Pgs.
Walker, Christy, App Eases Wireless Mail. (Micro Computer Systems Inc. Calypso Wireless System) (Brief Article) (Product Announcements), (Jul. 28, 1997), 1 Pg.
Sullivan, Kristina B., "Message is Out About Wireless E-Mail (PC Week Netweek) (Buyers Guide)", (Mar. 13, 1995), 2 Pgs.
Stevens, Larry, "Go Wireless: Using E-Mail Without Phone Connections", MacWEEK, (Sep. 5, 1994), 2 Pgs.
Mason, Charles F., "Wireless Data Market Poised to Explode?", Telephony, (Jul. 11, 1994), 1 Pg.
Wilder, Clinton, CMP Computer Fulltext, Who Needs an Office?— VeriFone is a Model for Mobile Management as it Tears Down the Walls Wherever Workers Operate, (2006), 3 Pgs.
Strizich, Martha, QuickMail Goes Wireless (CE Software) (Brief Article) (Product Announcement), Macworld, (May 1994), 1 Pg.
Isaacson, Portia, E-Mail : Unplugged at Last, Computer Reseller News, (Mar. 28, 1994), 2 Pgs.
Isaacson, Portia, E-Mail + Radiomail = Ease of Use, Computer Reseller News, (Mar. 28, 1994), 2 Pgs.
McGuire, Mike, Wireless Debuts Steal Show; Envoy, Ardis Expand Massaging Markets. (Motorola Inc.'s Envoy Personal Digital Assistant) (Ardis' Personal Messaging Service) (Product Announcement), (Mar. 14, 1994), 1Pg.
Barney, Doug, Remote cc: Mail Client Goes Graphical, 2.0 Lets Windows Users Filter, Preview Mail. (Lotus Development Corp. Introduces cc: Mail Mobile for Windows 2.0 Electronic Mail System) (Brief Article) (Product Announcement), (Jan. 31, 1994), 1 Pg.
Kramer, Matt, A Pair of Wireless Systems Snip the E-Mail Ties that Bind, (Intel Corp.'s Wireless Modem and Da Vinci Systems Corp.'s Wireless Email Electronic Mail Software) (Hardware Review) (Evaluation), PCWeek, (Nov. 8, 1993), 2 Pgs.
ProQuest, Wireless Modems: Will E-Mail Soon be Everywhere?, Popular Science, vol. 243, Iss. 5, p. 47.
ProQuest, Networking Firms Promote Wireless E-Mail, Computer Dealer News, vol. 9, Iss. 22, (Nov. 1, 1993), 2 Pgs.
Wireless Modem, Wireless Email (Intel Corp.'s Modem and Da Vinci Systems Corp.'s Electronic-Mail Software Bundled with RAM Mobile Data's Mobidem Modem) (PC Week LABS Product of the Week) (Brief Article), (Oct. 18, 1993), 1 Pg.
Currid, Cheryl, ProQuest, Getting the Message, Network World, vol. 10, Iss. 42, (Oct. 18, 1993), 3 Pgs.
Welch, Nathalie, Intel's New Modem Spurring Wireless E-Mail Upgrades (Intel Wireless Modem) (Product Announcement), MacWEEK, (Sep. 27, 1993), 1 Pg.
Cc: Mail Goes Wireless (Lotus Development Corp.'s cc: Mail Wireless Pack Electronic Mail System) (Communications: New Products) (Brief Article) (Product Announcement), Government Computer News, (Sep. 20, 1993), 1 Pg.
Beckman, Mel, ProQuest, EMBARC, Software Reviews, Mobile Communications Network, Electronicmail systems, Macworld, vol. 10, Iss. 9, (Sep. 1993), 1 Pg.
Gerber, Cheryl, ProQuest, Wireless E-Mail Just Got Simpler, InfoWorld, (Aug. 2, 1993), vol. 15, Iss. 31, 1 Pg.
Arnum, Eric, Business Communications Review, Electronic Mail Broadens Its Horizons, (1993), pp. 28-32.

Currid, Cheryl, ProQuest, Wireless E-Mail Proves to be the (Radio) Wave of the Future, InfoWorld, (Feb. 1, 1993), vol. 15, Iss. 5, 2 Pgs.
Streeter, April, RadioMail Links the Internet to Ardis, Mobitex Wireless Nets (Introduces Software and Electronic Mail Gateways) (Gateways) (Product Announcement), MacWEEK, (Jan. 18, 1993), 1 Pg.
Wexler, Joanie M., ProQuest, Wireless E-Mail to Span U.S., Computerworld, (Nov. 2, 1992), vol. 26, Iss. 44, 2 Pgs.
Wexler, Joanie, Computerworld, E-Mail to Go Wireless; Service to Ease Remote Messaging to Mobile Users, (Oct. 26, 1992), pp. 1-2.
Padwick, Gordon, et al., Special Edition, Using Microsoft Outlook 97, pp. 1-6.
Press Release—Apple Computer, Apple Agrees to License Newton Technology to Schlumberger, Digital Ocean, (Nov. 3, 1995), pp. 1-3.
Mobile Vision Quick Guide Reference, Direct Wireless Connection to Your LAN-Based Electronic Mailbox, CE Software, (1995), pp. 1-21.
MobileVision, CE Software, First Edition, (1995), 49 Pgs.
Johnson, David B., Ubiquitous Mobile Host Internetworking, IEEE (1993), pp. 85-90.
Johnson, David B., Mobile Host Internetworking Using IP Loose Source Routing, (Feb. 1993), pp. 1-17.
Scheottle Bob, IP-Address Management on LANs, (Feb. 1996), pp. 1-5.
Yeom, Heon Y., IP Multiplexing by Transparent Port-Address Translator, USENIX, (Sep. 29, 1996-Oct. 4, 1996), pp. 113-121.
Johnson, David B., Scalable and Robust Internetwork Routing for Mobile Hosts, (1994), IEEE, pp. 1-11.
Roubelat, Jean Paul, Server and BBS Software for the Packet Radio, Multiports, Multiconnection, Multilingual, (Feb. 6, 1993), pp. 1-173.
Perkins, Charles, et al., IMHP: A Mobile Host Protocol for the Internet, Computer Networks and ISDN Systems, (1994), 7 Pgs.
Inouye, Jon, et al., Proceedings of the IEEE $7^{th}$ International Workshop on Network and Operating System Support for Digital Audio and Video, (May 19, 1997-May 21, 1997), pp. 135-146.
Bell Labs Technical Journal, vol. 2, No. 3, Summer 1997, 2 Pgs.
Lavana, Hemang, et al., Conference on Supporting Group Work, Internet Based Workflows: A Paradigm for Dynamically Reconfigurable Desktop Environments, (Nov. 16, 1997-Nov. 19, 1997), pp. 204-213.
Perkins, Charles E., et al., Mobility Support in IPv6, (1996) ACM, pp. 27-37.
Goldszmidt, German, et al., Globecom 97, IEEE Global Telecommunications Conference, Conf. Record 3 of 3, (Nov. 3, 1997-Nov. 8, 1997), ShockAbsorber: A TCP Connection Router, pp. 1919-1923.
IBM Technical Disclosure Bulletin, vol. 36, No. 8, (Aug. 1993), Personal Computer Environmental Control via a Proximity Sensor, pp. 343-345.
Xu, Kevin Houzhi, Reliable Stream Transmission Protocols in Mobile Computing Environments, Bell Labs Technical Journal, Summer 1997, pp. 152-163.
IBM Portable Terminal User's Guide $3^{rd}$ Edition, Digital Communications System, (Jun. 1985), 277 Pgs.
Sieworek, Section 5, Networks, pp. 387-447.
Krebs, Jay, Electronics (Aug. 25, 1983), Portable Computer and Host Talk Over Radio-Frequency Link, pp. 142-145.
CEPT/GSM/WP4, Paris, (Nov. 14, 1988-Nov. 18, 1988), Short Message Service and MHS (X.400) Access Within the GSM System, 1 Pg.
CEPT/GSM/WP4, Paris, (Nov. 14, 1988-Nov. 18, 1988), Report from the DGMH Meeting, 6 Pgs.
CEPT/CCM/GSM, (Jan. 13, 1989), Advanced MHS Access, 14 Pgs.
CEPT/GSM/WP4, Munich, (Jan. 16, 1989-Jan. 20, 1989), Covering Note to GSM 03-42 Version 2.0.0., 16 Pgs.
CEPT/CCH/GSM, (Jan. 20, 1989), Advanced MHS Access, 14 Pgs.
Trosby, Finn, et al., Message Communication Within the GSM System, 6 Pgs., (1989).
CEPT/CCH/GSM-WP1, (Apr. 2, 1986-Apr. 4, 1986), The Hague, Report of Working Party 1, 55 Pgs.
CEPT/CCH/GSM, (Nov. 18, 1988), Technical Realization of the Point-to-Point Short Message Service, 53 Pgs.
CEPT/GSM/WP4, Munich, (Jan. 16, 1989-Jan. 20, 1989),Cover Letter for Rec. GSM 03.40 Version 2.02.00, 121 Pgs.

CCITT, The International Telegraph and Telephone Consultative Committee, Blue Book, vol. VIII—Fascicle VIII.7, Data Communication Networks Message Handling Systems, (Nov. 14, 1988-Nov. 25, 1988), pp. 75-146.
CCITT, The International Telegraph and Telephone Consultative Committee, Blue Book, vol. VIII—Fascicle VIII.7, Data Communication Networks Message Handling Systems, (Nov. 14, 1988-Nov. 25, 1988), pp. 272-425.
CCITT, The International Telegraph and Telephone Consultative Committee, Blue Book, vol. VIII—Fascicle VIII.7, Data Communication Networks Message Handling Systems, (Nov. 14, 1988-Nov. 25, 1988), pp. 426-501.
CCITT, The International Telegraph and Telephone Consultative Committee, Blue Book, vol. VIII—Fascicle VIII.7, Data Communication Networks Message Handling Systems, (Nov. 14, 1988-Nov. 25, 1988), pp. 502-542.
CCITT, The International Telegraph and Telephone Consultative Committee, Blue Book, vol. VIII—Fascicle VIII.7, Data Communication Networks Message Handling Systems, (Nov. 14, 1988-Nov. 25, 1988), pp. 543-628.
L3EG Meeting Bonn (Apr. 20, 1988), Report of the Sub-Group Network Layer Model, 6 Pgs.
CEPT/GSM/WP4, (Jan. 18, 1988-Jan. 22, 1988), Draft Letter, Short Messages and Problems with TCH Release, 1 Pg.
CEPT/CCH/GSM/WP4, (Jan. 18, 1988-Jan. 22, 1988), Split of Responsibility Between WP3 and WP4 within the Work on Short Message, pp. 1-4.
Doc GSM4 24/90, Rev. 5, 7 Pgs., Alphanumeric Content in the Address Field, (May 11, 1990).
ETSI/GSM4, Berlin, Suggestion About a New Work Item on the Short Message Service for GSM Phase 2, Recommended MS Reply Procedures, (Sep. 14, 1990).
ETSI/STC/GSM4, Berlin, Holding up SC/MS Connections for Multiple Message Transfer, (Sep. 10, 1990-Sep. 14, 1990), pp. 1-2.
ETSI/GSM4, Berlin, Proposed Text for GSM Recommendation 09.06, (Sep. 1990), 23 Pgs.
ETSI-STC/GSM4, Berlin, The Technical Solution for Allowing Multiple Short Messages Transfer, (Sep. 10, 1990-Sep. 14, 1990), 1 Pg.
Norway, Draft REC GSM 04.11, Version 0.0.1, 35 Pgs., (1988).
CEPT, GSM WP4, 7$^{th}$ Meeting, Paris, (Feb. 1998), Split of Responsibility Between WP3 and WP4, 13 Pgs.
CEPT, GSM WP4, 7$^{th}$ Meeting, Paris, (Feb. 22, 1988-Feb. 25, 1988), Correct Classification of Basic MHS Access, 1 Pg.
CEPT, GSM WP4, 7$^{th}$ Meeting, Paris, (Feb. 22, 1988-Feb. 25, 1988), Short Message Service Description, 4 Pgs.
WP3/L3EG, Turin, (Nov. 27, 1987), Short Message Service—Split of Responsibility, 2 Pgs.
A SDL Description of the MT/PP Short Message Service Layer 3 Procedures, (Dec. 1987), p. 1.
Report of the DGMH Meeting in Bonn, Nov. 24-26, 1987, 11 Pgs.
CEPT/CCH/GSM, Short Message Service, (Nov. 27, 1987), 13 Pgs.
CEPT/CCH/GSM, Minutes of WP4 Meeting in Nov. 23-27, 1987, (Jan. 13, 1988).
CEPT/CCH/GSM/WP4, Bonn, Action Plan for WP4, (Nov. 27, 1987), 4 Pgs.
ETSI/TC GSM, Update Note, Recommendation GSM 03.40, Technical Realization of the SMS Point-to-Point, (Jan. 1991), 25 Pgs.
ETSI/GSM, Technical Realization of the Short Message Service—Cell Broadcast (Jan. 1991), 16 Pgs.
ETSI/TC GSM, Release Note, Technical Realization of Advanced Data MHS Access (Mar. 1990), 32 Pgs.
ETSI/GSM, Change Request, Technical Realization of the Short Message Service—Point-to-Point, (Dec. 11, 1989-Dec. 15, 1989), 6 Pgs.
CEPT/CCH/GSM, Status Report of WP4, Helsinki, (Jun. 20, 1988-Jun. 23, 1988), 4 Pgs.
CEPT/CCH/GSM, Paris, Change Request, Additions and Modifications to GSM 07.01, (Oct. 24, 1988-Oct. 28, 1988), 26 Pgs.
ETSI/TC GSM, Corfu, Status Report of GSM4, GSM, (Oct. 1, 1990-Oct. 5, 1990), 5 Pgs.
ETSI/GSM, Corfu, Change Request, Technical Realization of the Short Message Service—Point-to-Point (Oct. 1, 1990-Oct. 5, 1990), 20 Pgs.
ETSI/STC/GSM, Vienna, Change Request (May 13, 1991-May 17, 1991), Confirmation Capabilities within SMS-PP, 29 Pgs.
GSM 02.03—Version 3.4.0-13, Annex to the Datasheet of Teleservice 21, "Short Message MT/PP", Teleservice 22 "Short Message MO/PP" and Teleservice 23 "Cell Broadcast Short Messages", 2 Pgs.
ETSI/STC GSM4, Paris, Interworking with Paging Systems for SMS/PP, (Dec. 3, 1990-Dec. 7, 1990), 1 Pg.
ETSI/STC GSM4, Paris, Short Message Service (Dec. 3, 1990-Dec. 7, 1990), 19 Pgs.
ETSI/STC GSM4, Bonn, Change Request to Delete GSM 03.40 Annex 1 and to Produce a GSM Report Covering SC/MSC Protocol Examples (Dec. 2, 1991-Dec. 6, 1991), 40 Pgs.
GSM/WP4, Change Request No. 03.41-2, Modification to SMS Cell Broadcase to Allow Concatenation, to Reserve Message Identifiers, and to Identify the Language Used in the Message (May 24, 1989), 6 Pgs.
CEPT/CCH/GSM-WP1, Bonn, Length of Short Message (Teleservices 21, 22, 23 in GSM 02.03), (Mar. 7, 1988-Mar. 11, 1988), 1 Pg.
CEPT/CCH/GSM/WP4, Sweden, Service Center Funtionality.
WP4 Doc 116/88, Revision 1, Report from the DGMH Meeting on the Short Message Service, Oslo, Mar. 16, 1988-Mar. 17, 1988, pp. 1-24.
GSM/WP4, Firenze, Apr. 5, 1988-Apr. 9, 1988, On the Relationship of the SC and the PLMN, 1 Pg.
GSM/WP4, Firenze, Apr. 5, 1988-Apr. 9, 1988, Comments on Network Architecture Scenarios for the Short Message Service, 4 Pgs.
CEPT/GSM IDEG, Bonn, (Oct. 26, 1987-Oct. 31, 1987), Draft Recommendation 07.01, General (On Terminal Adaptors for Mobile Stations), 4 Pgs.
CEPT GSM IDEG, Bonn, (Oct. 26, 1987-Oct. 30, 1987), Architectural Aspects of Data Transmission, 14 Pgs.
Report from the 2$^{nd}$ Meeting of DGMH to IDEG, 5 Pgs.
CEPT/CCH/GSM/WP4, Minutes of the WP4 Meeting in Florence, Apr. 5, 1988-Apr. 8, 1988, (May 14, 1988), 24 Pgs.
CEPT/GSM/WP4, Florence, Liason Statement to SPS-SIG, Support of Short Message Services in the GSM System, (Apr. 5, 1988-Apr. 8, 1988), 4 Pgs.
CEPT/CCH/GSM/PN, Status of GSM Recommendations, (May 26, 1988).
Norway, Protocols and Interworking for SMS, 8 Pgs., (1988).
CEPT/GSM/WP4, Report from the DGMH Meeting in HeckField, (May 3, 1988-May 6, 1988), 29 Pgs.
WP4 186/88, (Jun. 30, 1987), Adopted European Standard, 23 Pgs.
CEPT/GSM/WP4, Gothenburg, Proposal to Split the Specification of the Short Message Service (SMS) into Two Separate Recommendations, (May 30, 1988-Jun. 3, 1988), 1 Pg., Rev. 1.
CEPT/GSM/WP4, Proposal to Split the Specification of the Short Message Service (SMS) into Two Separate Recommendations, (May 30, 1988-Jun. 3, 1988), 9 Pgs.
GSM/WP4/DGMH, Annex to the Datasheet of Teleservice 21, "Short Message MT/PP", Teleservice 22 "Short Message MO/PP" and Teleservice 23 "Cell Broadcast Short Messages", pp. 11-14, (1988).
CEPT/GSM/WP4, Oslo, The Need for a Short Message application Module, (Sep. 19, 1988-Sep. 23, 1988), 2 Pgs.
CEPT/CCH/GSM/WP4, Oslo, Short Message Service—Cell Broadcast, (Sep. 19, 1988-Sep. 23, 1988), 9 Pgs.
CEPT/CCH/GSM, Advanced MHS Access, (Sep. 19, 1988, 11 Pgs.
CEPT/CCH/GSM/WP4, Report from the DGMH Meeting in Oslo Sep. 22-22, 1988, (Sep. 19, 1988-Sep. 23, 1988), 9 Pgs.
CEPT/CCH/GSM/WP4, Oslo, Support of the Short Message Mobile Terminated Point-to-Point Service in GSM Mobile Stations, (Sep. 19, 1988-Sep. 23, 1988), 2 Pgs., Rev. 2.
Message Functional Definitions and Content, WP3 Meeting, Oslo, Nov. 1-4, 1987, 91 Pgs.
CEPT GSM, Working Party 3, The Hague, Dec. 7-10, 1987, Draft Status Report Draft Rec. 04.08, 2 Pgs.
CEPT/CCH/GSM/WP3, Stockholm, Apr. 21-24, 1987, Draft Recommendation 10-02. Technical Realization of the Mobile Terminated Point to Point Short Message Service, (Apr. 1987), 12 Pgs.
CEPT/GSM/WP3, Stockholm, Apr. 1987, Implementation of Data Services, 18 Pgs.

GSM WP3, Norway, Interfacing of Message Handling Systems to the GSM System, pp. 1-3.
CEPT GSM, IDEG, Heckfield, Jul. 6-8, 1987, Mandate for the Drafting Group on Message Handling, 1 Pg.
CEPT GSM, WP3 IDEG, Heckfield, Jul. 6-8, 1987, On Messaging Handling Services and Short Message Service, 4 Pgs.
CEPT GSM, WP3 IDEG, Heckfield, Jul. 6-8, 1987, On Messaging Handling Services and Short Message Service, 1 Pg.
CEPT/CCH/GSM/ WP3/IDEG, Sep. 8-11, 1987, Mobile Station Classmark Requirements—Introduction, pp. 1-3.
CEPT/CCH/GSM/ WP3/IDEG, Sep. 7-11, 1987, Helsinki, Action Plan for IDEG, (Sep. 14, 1987).
CEPT/GSM, Sep. 7-11, 1987, Helsinki, Draft Agenda for the Third Meeting, 1 Pg.
Hillebrand, Friedhelm, CEPT Standard for European Mobile Communication Services, (Mar. 20, 1987), 35 Pgs.
CEPT/CCH/GSM, Report from Meeting No. 13, Funchel, (Feb. 16, 1987), 2 Pgs.
Distribution of Rec. GSM 03.40 Version 2.01.01, (Dec. 28, 1988), 1 Pg.
ETSI/STC-GSM4, Report of the GSM4 (GSM/WP4) Meeting in Athens (Vouliagmeni), May 22-24, 1989, pp. 1-16.
CEPT GSM WP4, Jan. 16-20, 1989, The Proposal to Modify the Primitives and PDU's in Sections 10.2 and 10.3 in GSM 03.40, pp. 1-4.
CEPT/GSM/ WP4, Munich, Jan. 16-20, 1989, Proposed New Section 10.2.5 within Rec GSM 03.4, 4 Pgs.
CEPT/GSM/ WP4, Jan. 16-20, 1989, Minutes from Sub-DGMH Meeting in Oslo on Jan. 9, 1989 on the Use of ASN.1 for SMS, pp. 1-2.
CEPT/GSM/ WP4, Jan. 16-20, 1987, Proposed New Sections from 10.3.5 up to Section 11 with in Rec GSM 03.40, 7 Pgs.
CEPT/GSM/ WP4, Jan. 16-10, 1989, Proposed New Sections from 10.3.5 up to Section 11 within Rec GSM 03.40, 6 Pgs.
CEPT/GSM/ WP4, Jan. 16-20, 1989, Proposed New Sections 3.2 and 3.3 within Rec GSM 03.40, 5 Pgs.
CEPT/CCH/GSM/WP4, Nov. 14-18, 1988, Report of the WP4 Meeting in Paris, pp. 1-13.
CEPT/CCH/GSM/WP4, Minutes of the WP4 Meeting Paris, Feb. 22-25, 1988, (Mar. 17, 1988).
PR Newswire, Highbeam Research, Infowave Solves Multiple E-Mail Address Problem, (Jan. 21, 1997), pp. 1-2.
PR Newswire, Highbeam Research, Infowave Office Enabler Brings Wireless to Corporate Messaging Systems, (Mar. 3, 1997), pp. 1-2.
Lewis, Ted, Editor-in-Chief's Message, Computer, (May 1994), pp. 6-7.
Robertson, Bruce, (Nov. 1, 1994), Copyright 1994 CMP Publications, Inc. Network Computing, Mail Mobile Offers Best of Remote World, pp. 1-2.
Parker, Tammy, Computer Technology News, Mobile Wireless Internet Technology Faces Hurdles, (1998), pp. 12-14.
Postogna, F., et al., Wireless Networking in Africa, pp. 1-5, (Linux Journal #56, Dec. 1998).
Fladger, Barry, et al., Visto Training Manual, Version 1, (Oct. 23, 1997), pp. 1-17.
Introducing Visto Corporation & The Visto Briefcase, (Feb. 1998), pp. 1-12.
Khan, Mobeen, et al., Mobitex and Mobile Data Standards, IEEE Communications Magazine, (Mar. 1995), pp. 96-101.
Strom, David, Mobile Computing Comes of Age, (Apr. 13, 2007), pp. 1-12.
Gadol, Steve, et al., Nomadic Tenets—A User's Perspective, (Jun. 1994), pp. 1-16.
Salamone Salvatore, BYTE.com, Many Obstacles Still Hinder Wireless Communications, but Expanded Service Offerings and New Development Tools Are Helping, (Jun. 1995), pp. 1-7.
Ahmad Tahir, et al., The DIANA Approach to Mobile Computing, pp. 1-14.
Goodfellow, Geoff, Ericsson GE Slashes Prices on Two Wireless Data Products by Over 40 Percent, (Jan. 25, 1993), 2 Pgs.
Business Wire, ARDIS Joins Wireless Messaging Initiative for Microsoft Exchange Server, (Oct. 5, 1995), 2 Pgs.
Woods, Greg, Goggle Search, Comp.Mail.Sendmail, Alias Updates, (Apr. 25, 1990), pp. 1-3.
Gerber, Barry, Mastering Microsoft Exchange Server 5 $2^{nd}$ Edition, 843 Pgs.
Bixby, Mark, Google Search, Comp.Mail.Misc, Announce: Aliserv v1.0, Self Serve E-Mail Aliases, (Mar. 24, 1994), pp. 1-2.
Campbell, Stephen, Campus Email for Everyone: Making It Work in Real Life, (Feb. 1994), 12 Pgs.
Egevang, K., The IP Network Address Translator (NAT), (May 1994), pp. 1-10.
Gelber, David, The BlitzMail Protocol, (Jan. 5, 1998), pp. 1-55.
Ismangil, Perry, Google Search, Comp.Mail.Misc., Procmail Unwatendly Changes the from During Forwarding, (Feb. 21, 1997), pp. 1-6.
Knowles, Brad, Comp.Mail.Sendmail Frequently Asked Questions, http://www.sendmail.org/ca/email/sendmailv8.html, (Mar. 24, 1997), pp. 1-49.
Meinel Carolyn, P., Guides to (Mostly) Harmless Hacking, vol. 1, http://www.networksplus.net/kelly/gtmhh1.html, 48 Pgs.
Peck, Jerry, Header Fields and Addresses: MH & nmh: Email for Users & Programmers, http:/rand-mh.sourceforge,net/book/mh/hea.html, (Jan. 24, 2007), 9 Pgs.
Rose, M., Post Office Protocol—Version 3, (Nov. 1998), http://www.ietf.org/rfc/rfc1081.txt?number=1081, pp. 1-15.
Crispin, M., Interactive Mail Access Protocol—Version 2, (Aug. 1990), http://ww.ietf.org/rfc/rfc1176.txt?number=1176, pp. 1-29
Rice, J., Interactive Mail Access Protocol—Version 3, (Feb. 1991), http://ww.ietf.org/rfc/rfc1203.txt?number=1203, pp. 1-46.
Rose, M., Post Office Protocol—Version 3, (May 1991), http://www.ietf.org/rfc/rfc1225.txt?number=1225, pp. 1-15.
Klensin, J., et al., SMPT Service Extensions, (Feb. 1993), http://www.ietf.org/rfc/rfc1425.txt?number=1425, pp. 1-10.
Myers, J., et al., Post Office Protocol—Version 3, (Nov. 1994), http://www.ietf.org/rfc/rfc1725.txt?number=1725, pp. 1-17.
Crispin, M., Internet Message Access Protocol—Version 4, (Dec. 1994), http://www.ietf.org/rfc/rfc1730.txt?number=1730 pp. 1-72.
Crispin, M., Distributed Electronic Mail Models in IMAP4, (Dec. 1994), http://www.ietf.org/rfc/rfc1733.txt?number=1733 pp. 1-3
Klensin, J., et al., SMPT Service Extensions, (Nov. 1995), http://www.ietf.org/rfc/rfc1869.txt?number=1869, pp. 1-11.
Crispin, M., Internet Message Access Protocol, (Dec. 1996), http://www.ietf.org/rfc/rfc2060.txt?number=2060 pp. 1-77
Novo, RD, Welcome to About This Particular Macintosh 1.06, (Sep. 6, 1995), 28 Pgs.
Garfinkel, Simson, Electrosphere, Wireless Gets Real, Wired (Oct. 1997), 6 Pgs.
Hardy, Ian R., Email History, (May 13, 1996), pp. 1-60.
Myers, J., Local Mail Transfer Protocol, (Oct. 1996), http://ietf.org/rfc/rfc2033.txt., (May 22, 2007), pp. 1-7.
Newton Source, Personal Power Outlet, We've Got Your Number, We'd Like to Give You Ours, 64 Pgs.
Crocker, David H. et al, Standard for the Format of ARPA Network Text Messages (1), (Nov. 21, 1977). pp. 1-38.
Sluizer, S., Mail Transfer Protocol: ISI TOPS20 Implementation, (Jul. 1981), pp. 1-3.
Postel, Jonathan B., Simple Mail Transfer Protocol, (Aug. 1982), pp. 1-67.
Meinel, Carolyn P., The Happy Hacker, A Guide to (Mostly) Harmless Computer Hacking, (1988), 183 Pgs.
Meinel, Carolyn, Hacker Humor, (Sep. 1997), 86 Pgs.
Bass, Tim, et al., E-Mail Bombs and Countermeasures: Cyber Attacks on Availability and Brand Integrity, IEEE Network (Mar. 1998-Apr. 1998), pp. 10-17.
Hild, Stefan G. et al., Mobilizing Applications, IEEE Personal Communications, (Oct. 1997), pp. 26-34.
Blodgett, Mindy, ProQuest, Computerworld, vol. 30, Iss. 48, Windows CE Gets Vendor Support, (Nov. 25, 1996), pp. 1-2.
Bloodaxe, Erik, Phrack Magazine, vol. 5, Issue Forty-Six, File 8 of 28, The Wonderful World of Pagers, (May 21, 2007), pp. 1-9.
Caton, Michael, PC Week, Small Gains in Trio of Tiny Systems, (Nov. 18, 1996), p. 170.
Churbuck, David, ProQuest, Forbes, Never Did I Think I'd Welcome a Flight Delay, (Oct. 12, 1992), pp. 1-2.

Coursey, David, ProQuest, InforWorld, vol. 14, Iss. 37, GE's Wireless E-Mail: "The Next Best Thing to Magic", (Sep. 14, 1992), pp. 1-2.
Eckerson, Wayne, Enterprise Applications, Will Wireless Messaging Be "Killer Application" of '90s?, Network World, (Dec. 7, 1992), 3 Pgs.
Cochran, Richard, Comp.Sys.Palmtops HP100LX Frequently Asked Questions., http://www.faqs.org/faqs/hp/palmtops-faq/, (May 21, 2007), pp. 1-26.
HP200LX Frequently Asked Questions, Oct. 12, 1997, http://www.hplx.net/faq.txt, (May 21, 2007), pp. 1-12.
Filtering Mail FAQ, Oct. 4, 1996, www.faqs.org/faqs/mail/filtering-faq, (May 21, 2007), pp. 1-24.
Lavallee, Wendy J., ProQuest, Wireless Give Professionals Ways to Boost Productivity, (Apr. 1993). pp. 1-3.
Louderback, Jim, Thompson Gale, PC Week v.9n38, Wireless E-Mail Could Cause a Quiet Revolution, (Mind the Gap), (Column), (Sep. 21, 1992), pp. 1-2.
Louderback, Jim, PC Week, The Best Gap-Closing Products of The Past Year, (Dec. 28, 1992-Jan. 4, 1993), 1 Pg.
Moeller Michael, PC Week, PDA Software Offers LAN E-Mail Access, (Dec. 12, 1994), 1 Pg.
O'Brien, Jim, Thompson Gale, PC Week v.12n12, Hot off the Wire (Ericsson GE's Co.'s Viking Express Includes Cellular Modem, Palmtop Computer, Communications Software, Electronic Mail Service) (Hardware Review), (Online), (Dec. 1992), pp. 1-3.
Plavnicky, Ricky M., et al., Google Search, Comp.Sys.Palmtops, Internet Mail via Radio Link @ PC-Expo, (Jun. 30, 1992), pp. 1-2.
Shaffer, Richard A., ProQuest, Forbes, Express Mail, New Style, (Mar. 1, 1993), pp. 1-2.
Smith Norris Parker, In Competitive Whirlwind, Wireless E-Mail Becomes Reality, http://taborcommunications.com/archives/349.html, (Jun. 4, 1993), pp. 1-3.
Smith Norris Parker, Wireless Communications: Mightier Than the Pen?, http://taborcommunications.com/archives/302.html, (Feb. 19, 1993), pp. 1-5.
Sullivan, Kristina B., PC Week/NetWeek, Message is Out About Wireless E-Mail, (Mar. 13, 1995), 2 Pgs.
Willmott Don, PC Magazine, Where's the Wire? Ericsson Modem Goes Anywhere, (Oct. 27, 1992), 1 Pg.
Wexler, Joanie, Network World, Smart Phones, PDA's are Getting Smarter, (Apr. 1, 1996), p. 123.
Yamada, Ken, Thompson Gale, Computer Reseller News 677, Motorola to Unveil Updated Envoy (Envoy Personal Communicator) (Product Announcement) (Apr. 1, 1996), pp. 1-2.
Goodfellow, Geoffrey S., Real World Services for the Technological Elite, http://iconia.com/TELECOMDigestV2.33.txt, (Mar. 17, 1982), pp. 1-2.
Salkintzis, Apostolis K., et al., Mobile Packet Data Technology: An Insight into Mobitex Architecture, IEEE Personal Communications, (Feb. 1997), pp. 10-18.
Blankenhorn, Dana, LookSmart, Ericsson GE in Development Deal with Anterior and RIM—Anterior Technology—Research in Motion, Nov. 20, 1991, p. 1 of 1.
Frisk, Mats, Personal Air Communications Technology—pACT, Ericsson Review No. 1, (1997), pp. 4-13.
Li, Yalun, et al., Supporting Personal Mobility for Nomadic Computing Over the Internet, Mobile Computing and Communication Review, vol. 1., No. 1, pp. 22-31.
Iellimo, Albert Jr., PDAs the Next Gereration, Network World Fusion, (Mar. 13, 1995), pp. 1-7.
Harmer, Julie, Mobile Aware Multimedia Applications for UMTS: The ACTS on the Move Project, (1997), IEEE, pp. 539-543.
Laporta, Thomas F., et al., Challenges for Nomadic Computing: Mobility Management and Wireless Communications, Mobile Networks and Applications (1996), pp. 3-16.
Satyanarayanan, M., Workshop on Mobile Computing Systems and Applications (Dec. 1994), pp. 4-12.
Black, Andrew et al., System Support for Mobility, pp. 129-132.
Chen, Ling-Sheng, Apply Personal Mobility in PCS Environment for Universal Personal Communications, (1996), pp. 503-507.
Desimone, Antonio, Wireless Data: Systems, Standards, Services, Wireless Networks 1, (1995), pp. 241-253.

Seven Networks, Inc.'s Motion for Summary Judgment of Non-Infringement of Claims 1, 11, and 22 of U.S. Patent No. 6,085,192; filed Mar. 10, 2006 in the US District Court for the Eastern District of Texas Marshall Division; Civil Action No. 2:03-CV-333-TJW; *Visto Corporation v. Seven Networks, Inc.*
Declaration of James C. Pistorino in Support of Seven Networks, Inc.'s Motion for Summary Judgment of Non-Infringement of Claims 1, 11, and 22 of U.S. Patent No. 6,085,192; and Exhibits A-E; filed Mar. 10, 2006 in the US District Court for the Eastern District of Texas Marshall Division; Civil Action No. 2:03-CV-333-TJW; *Visto Corporation v. Seven Networks, Inc.*
Order; filed Mar. 10, 2006 in the US District Court for the Eastern District of Texas Marshall Division; Civil Action No. 2:03-CV-333-TJW; *Visto Corporation v. Seven Networks, Inc.*
Hocker Declaration Exhibit F; filed May 27, 2005 in the US District Court for the Eastern District of Texas Marshall Division; Civil Action No. 2:03-CV-333-TJW; *Visto Corporation v. Seven Networks, Inc.*
Seven Networks, Inc.'s Motion for Summary Judgment; filed May 27, 2005 in the US District Court for the Eastern District of Texas Marshall Division; Civil Action No. 2:03-CV-333-TJW; *Visto Corporation v. Seven Networks, Inc.*
Declaration of James M. Anderson III in Support of Seven Networks, Inc.'s Motion for Summary Judgment; filed May 27, 2005 in the US District Court for the Eastern District of Texas Marshall Division; Civil Action No. 2:03-CV-333-TJW; *Visto Corporation v. Seven Networks, Inc.*
Declaration of Matthew E. Hocker Support of Seven Networks, Inc.'s Motion for Summary Judgment; and Exhibits A-N; filed May 27, 2005 in the US District Court for the Eastern District of Texas Marshall Division; Civil Action No. 2:03-CV-333-TJW; *Visto Corporation v. Seven Networks, Inc.*
[Proposed] Order; filed May 31, 2005 in the US District Court for the Eastern District of Texas Marshall Division; Civil Action No. 2:03-CV-333-TJW; *Visto Corporation v. Seven Networks, Inc.*
Opposed Motion for Leave to File the Supplemental Declaration of Matthew E. Hocker in Support of Seven Networks, Inc.'s Motion for Summary Judgment to Submit Testimony by Visto's Expert Steven Beckhardt on the Invalidity of the Claims in Suit; and Exhibit O; filed Jun. 9, 2005 in the US District Court for the Eastern District of Texas Marshall Division; Civil Action No. 2:03-CV-333-TJW; *Visto Corporation v. Seven Networks, Inc.*
Supplemental Declaration of Matthew E. Hocker in Support of Seven Networks, Inc.'s Motion for Summary Judgment to Submit Testimony by Visto's Expert Steven Beckhardt on the Invalidity of the Claims in Suit; filed Jun. 9, 2005 in the US District Court for the Eastern District of Texas Marshall Division; Civil Action No. 2:03-CV-333-TJW; *Visto Corporation v. Seven Networks, Inc.*
Order; filed Jun. 9, 2005 in the US District Court for the Eastern District of Texas Marshall Division; Civil Action No. 2:03-CV-333-TJW; *Visto Corporation v. Seven Networks, Inc.*
Seven Networks, Inc.'s Reply in Support of Its Motion for Summary Judgment; filed Jul. 5, 2005 in the US District Court for the Eastern District of Texas Marshall Division; Civil Action No. 2:03-CV-333-TJW; *Visto Corporation v. Seven Networks, Inc.*
Declaration of Matthew E. Hocker in Support of Seven Networks, Inc.'s Reply in Support of Its Motion for Summary Judgment; and Exhibits A and B; filed Jul. 5, 2005 in the US District Court for the Eastern District of Texas Marshall Division; Civil Action No. 2:03-CV-333-TJW; *Visto Corporation v. Seven Networks, Inc.*
Reply Brief in Support of Visto Corporation's Motion for Partial Summary Judgment; filed Jul. 5, 2005 in the US District Court for the Eastern District of Texas Marshall Division; Civil Action No. 2:03-CV-333-TJW; *Visto Corporation v. Seven Networks, Inc.*
Seven Networks, Inc.'s Renewed Motion for Judgment as a Matter of Law on Noninfringement and Invalidity or, in the Alternative, for a New Trial; and Exhibit A-K; filed Jun. 2006 in the US District Court for the Eastern District of Texas Marshall Division; Civil Action No. 2:03-CV-333-TJW; *Visto Corporation v. Seven Networks, Inc.*
Declaration of James C. Pistorino in Support of Seven Networks, Inc.'s Renewed Motion for Judgment as a Matter of Law on Noninfringement and Invalidity or, in the Alternative, for a New Trial; filed Jun. 2006 in the US District Court for the Eastern District of Texas Marshall Division; Civil Action No. 2:03-CV-333-TJW; *Visto Corporation* v. *Seven Networks, Inc.*

Visto Corporation's Response in Opposition to Seven Networks, Inc.'s Renewed Motion for Judgment as a Matter of Law on Noninfringement and Invalidity or, in the Alternative, for a New Trial; and Exhibits A-M; filed in the US District Court for the Eastern District of Texas Marshall Division; Civil Action No. 2:03-CV-333-TJW; *Visto Corporation* v. *Seven Networks, Inc.*

Declaration of Shawn G. Hansen in Support of Visto Corporation's Response in Opposition to Seven Networks, Inc.'s Renewed Motion for Judgment as a Matter of Law on Noninfringement and Invalidity or, in the Alternative, for a New Trial; filed in the US District Court for the Eastern District of Texas Marshall Division; Civil Action No. 2:03-CV-333-TJW; *Visto Corporation* v. *Seven Networks, Inc.*

Visto Corporation's Sur-Reply in Support of Its Response in Opposition to Seven Networks, Inc.'s Renewed Motion for Judgment as a Matter of Law on Noninfringement and Invalidity or, in the Alternative, for a New Trial; Appendix 1; and Exhibits A and B; filed Jul. 2006 in the US District Court for the Eastern District of Texas Marshall Division; Civil Action No. 2:03-CV-333-TJW; *Visto Corporation* v. *Seven Networks, Inc.*

Seven Networks' Renewed Motion for Judgment as a Matter of Law or, in the Alternative, Supplemental Motion for a New Trial; filed Aug. 29, 2006 in the US District Court for the Eastern District of Texas Marshall Division; Civil Action No. 2:03-CV-333-TJW; *Visto Corporation* v. *Seven Networks, Inc.*

Declaration of Jason T. Anderson in Support of Seven Networks' Renewed Motion for Judgment as a Matter of Law or, in the Alternative, Supplemental Motion for a New Trial; and Exhibits A-D; filed Aug. 29, 2006 in the US District Court for the Eastern District of Texas Marshall Division; Civil Action No. 2:03-CV-333-TJW; *Visto Corporation* v. *Seven Networks, Inc.*

Order; filed Aug. 29, 2006 in the US District Court for the Eastern District of Texas Marshall Division; Civil Action No. 2:03-CV-333-TJW; *Visto Corporation* v. *Seven Networks, Inc.*

Visto Corporation's Response in Opposition to Seven Networks, Inc.'s Renewed Motion for Judgment as a Matter of Law or, in the Alternative, Supplemental Motion for a New Trial; Appendix 1; and Exhibit A-F; filed Sep. 14, 2006 in the US District Court for the Eastern District of Texas Marshall Division; Civil Action No. 2:03-CV-333-TJW; *Visto Corporation* v. *Seven Networks, Inc.*

Seven Networks, Inc.'s Reply in Support of Its Renewed Motion for Judgment as a Matter of Law or, in the Alternative, Supplemental Motion for a New Trial; filed Sep. 25, 2006 in the US District Court for the Eastern District of Texas Marshall Division; Civil Action No. 2:03-CV-333-TJW; *Visto Corporation* v. *Seven Networks, Inc.*

Supplemental Declaration of Jason T. Anderson in Support of Seven Networks, Inc.'s Renewed Motion for Judgment as a Matter of Law or, in the Alternative, Supplemental Motion for a New Trial; and Exhibit A; filed Sep. 25, 2006 in the US District Court for the Eastern District of Texas Marshall Division; Civil Action No. 2:03-CV-333-TJW; *Visto Corporation* v. *Seven Networks, Inc.*

Memorandum Opinion and Order; filed Dec. 19, 2006 in the US District Court for the Eastern District of Texas Marshall Division; Civil Action No. 2:03-CV-333-TJW; *Visto Corporation* v. *Seven Networks, Inc.*

Seven Networks, Inc.'s Post-Judgment, Renewed Motion for Judgment as a Matter of Law on Noninfringement and Invalidity or, in the Alterntive, for a New Trial, and Motion to Alter or Amend Judgment; and Exhibit A; filed Jan. 4, 2007 in the US District Court for the Eastern District of Texas Marshall Division; Civil Action No. 2:03-CV-333-TJW; *Visto Corporation* v. *Seven Networks, Inc.*

Order; filed Jan. 4, 2007 in the US District Court for the Eastern District of Texas Marshall Division; Civil Action No. 2:03-CV-333-TJW; *Visto Corporation* v. *Seven Networks, Inc.*

Declaration of William E. Davis III in Support of Visto Corporation's Response in Opposition to Seven Networks, Inc.'s Post-Judgment, Renewed Motion for Judgment as a Matter of Law on Non-Infringement and Invalidity or, in the Alternative, for a New Trial, and Motion to Alter or Amend Judgment; and Exhibits A-D; filed Jan. 22, 2007 in the US District Court for the Eastern District of Texas Marshall Division; Civil Action No. 2:03-CV-333-TJW; *Visto Corporation* v. *Seven Networks, Inc.*

Visto Corporation's Response in Opposition to Seven Networks, Inc.'s Post-Judgment, Renewed Motion for Judgment as a Matter of Law on Non-Infringement and Invalidity or, in the Alternative, for a New Trial, and Motion to Alter or Amend Judgment; filed Jan. 22, 2007 in the US District Court for the Eastern District of Texas Marshall Division; Civil Action No. 2:03-CV-333-TJW; *Visto Corporation* v. *Seven Networks, Inc.*

Order; filed Feb. 26, 2007 in the US District Court for the Eastern District of Texas Marshall Division; Civil Action No. 2:03-CV-333-TJW; *Visto Corporation* v. *Seven Networks, Inc.*

Transcript of Trial Before the Honorable T. John Ward United States District Judge and a Jury; Apr. 24, 2006, 8:30 A.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 24, 2006, 1:30 P.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 25, 2006, 8:10 A.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 25, 2006, 1:15 P.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 26, 2006, 8:00 A.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 26, 2006, 1:15 P.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 27, 2006, 8:30 A.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 27, 2006, 1:15 P.M. in the US District Court for the Eastern District of Texas Marshall Division; Civil Action No. 2:03-CV-333; *Visto Corporation* v. *Seven Networks, Inc.*

Transcript of Trial Before the Honorable T. John Ward United States District Judge and a Jury; Apr. 28, 2006, 8:30 A.M. in the US District Court for the Eastern District of Texas Marshall Division; Civil Action No. 2:03-CV-333; *Visto Corporation* v. *Seven Networks, Inc.*

Transcript of Trial Before the Honorable Caroline Craven United States District Judge and a Jury; Apr. 28, 2006, 3:30 P.M. in the US District Court for the Eastern District of Texas Marshall Division; Civil Action No. 2:03-CV-333; *Visto Corporation* v. *Seven Networks, Inc.*

Exhibit A: Patent Rule 3-1(C) Claim Chart for '192 Patent.

Exhibits E and F of the Amended Complaint; filed Jun. 3, 2004 in the US District Court for the Eastern District of Texas Marshall Division; Civil Action No. 2:03-CV-333-TJW; *Visto Corporation* v. *Seven Networks, Inc.*

Exhibits A-D to the First Amended Complaint; filed Jun. 3, 2004 in the US District Court for the Eastern District of Texas Marshall Division; Civil Action No. 2:03-CV-333-TJW; *Visto Corporation* v. *Seven Networks, Inc.*

Patent Local Rule 3-3 Preliminary Invalidity Chart for U.S. Patent No. 6,085,192.

Microsoft's Preliminary Invalidity Contentions; with Appendix A and Exhibit A; filed in the US District Court of the Eastern District of Texas Marshall Division; Civil Action No. 2:05-CV-546 (DJF); *Visto Corporation* v. *Microsoft Corporation.*

Microsoft Corporation's Supplemental Invalidity Contentions; filed in the US District Court of the Eastern District of Texas Marshall Division; Civil Action No. 2:05-CV-546 (DJF); *Visto Corporation* v. *Microsoft Corporation.*

Ex Parte Reexamination Certificate (5234th); filed Jul. 3, 2007 in the US District Court of the Eastern District of Texas Marshall Division; Civil Action No. 2:05-CV-546-DF.

Claim Construction Hearing; filed Dec. 27, 2006 in the US District Court of the Eastern District of Texas Marshall Division; Civil Action No. 2:05-CV-365-TJW; *Seven Networks, Inc.* v. *Visto Corporation*.

Claim Construction Hearing; filed Dec. 27, 2006 in the US District Court of the Eastern District of Texas Marshall Division; Civil Action No. 2:05-CV-365-TJW-CE; *Seven Networks, Inc.* v. *Visto Corporation*.

Memorandum Opinion and Order; filed Dec. 29, 2006 in the US District Court of the Eastern District of Texas Marshall Division; Civil Action No. 2:05-CV-365-TJW-CE; *Seven Networks, Inc.* v. *Visto Corporation*.

Third Supplemental Expert Report of Sabin R. Head, Ph.D. Regarding Infringement of Reexamined '192 Patent; Apr. 20, 2006; filed in the US District Court of the Eastern District of Texas Marshall Division; Civil Action No. 2:03-CV-333-TJW; *Visto Corporation* v. *Seven Networks, Inc.*

Good's Invalidity Contentions Chart Pursuant to P.R. 3-3(c); Civil Action No. 2:06-CV-39 TJW; *Visto* v. *Good*.

Visto's Identification of Prior Art Pursuant to 35 U.S.C. § 282; filed Sep. 4, 2007 in the US District Court of the Eastern District of Texas Marshall Division; Civil Action No. 2:05-CV-546-DJF; *Visto Corporation* v. *Microsoft Corporation*.

Identification of Prior Art Pursuant to 35 U.S.C. § 282 By Defendant Microsoft Corporation Pursuant to Fed. R. Civ. P. 26(a)(3); filed Sep. 4, 2007 in the US District Court of the Eastern District of Texas Marshall Division; Civil Action No. 2:05-CV-546 (DJF); *Visto Corporation* v. *Microsoft Corporation*.

Appendix B—Patent Rule 3-3(C) Invalidity Claim Chart for U.S. Patent 6,219,694; Civil Action No. 2:06-CV-181; *Visto* v. *RIM*.

Appendix C—Patent Rule 3-3(C) Invalidity Claim Chart for U.S. Patent 6,389,457; Civil Action No. 2:06-CV-181; *Visto* v. *RIM*.

Visto's Preliminary Invalidity Contentions Under Local Patent Rule 3-3; filed in the US District Court of the Eastern District of Texas Marshall Division; Civil Action No. 2:06-CV-181 (TJW); *Visto Corporation* v. *Research in Motion Limited* and *Research in Motion Corporation*.

Seven's Preliminary Invalidity Contentions Patent Rule 3-3; Oct. 12, 2004; filed in the US District Court of the Eastern District of Texas Marshall Division; Civil Action No. 2-03CV-333-TJW; *Visto Corporation* v. *Seven Networks, Inc.*

Transcript of Claim Construction Hearing Before the Honorable T. John Ward United States District Judge; Mar. 14, 2005, 9:00 A.M.; in the US District Court of the Eastern District of Texas Marshall Division; Civil Action No. 2:03-CV-333 (TJW); *Visto Corporation* v. *Seven Networks, Inc.*

US 5968131 Preliminary Invalidity Contentions; *Visto* v. *Smartner*.

US 6708221 Preliminary Invalidity Contentions; *Visto* v. *Smartner*.

Smartner's First Amended Preliminary Invalidity Contentions; Jul. 3, 2006; in the US District Court of the Eastern District of Texas Marshall Division; Civil Action No. 2:05-CV-91-TJW; *Visto Corporation* v. *Smartner Informations Systems, Ltd.*

Proof of Service; Mar. 11, 2005; *Visto Corporation* v. *Sproqit Technologies, Inc.*

Defendant Sproqit Technologies, Inc.'s Preliminary Invalidity Contentions Under Patent Rule 3-3; and Exhibits A-D; Mar. 11, 2005; US States District Court the Northern District of California San Francisco Division; Case No. C 04-0651F (EMC); *Visto Corporation* v. *Sproqit Technologies, Inc.*

Answer and Counterclaim to Palintiff's First Amended Complaint; filed Aug. 7, 2006 in the US District Court for the Eastern District of Texas Marshall Division; Civil Action No. 2:06-CV-39 TJW; *Visto Corporation* v. *Good Technology, Inc.*

First Amended Answer and Counterclaim to Plaintiff's First Amended Complaint; filed Jul. 11, 2007 in the US District Court for the Eastern District of Texas Marshall Division; Civil Action No. 2:06-CV-39 TJW; *Visto Corporation* v. *Good Technology, Inc.*

Visto Corporation's Reply to Good Technology, Inc.'s Counterclaim to Plaintiff's First Amended Complaint; filed Aug. 29, 2006 in the US District Court for the Eastern District of Texas Marshall Division; Civil Action No. 2:06-CV-39 TJW; *Visto Corporation* v. *Good Technology, Inc.*

Visto's Reply to Good's Counterclaim; filed Mar. 30, 2006 in the US District Court for the Eastern District of Texas Marshall Division; Civil Action No. 2:06-CV-39 TJW; *Visto Corporation* v. *Good Technology, Inc.*

Answer and Counterlclaim of Infowave Software, Inc.; filed Nov. 25, 2003 in the US District Court for the Eastern District of Texas Marshall Division; Civil Action No. 2:03CV-332 WARD; *Visto Corporation* v. *Infowave Software, Inc.*

Complaint for Patent Infringment; Injunctive Relief; Damages; Demand for Jury Trial; filed Sep. 23, 2003 in the US District Court for the Eastern District of Texas Marshall Division; Civil Action No. 2:03-CV-332 TJW; *Visto Corporation* v. *Infowave Software, Inc.*

Declaration of Sean Mills in Support of Defendant Microsoft's Motion for Partial Summary Judgment of Invalidity of Visto's Patents; filed Jul. 3, 2007 in the US District Court for the Eastern District of Texas Marshall Division; Civil Action No. 2:05-CV-546 DJF; *Visto Corporation* v. *Microsoft Corporation*.

Joint Patent Rule 4-5(D) Claim Chart; filed Dec. 5, 2006 in the US District Court for the Eastern District of Texas Marshall Division; Civil Action No. 2:05-CV-546-DJF; *Visto Corporation* v. *Microsoft Corporation*.

Microsoft's Motion for Partial Summary Judgment of Invalidity of Visto's Patents; filed Jul. 2, 2007 in the US District Court for the Eastern District of Texas Marshall Division; Civil Action No. 2:05-CV-546-DJF; *Visto Corporation* v. *Microsoft Corporation*.

Microsoft Corporation's Supplemental Invalidity Contentions; in the US District Court for the Eastern District of Texas Marshall Division; Civil Action No. 2:05-CV-546-DJF; *Visto Corporation* v. *Microsoft Corporation*.

Visto's Reply, Defenses, and Counter-Counterclaims to Microsoft's First Amended Answer and Counterclaims; filed Mar. 30, 2007 in the US District Court for the Eastern District of Texas Marshall Division; Civil Action No. 2:05-CV-546-DJF; *Visto Corporation* v. *Microsoft Corporation*.

Claim Construction Order; filed Aug. 28, 2007 in the US District Court for the Eastern District of Texas Marshall Division; Civil Action No. 2:05-CV-546-DJF; *Visto Corporation* v. *Microsoft Corporation*.

First Amended Complaint for Patent Infringement; Injunctive Relief; Damages; and Demand for Jury Trial; and Exhibits A-E; filed Jun. 2, 2006 in the US District Court for the Eastern District of Texas Marshall Division; Civil Action No. 2:05-CV-546-DJF; *Visto Corporation* v. *Microsoft Corporation*.

Microsoft's First Amended Answer and Counterclaims; filed Mar. 12, 2007 in the US District Court for the Eastern District of Texas Marshall Division; Civil Action No. 2:05-CV-546-DJF; *Visto Corporation* v. *Microsoft Corporation*.

Microsoft's Reply to Visto's Counterclaims; filed Apr. 23, 2007 in the US District Court for the Eastern District of Texas Marshall Division; Civil Action No. 2:05-CV-546-DJF; *Visto Corporation* v. *Microsoft Corporation*.

Research in Motion Limited's and Research in Motion Corporation's First Amended Answer, Defenses and Counterclaims; and Exhibits 1-3; filed Mar. 6, 2007 in the US District Court for the Eastern District of Texas Marshall Division; Civil Action No. 2:06CV-181; *Visto Corporation* v. *Research in Motion Limited*, and *Research in Motion Corporation*.

Visto Corporation's Reply to Research in Motion Limited's and Research in Motion Corporation's First Amended Counterclaims and Visto's Counter-Counterclaims; and Exhibit A; filed Mar. 23, 2007 in the US District Court for the Eastern District of Texas Marshall Division; Civil Action No. 2:06-CV-181-TJW; *Visto Corporation* v. *Research in Motion Limited, et al.*

Research in Motion Limited's and Research in Motion Corporation's Answer and Defenses to Visto Corporation's Counter-Counterclaims; filed Sep. 6, 2007 in the US District Court for the Eastern District of Texas Marshall Division; Civil Action No. 2:06-CV-181-TJW; *Visto Corporation* v. *Research in Motion Limited*, and *Research in Motion Corporationcorporation*.

Visto Corporation's Reply to Research in Motion Limited's and Research in Motion Corporation's Counterclaims; filed Jun. 28, 2006 in the US District Court for the Eastern District of Texas Marshall Division; Civil Action No. 2:06-CV-181-TJW; *Visto Corporation v. Research in Motion Limited, et al.*

Order; filed Apr. 20, 2005 in the US District Court for the Eastern District of Texas Marshall Division; Civil Action No. 2:03-CV-333-TJW; *Visto Corporation v. Seven Networks, Inc.*

Final Judgment and Permanent Injunction; filed Dec. 19, 2006 in the US District Court for the Eastern District of Texas Marshall Division; Civil Action No. 2:03-CV-333-TJW; *Visto Corporation v. Seven Networks, Inc.*

First Amended Complaint for Patent Infringement; Injunctive Relief; Damages; and Demand for Jury Trial; filed Jun. 3, 2004 in the US District Court for the Eastern District of Texas Marshall Division; Civil Action No. 2:03-CV-333-TJW; *Visto Corporation v. Seven Networks, Inc.*

First Amended Answer to Complaint for Patent Infringement and Defendant's Counterclaims; filed Dec. 15, 2003 in the US District Court for the Eastern District of Texas Marshall Division; Civil Action No. 2:03-CV-333-TJW; *Visto Corporation v. Seven Networks, Inc.*

Transcript of Trial Before the Honorable Caroline Craven United States Magistrate Judge and a Jury; Apr. 28, 2006, 3:30 P.M. in the US District Court for the Eastern District of Texas Marshall Division; Civil Action No. 2:03-CV-333; *Visto Corporation v. Seven Networks, Inc.*

Claim Construction Hearing; Mar. 14, 2005, 9:00 A.M. in the US District Court for the Eastern District of Texas Marshall Division; Civil Action No. 2:03-CV-333-TJW; *Visto Corporation v. Seven Networks, Inc.*

Visto's Reply to Seven's Counterclaims in Answer to First Amended Complaint for Patent Infringement and Counterclaims; filed Jun. 15, 2004 in the US District Court for the Eastern District of Texas Marshall Division; Civil Action No. 2:03-CV-333-TJW; *Visto Corporation v. Seven Networks, Inc.*

Defendant Seven Networks, Inc.'s, Second Amended Answer to First Amended Complaint for Patent Infringement and Counterclaims; filed Dec. 19, 2004 in the US District Court for the Eastern District of Texas Marshall Division; Civil Action No. 2:03-CV-333-TJW; *Visto Corporation v. Seven Networks, Inc.*

Order; filed Apr. 18, 2006 in the US District Court for the Eastern District of Texas Marshall Division; Civil Action No. 2:03-CV-333-TJW; *Visto Corporation v. Seven Networks, Inc.*

Transcript of Hearing on Permanent Injunction Before the Honorable Judge T. John Ward United States District Judge; Oct. 25, 2006, 1:00 P.M. in the US District Court for the Eastern District of Texas Marshall Division; Civil Action No. 2:03-CV-333-TJW; *Visto Corporation v. Seven Networks, Inc.*

Plaintiff Visto Corporation's Reply to Defendant Seven Networks, Inc.'s Third Amended Answer to First Amended Complaint for Patent Infringement and Counterclaims; filed Apr. 17, 2006 in the US District Court for the Eastern District of Texas Marshall Division; Civil Action No. 2:03-CV-333-TJW; *Visto Corporation v. Seven Networks, Inc.*

Plaintiff Visto Corporation's Reply to Defendant Seven Networks, Inc.'s Second Amended Answer to First Amended Complaint for Patent Infringement and Counterclaims; filed Dec. 22, 2004 in the US District Court for the Eastern District of Texas Marshall Division; Civil Action No. 2:03-CV-333-TJW; *Visto Corporation v. Seven Networks, Inc.*

Smartner Information Systems, Ltd.'s Amended Answer and Counterclaim; filed Oct. 3, 2005 in the US District Court for the Eastern District of Texas Marshall Division; Civil Action No. 2:05-CV-91-TJW; *Visto Corporation v. Smartner Information Systems, Ltd.*

Plaintiff Visto Corporation's Response to Defendant Smartner Information Systems, Ltd's Amended Answer and Counterclaim; filed Oct. 24, 2005 in the US District Court for the Eastern District of Texas Marshall Division; Civil Action No. 2:05-CV-91-TJW; *Visto Corporation v. Smartner Information Systems, Ltd.*

Order; filed Dec. 29, 2006 in the US District Court for the Eastern District of Texas Marshall Division; Civil Action No. 2:05-CV-91-TJW; *Visto Corporation v. Smartner Information Systems, Ltd.*

Claim Construction Hearing; Oct. 18, 2006, 8:30 A.M. in the US District Court for the Eastern District of Texas Marshall Division; Civil Action No. 2:05-CV-91-TJW; *Visto Corporation v. Smartner Information Systems, Ltd.*

Smartner Information Systems, Ltd.'s Third Amended Answer and Counterclaims; filed Feb. 23, 2007 in the US District Court for the Eastern District of Texas Marshall Division; Civil Action No. 2:05-CV-91-TJW; *Visto Corporation v. Smartner Information Systems, Ltd.*

Answer; filed May 30, 2006 in the US District Court Northern District of California San Francisco Division; Case No. C 04-0651 EMC; *Visto Corporation v. Sproqit Technologies, Inc.*

Order Re Claim Construction—"Workspace Element" and "Independently Modifiable Copy"; filed Aug. 4, 2006 in the US District Court Northern District of California; Case No. C-04-0651 EMC; *Visto Corporation v. Sproqit Technologies, Inc.*

Claim Construction Hearing; Jul. 6, 2006 in the US District Court for the Northern District of California Magistrate Judge Edward M. Chen; Case No. C04-0651 EMC; *Visto Corporation v. Sproqit Technologies, Inc.*

Sproqit'S Preliminary Invalidity Contentions Pursuant to Patent Local Rule 3-3; Feb. 8, 2006 in the US District Court Northern District of California San Francisco Division; Case No. 04-0651 EMC; *Visto Corporation v. Sproqit Technologies, Inc.*

RIM's Invalidity Contentions for U.S. Patent No. 7,039,679; in the US District Court for the Eastern District of Texas Marshall Division; and Exhibits A, B, C-Appendix A, and D-Appendix B; Case No. 2:06-CV-181; *Visto Corporation v. Research in Motion Limited* and *Research in Motion Corporation*.

Shawn Hansen; Email sent Oct. 13, 2006; Re: conference number for todays meet and confer; filed Feb. 2, 2007; Case No. 2:05-cv-00365-TJW-CE.

Order Granting Unopposed Motion for Withdrawal of Manatt, Phelps & Phillips LLP as Counsel of Record, In the United States District Court for the Eastern District of Texas, Marshall Division, *Seven Networks, Inc.*, Plaintiff v. *Visto Corporation* Defendant, Civil Action No. 2:05-CV-365-TJW, Filed Jan. 31, 2007.

Order, In the United States District Court for the Eastern District of Texas, Marshall Division, *Seven Networks, Inc.*, Plaintiff v. *Visto Corporation*, Defendant, Civil Action No. 2:05-CV-365, Filed Feb. 14, 2007.

Visto Corporation's Response in Opposition to Seven Networks, Inc.'s Opposed Motion for Leave to Amend Its Invalidity Contentions, In the United States District Court for the Eastern District of Texas, Marshall Division, *Seven Networks, Inc.*, Plaintiff and Counterdefendant v. *Visto Corporation*, Defendant and Counterclaimant, Civil Action No. 2:05-CV-365-TJW, Filed Feb. 2, 2007.

Seven Networks, Inc.'s Opposed Motion for Leave to Amend Its Invalidity Contentions, In the United States District Court for the Eastern District of Texas, Marshall Division, *Seven Networks, Inc.*, Plaintiff v. *Visto Corporation*, Defendant, Civil Action No. 2:05-CV-365-TJW, Filed Jan. 17, 2007.

Seven Networks, Inc.'s Notice Re Withdrawal of Certain Pending Motions and Oppositions to Motions, In the United States District Court for the Eastern District of Texas, Marshall Division, *Seven Networks, Inc.*, Plaintiff v. *Visto Corporation*, Defendant, Civil Action No. 2:05-CV-365-TJW, Filed May 11, 2007.

Visto Corporation's Notice Pursuant to Court's Order of May 4, 2007, In the United States District Court for the Eastern District of Texas, Marshall Division, *Seven Networks, Inc.*, Plaintiff v. *Visto Corporation*, Defendant, Civil Action No. 2:03-CV-365-TJW, Filed May 16, 2007.

Transcript of Hearing before Honorable T. John Ward, U.S. District Court Judge, and the Honorable Chad Everingham U.S. Magistrate Judge, In the United States District Court for the Eastern District of Texas, Marshall Division, *Visto Corporation*, Plaintiff, v. *Seven Networks, Inc.*, Defendant, Civil Action No. 2:03-CV-33; *Visto Corporation* v. *Smartner Information Systems*, Civil Action No. 2:05-CV-91; *Seven Networks, Inc.* v. *Visto Corporation*, Civil Action No. 2-05-CV-365, on May 4, 2007.

Order, In the United States District Court for the Eastern District of Texas, Marshall Division, *Visto Corporation* v. *Seven Networks, Inc.*, Civil Action No. 2:03-CV-333-TJW, Filed Mar. 19, 2007.

Visto Corporation's Notice Pursuant to Court's Order of May 4, 2007, In the United States District Court for the Eastern District of Texas, Marshall Division, *Visto Corporation*, Plaintiff v. *Seven Networks, Inc.*, Defendant, Civil Action No. 2-03-CV-333-TJW, Filed May 16, 2007.

Seven Networks, Inc.'s Notice Re Withdrawal of Certain Pending Motions, In the United States District Court for the Eastern District of Texas, Marshall Division, *Visto Corporation*, Plaintiff v. *Seven Networks, Inc.*, Defendant, Civil Action No. 2-03-CV-333-TJW, Filed May 11, 2007.

Order, In the United States District Court for the Eastern District of Texas, Marshall Division, *Visto Corporation*, Plaintiff v. *Seven Networks, Inc.*, Defendant, Civil Action No. 2:03-CV-333-TJW, Filed Feb. 26, 2007.

Order, In the United States District Court for the Eastern District of Texas, Marshall Division, *Visto Corporation*, Plaintiff v. *Seven Networks, Inc.*, Defendant, Civil Action No. 2:03-CV-333-TJW, Filed May 2, 2007.

Order Granting Unopposed Motion for Withdrawal of Manatt, Phelps & Phillips as Counsel of Record, In the United States District Court for the Eastern District of Texas, Marshall Division, *Visto Corporation*, Plaintiff v. *Seven Networks, Inc.*, Defendant, Civil Action No. 2:03-CV-333-TJW, Filed Jan. 31, 2007.

U.S. Patent and Trademark Office; Facsimile Transmittal of Jan. 29, 2007; filed Feb. 20, 2007.

U.S. District Court, Eastern District of Virginia; Subpoena in a Civil Case; *Visto Corporation* v. *Smartner Information systems. Ltd.*; filed Feb. 20, 2007.

U.S. Patent and Trademark Office; Ex Parte Reexamination Interview Summary dated Jul. 7, 2005; Case No. 2:05-cv-00091-TJW-CE; filed Feb. 20, 2007.

Pamela Merkadeau; Email sent Jul. 8, 2005; Re: Reexamination 90/007,093; Case No. 2:05-cv-00091-TJW-CE; filed Feb. 20, 2007.

Pamela Merkadeau; Email sent Jul. 5, 2005; Re: Reexamination 90/007,093; Case No. 2:05-cv-00091-TJW-CE; filed Feb. 20, 2007.

Alford Kindred; Email sent Jul. 18, 2005; Re: Reexamination 90/007,093; Case No. 2:05-cv-00091-TJW-CE; filed Feb. 20, 2007.

Video Deposition, Alexandria, Virginia, Tuesday, Feb. 6, 2007, 10:00 a.m.; In the US District Court for the Eastern District of Texas, Marshall Division; *Visto Corporation* v. *Smartner Information Systems, Ltd.*; Civil Action No. 2:05-CV-91-TJW; filed Feb. 20, 2007.

Unopposed Motion for Withdrawal of Manatt, Phelps & Phillips LLP as Counsel of Record; In the US District Court for the Eastern District of Texas, Marshall Division; *Visto Corporation* v. *Smartner Information Systems, Ltd.*; Civil Action No. 2:05-CV-91-TJW; filed Jan. 26, 2007.

Smartner Information Systems, Ltd.'s Notice of Filing Deposition Transcript, In the United States District Court for the Eastern District of Texas, Marshall Division, *Visto Corporation* v. *Smartner Information Systems, Ltd.*, Civil Action No. 2:05-CV-91-TJW, Filed Feb. 20, 2007.

Smartner Information Systems, Ltd's Notice Re Withdrawal of Certain Pending Motions and Oppositions to Motions, In the United States District Court for the Eastern District of Texas, Marshall Division, *Visto Corporation* v. *Smartner Information Systems, Ltd.* ,Civil Action No. 2:05-CV-91-TJW, Filed May 11, 2007.

Order, In the United States District Court for the Eastern District of Texas, Marshall Division, *Visto Corporation* v. *Smartner Information Systems, Ltd.*, Civil Action No. 2:05-CV-91-TJW, Filed Feb. 15, 2007.

Order, In the United States District Court for the Eastern District of Texas, Marshall Division, *Visto Corporation* v. *Smartner Information Systems, Ltd.*, Civil Action No. 2:05-CV-91-TJW, Filed Mar. 22, 2007.

Smartner Information Systems, Ltd's Motion for Protective Order; In the United States District Court for the Eastern District of Texas, Marshall Division, *Visto Corporation* v. *Smartner Information Systems, Ltd.*, Civil Action No. 2:05-CV-91-TJW, Filed Jan. 16, 2007.

Visto Corporation's Notice Pursuant to Court's Order of May 4, 2007; In the United States District Court for the Eastern District of Texas, Marshall Division, *Visto Corporation* v. *Smartner Information Systems, Ltd.*, Civil Action No. 2:05-CV-91-TJW, Filed May 16, 2007.

Mosher, Sue, *The Microsoft Exchange User's Handbook*, Duke Press, Duke Communications International, Loveland, CO., pp. 1-719; 1997.

*Lotus Notes, Administrator's Guide*, Lotus Development, Cambridge, MA, pp. 1-777; 1995-1996.

Gerber, Barry, *Mastering Microsoft Exchange Server 5*, 2d. Ed., Sybex, Inc., Alameda, CA, pp. 1-843; 1997.

Lamb, et al., *Lotus Notes Network Design, For Notes Release 3 and 4*, Chapter 14, Computing McGraw-Hill, pp. 42-45.

*The Domino Defense: Security In Lotus Notes and the Internet*, Chapter 2, IBM Technical Support Organization, pp. 1-40; Mar. 1997.

*Working with Lotus Notes and the Internet*, Chapters 1 & 2, and Appendix A, Lotus Development Corp., Cambridge, MA; pp. 1-291; 1996.

Translation and original of Reply Brief Pursuant to Art. 6, of Legislative Decree No. 5/2003 for the Claimants; Court of Milan, Special division for industrial and intellectual property; *Research in Motion Limited, et al.* v. *Visto Corporation*; Case No. 567/2007.

Translation and original of Reply Brief Pursuant to Art. 7, II Paragraph, Legislative Decree No. 5/2003 for the Claimants; Court of Milan, Special division for industrial and intellectual property; *Research in Motion Limited, et al.* v. *Visto Corporation*; Case No. 567/2007.

Translation and original of Summons; Court of Milan, Special division for industrial and intellectual property; *Research in Motion Limited, et al.* v. *Visto Corporation*.

Translation and original of Statement of Defence on behalf of Visto Corporation; District Court of Milan, Intellectual Property Chamber; *Research in Motion Limited, et al.* v. *Visto Corporation*; Case No. 567/07; Feb. 26, 2007.

Motion to Schedule Hearing; Court of Milan, Special division for industrial and intellectual property; *Research in Motion Limited, et al.* v. *Visto Corporation*; Case No. 567/07.

Translation and original of First Reply Briefing Notes on behalf of Visto Corporation; District Court of Milan, Intellectual Property Chamber; *Visto Corporation* v. *Research in Motion Limited, et al.*; Case No. 567/07; Apr. 17, 2007.

Affidavit of Graham Raymond Richmond (Exhibit GRR1); dated Feb. 23, 2007; *Visto Corporation* v. *Research in Motion Limited*.

Statutory Declaration of Mark Marfe on behalf of Research in Motion, Ltd., w/Exhibits MCM1 & MCM2; dated Feb. 22, 2007.

Affidavit of Dr. Ludwig Nastansky; dated Feb. 22, 2007.

In the High Court of Justice, Chancery Division, Patents Court Between Research in Motion UK Limited and Visto Corporation; Draft Amended Grounds of Invalidity; pp. 1-9.

In the High Court of Justice, Chancery Division, Patents Court Between Research in Motion UK Limited and Visto Corporation; Amended Particulars of Claim; dated Jul. 9, 2007; pp. 1-2.

Tanenbaum, Andrew S., Third Edition, Computer Networks; 3 Pgs.

IBM Technical Disclosure Bulletin; Configuration of a Wireless-Connected Mobile Computer; vol. 38, No. 4; pp. 15-17; dated Apr. 1995.

W3C; Submission Request to W3C; dated Feb. 26, 2007.

Berners-Lee T., et al.; Hypertext Transfer Protocol—HTTP/1.0; pp. 1-60; dated May 1996.

Crispin, M.; IMAP4 Compatibility with IMAP2BIS; dated Dec. 1996; pp. 1-3.

Lamb, John P., et al.; Lotus Notes Network Design for Notes Release 3 and 4; dated 1996.

Lotus Notes, Administrator's Guide, 4.5 Release, dated 1995/1996.

Buiocchi, C.; Lotus Connects, Worldwide Business Partners News; dated Dec. 1996.

Highbeam Research, River Run Software Group Announces Mail on the Run! for Microsoft Windows CE for the new HP 300 LX and 320 LX Palmtop PCs; pp. 1-2; dated Feb. 10, 1997.

Gerber, B.; Microsoft, Mastering Exchange Server 5, Second Edition.

Lovells, Dr.-Ing Martin Fähndrich; Grounds, Facts and Arguments for Opposition, pp. 1-73; dated Feb. 26, 2007.

HighBeam Research, Mitsubishi Electric and Unwired Planet Unveil Plans for Smart GSM Phone Line for World-Wide GSM Market; Range of GSM Technology Based Smart Phones to Provide Internet Access on LCD Screen; pp. 1-2; dated Mar. 13, 1997.
In the High Court of Justice, Chancery Division, IP, *Research in Motion UK Limited* v. *Visto Corporation*, Claim Form; 2 Pgs. dated Oct. 30, 2006.
In the High Court of Justice, Chancery Division, Patents Court Between Research in Motion UK Limited and Visto Corporation; Further Notice to Admit Facts; pp. 1-9; dated Apr. 19, 2007.
In the High Court of Justice, Chancery Division, Patents Court Between Research in Motion UK Limited and Visto Corporation; Grounds of Invalidity; pp. 1-4; dated Oct. 30, 1996.
In the High Court of Justice, Chancery Division, Patents Court Between Research in Motion UK Limited and Visto Corporation; Notice to Admit Facts; pp. 1-6; dated Feb. 23, 2007.
In the High Court of Justice, Chancery Division, Patents Court Between Research in Motion UK Limited and Visto Corporation; Particulars of Claim; pp. 1-3; dated Oct. 30, 2006.
In the High Court of Justice, Chancery Division, Patents Court Between Research in Motion UK Limited and Visto Corporation; Statement of Case; pp. 1-11.
In the High Court of Justice, Chancery Division, Patents Court Between Research in Motion UK Limited and Visto Corporation and Between Visto Corporation and (1) Research in Motion UK Limited and (2) Research in Motion Limited; Reply and Defense to Counterclaim; pp. 1-2; dated May 15, 2007.
Screenshot of Lotus Notes, 4.5, Release 4.5a (Intl)—Exhibit DL 4c; dated Dec. 20, 1996.
Screenshot of Lotus Notes, 4.5, Release 4.5a—Exhibit DL 5c; dated Dec. 3, 1997.
Screenshot of Lotus Notes, 4.5, Release 4.5.2—Exhibit DL 6c; dated Jun. 26, 1997.
Screenshot—Exhibit DL 4e, 4 Pgs.
Screenshot—Exhibit DL 5e, 4 Pgs.
Screenshot—Exhibit DL 6e, 3 Pgs.
Screenshot—Exhibit DL 4d, 7 Pgs.
Screenshot—Exhibit DL 5d, 5 Pgs.
Screenshot—Exhibit DL 6d, 7 Pgs.
Screenshot of Lotus Notes, 4.5, Release 4.5a (Intl)—Exhibit DL 4b; dated Dec. 4, 1996.
Postel, J. B., Simple Mail Transfer Protocol; pp. 1-68; Exhibit DL 14; dated Aug. 1982.
Byte, The Firewall Dilemma: Too Few Locks, Too Many Doors; Exhibit DL 11; dated Aug. 1996.
HighBeam Research, Unwired Planet Announces Immediate Availability of HDML 2.0 Software Developer's Kit "SDK"; Free SDK Allows Creation of Web Server-Based Applications and Content for Smartphones; pp. 1-7; Exhibit DL 12a; dated Jul. 8, 1997.
Robinson, B., The Internet Comes to Wireless; Envisioneering—Informed Intelligence for Decision Makers; pp. 1-3; Exhibit DL 12c; dated Feb. 19, 1997.
In the High Court of Justice, Chancery Division, Patents Court Between Research in Motion UK Limited and Visto Corporation; Response to Claimant's Notice to Admit Facts Served on Feb. 23, 2007; pp. 1-3; dated Feb. 23, 2007.
In the High Court of Justice, Chancery Division, Patents Court Between Research in Motion UK Limited and Visto Corporation; Response to Claimant's Notice to Admit Facts Served on Apr. 19, 2007; pp. 1-7.
Working with Lotus Notes and the Internet; Exhibit DL 3a; 3 Pgs., dated 1996.
Luotonen A., et al., Computer Networks and ISDN Systems, World-Wide Web Proxies; Exhibit DL 13; 10 Pgs.; dated 1994.
Great Circle, Majordomo, pp. 1-4; dated Aug. 29, 2007.
Edwards, W. Keith, et al; Designing and Implementing Asynchronous Collaborative Applications with Bayou, 10 Pgs.; dated Oct. 14, 1997-Oct. 17, 1997.
Petersen, K., et al., Flexible Update Propagation for Weakly Consistent Replication; pp. 1-2; dated Aug. 28, 2007.
Xerox PARC's Bayou Project; pp. 1-7; dated Jun. 25, 1999.
Blodgett, M.; Computerworld, User's 'Wait and See' on RadioMail's New Package; p. 55; dated Jan. 3, 1996.
Sakellariadis, S., Book—Microsoft Exchange Server Internet Mail Connector; pp. 1-6; dated Mar. 1997.
Book—Migrating to Microsoft Exchange Server, pp. 1-2; dated Jul. 1997.
Bradner S., Network World; Engendering Disgust; p. 32; dated Apr. 6, 1998.
Strategic News Service-Member's Gallery; A Gallery of SNS Members Who Have Chosen to Share Their Photos and Biographies; pp. 1-2; dated Feb. 10, 2007.
Brodsky, I., The Net Unplugged; pp. 33, 34, 36, 38 & 40; dated Mar. 3, 1997.
Brown, D., IEEE Personal Communications, A Well Designed P&A Technique is Necessary to Protect Assets, Techniques for Privacy and Authentication in Personal Communication Systems, pp. 6-10, dated Aug. 1995.
Caldwell, B., Information Week; Fight Against Spam Intensifies; pp. 20 & 24; dated Jul. 20, 1998.
Mummert, L. B., Exploiting Weak Connectivity in a Distributed File System, pp. 1-226; dated Dec. 1996.
The MMDF Frequently Asked Questions List (FAQ); pp. 1-23; dated Nov. 5, 1998.
Garfinkel, S.L.; Enabling Email Confidentiality Through the Use of Opportunistic Encryption; 4 Pgs.
Greene M. V.; Black Enterprise, The Telecommunications Revolution; p. 38&42; dated Aug. 1997.
Lingam, C.; HTTP Compression for Web Applications; pp. 1-8; dated Oct. 24, 2007.
Harney, J., The Wireless Internet: Good to Go; Telephony; pp. 18,19,22&23; dated Oct. 6, 1997.
Knuth, D., All About Email; Educational Cyber PlayGround; pp. 1-3; dated Feb. 10, 2007.
Zhong, Q., et al.; Security Control for COTS Components; pp. 67-73; IEEE dated Jun. 1998.
Monua, J.; Networking Spam's Aftereffect; Information Week; p. 87; dated Jul. 27, 1998.
Kramer, M.; GALE, Expanded Academic ASAP; Information Week; pp. 1-4; dated Aug. 30, 2007.
Rosenberg, R.; Lotus Set to Unveil New Wireless Service; Boston.com/News/BostonGlobeArchives; p. 1; dated Jun. 15, 1993.
Levitt, J.; Information Week; Latest Sendmail Stops Spam: p. 102; dated Apr. 13, 1998.
Seiden, M., How Good is Wireless Internet Access?; pp. 1-2; dated Jun. 7, 1994.
Newcomb D. R.; Survey of E-Mail Systems; pp. 1-4; dated Aug. 16, 1991.
Majordomo License Agreement, Version 1.1; pp. 1-3; dated May 18, 1996.
Majordomo, Release 1.94.5 Readme; pp. 1-5; dated Aug. 29, 2007.
Ziegler, B.; A Test of Two Systems Shows Wireless E-Mail Needs Work; Personal Technology—WSJ.com; pp. 1-4; dated Jul. 3, 1997.
McNamara, P.; Network World, Splashy Spam Start-Up; pp. 1 & 16; dated Jul. 13, 1998.
Metcalfe, B., InfoWorld, There's a Bright Light and a Sendmail at the End of the Dark Spam Tunnel; pp. 111; dated Jul. 27, 1998.
Moore M.; GALE, Expanded Academic ASAP; pp. 1-3; dated Aug. 30, 2007.
Moore, M.; Software, Services Take Web Wireless, PC Week; pp. 48 & 56; dated Jun. 17, 1996.
Morgenstern, S., Airborne Info.; Home Office Computing; 2 Pgs.; dated May 1996.
News, www.greatcircle.com/Majordomo; Changes from 1.94.4 to 1.94.5; pp. 1-2; dated Aug. 29, 2007.
Pappalardo, D., NetCom Broadens 'Net Access Options; Network World; p. 15; dated Jan. 13, 1997.
Public Wireless Packet Data Services; pp. 1-7; dated Feb. 10, 2007.
MacWorld Report (Jan. 1995); pp. 1-2; dated Feb. 1995.
Radosevich, L., et al; InfoWorld, Free Money Model; p. 102; dated Jun. 8, 1998.
The SRI Van and Computer Internetworking; pp. 1-6; dated Sep. 10, 2007.
Petersen, K., et al.; Bayou: Replicated Database Services for World-Wide Applications; 6 Pgs.

Gwinn, A., Simple Network Paging Protocol, Version 1; pp. 1-4; dated Aug. 1993.
Strom, D.; Windows Wireless Email: Beyond Beta; pp. 1-11; dated Feb. 10, 2007.
Strom, D.; Wireless Email, a Different Perspective; pp. 1-2; dated Feb. 10, 2007.
Demers, A., et al.; The Bayou Architecture: Support for Data Sharing Among Mobile Users; pp. 1-9; dated Aug. 28, 2007.
Quarterman, J., et al.; The Internet Connection; pp. 1-10; dated Oct. 24, 2007.
Virtual Hosting with Sendmail; pp. 1-4; dated Oct. 24, 2007.
Wexler, J.; Network World; RadioMail Broadcasts its Wireless Message to Masses; Network World; p. 16; dated Dec. 11, 1995.
FileWatcher; What do you need?; p. 1; dated Aug. 28, 2007.
The Cook Report on Internet Protocol Technology Economics, Policy; Wireless as an Internet On-Ramp & Local Loop By Pass; pp. 1-48; dated Feb. 10, 2007.
Juliano, B. A., et al.; Wireless Data Communications Prototyping: A Flexible, High Quality, and Cost-Effective Information System for Education; 1995 ASCUE Proceedings; 12 Pgs.; dated 1995.
Messaging on the Desktop: Sending, Chapter 3; pp. 1-33.
Nour, N.; Trials of Mobile Computing Applications Using Circuit-Switched Cellular and Cellular Digital Packet Data (CDPD); pp. 765-768; dated 1996.
Smith, D. R., et al.; Trials of Wireless, Secure Electronic Mail; IEEE Personal Communications; pp. 28-33; dated Aug. 1995.
GoodFellow G.; Radiomail Two-Way Service Providing Wireless Link to E-Mail Now Available; pp. 1-2; dated Nov. 1, 1992.
Popek, et al; LOCUS, a Network Transparent, High Reliability Distributed System; pp. 169-177.
TekNow!, SAM™ Integrates E-Mail, Alpha Paging, Fax, and More!; 5 Pgs.
TekNow!, SAMpage, Free Demo Disk, Send Messages From Your Computer to an Alphanumeric Pager with SAMpage™ 2.0; 17 Pgs.
GSM Report 03-42; Advanced MHS Access; 13 Pgs.; dated Nov. 16, 1988.
Fisher S. E., Investor's Business Daily; Renting: A New Option for Software Users; pp. 1-4; dated Mar. 23, 1998.
News Release, Motorola Everywhere At the Office, in the Home, on the Road, Motorola Rings in 1995 with the Launch of the Marco®-Based Integrated Wireless Hand-Held Device; pp. 1-4; dated Jan. 4, 1995.
IDEG; Draft—Minutes of IDEG Meeting in Helsinki; 13 Pgs.; dated Sep. 8, 1997-Sep. 11, 1997.
Glenayre Technologies Annual Report; pp. 1-127; dated Nov. 14, 2007.
MH & nmh: Email for Users & Programmers; Header Fields and Addresses, pp. 1-9; dated May 2006.
Moore, M.; PC Week—Mobile Computing, Exchange Goes Wireless; pp. 34 & 38; dated Apr. 8, 1996.
Todd, G.; Microsoft Exchange Server Survival Guide; 508 Pgs.; dated 1996.
Rooney, Paula et al.; PC Week; ISVs Adding onto Exchange; p. 132.; dated Apr. 1, 1996.
Collora, Salvatore; PC Week; New Wireless Spec Aims to Ease; p. 124; dated May 26, 1997.
McSorley, John; PC Magazine; PC Tech/Utilities; Be Paged by Your E-Mail; pp. 213-215 & 218; dated May 27, 1997.
Moser, Karen D., PC Week; Servers and Databases, SQL Server for NT Gains Messaging Extensions; p. 63; dated Feb. 14, 1994.
Rooney, Paula; PC Week; Servers and Databases, SoftArc Module, Other MAPI Items Debut at Show; pp. 51-52; dated Dec. 4, 1995.
Document Manager; Product Review; Let's Work Together; 3 Pgs.; dated Oct. 1996.
Wynd Communications; Welcome to Wynd Online; Wireless E-Mail VoicePage Fax WyndMail; 13 pgs.; dated Jul. 7, 1997.
Integra Technology International, Inc.; Inside Integra Technology; Integra Wireless Messaging Server Pre Beta 1 for Windows NT Server (Risc Platform) is Now Available!; pp. 1-2; dated Aug. 28, 1996.
Integra Technology International, Inc., Wireless Messaging Server for Microsoft Exchange, Technical Reviewers Guide; pp. 1-8.
PageWriter™ 2000 User's Manual; 93 Pgs. (1997/1998).
PSION Series 5; Message Suite, User Guide, pp. 1-70; dated Jun. 1998.
Psion, Setting up Message Suite, pp. 1-5.
Calvo, Mark D.; Military Review, Digitizing the Force XXI Battlefield; pp. 68-73; dated May 1996-Jun. 1996.
Atkins, D., et al.; PGP Message Exchange Formats; pp. 1-18; dated Aug. 1996.
Zimmermann, P., et al.; Pretty Good Privacy Public Key Encryption for the Masses; PGP User's Guide, vol. 1—Essential Topics; pp. 1-31; dated Sep. 1, 1992.
Garza, Victor R., InfoWorld, 'Exchange' Messages in Thin Air with Ericsson Virtual Office; p. 124; dated Jan. 27, 1997.
Security; Wireless Communication Growth Hinges on Four Considerations; pp. 65-66; dated Jun. 1996.
DeSimone A., et al.; Wireless Data: Systems, Standards, Services; Wireless Networks 1 (1995); pp. 241-253.
Meyers, J.; Wireless Networks, Dedicated to Data; Telephony; p. 92; dated Jul. 14, 1997.
Robinson, P., et al.; Wireless That Works pp. 177, 182-183, 185, 187 & 189; dated 1998.
Wexler, J.; Network World, Mobile Mart Takes Middleware, Network Interoperability Strides; p. 8; dated Feb. 26, 1996.
Freier, A. et al., The SSL Protocol Version 3.0, pp. 1-54; dated Nov. 18, 1996.
Blodgett, M.; Computerworld; Mobile Users Eye Smart Phone; p. 65; dated Feb. 24, 1997.
Blodgett, M.; Computerworld; Smart Phones Dial Up Data Communications; p. 28; dated Jul. 15, 1996.
Harbaugh, L.; Information Week; E-Mail in Your Pocket; pp. 64, 65 & 68; dated Feb. 2, 1998.
Pappalardo, D.; Network World; AT&T Touts Wireless Surfing; p. 8; dated Feb. 17, 1997.
Wexler, J.; Network World; AT&T Builds CDPD, But What is it Good For?; p. 39; dated Sep. 16, 1996.
Snyder J., et al.; E-Mail Interoperability Software—A Backbone to the World Not Only is PMDF E-Mail Interconnect 5.0 the Least Expensive Messaging Switch We've Evaluated, But it's Interoperability is as Predictable as Partisan Politics And its Tools Won't Take No For an Answer—You Can Configure Any Option if you Have the Time; pp. 1-18; dated Mar. 4, 1996, vol. 18, Issue 10.
Kramer, M.; PC Week, Mail Reader Extends Reach; Lab Note E-Mail Connection 3.0 Supports More Message Systems; Adds Ease of Use, Security; p. 76; dated Jul. 29, 1996.
Frisk, M.; Personal Air Communications Technology—pACT, Ericsson Review; pp. 4-13; dated 1997.
Li Y., et al.; Mobile Computing and Communication Review, vol. 1, No. 1, Supporting Personal Mobility for Nomadic Computing Over the Internet; pp. 22-31.
Iellimo Jr., A.; Network World Fusion, PDAs the Next Generation; pp. 1-7; dated Mar. 13, 1995.
Harmer, J.; Mobile Aware Multimedia Applications for UMTS: The ACTS on the Move Project; IEEE; pp. 539-543; dated 1997.
LaPorta T. F., et al.; Mobile Networks and Applications 1, Challenges for Nomadic Computing: Mobility Management and Wireless Communications; pp. 3-16; dated 1996.
Satyanarayanan M.; Workshop on Mobile Computing Systems and Applications; pp. 4-12; dated Dec. 1994.
Black, A., et al.; System Support for Mobility; pp. 129-132.
Chen, Ling-Sheng; Apply Personal Mobility in PCS Environment for Universal Personal Communications; pp. 503-507; dated 1996.
Bagrodia, R., et al.; IEEE Personal Communications, A New Model in the Use of Computer and Communications Technology; Vision, Issues, and Architecture for Nomadic Computing; pp. 14-27; dated Dec. 1995.
Kleinrock, L.; Computer Communication Review, Nomadic Computing—An Opportunity; pp. 36-40.
Iida I., et al.; IEEE Communications Magazine, DUET: An Agent-Based Personal Communications Network; pp. 44-49; dated Nov. 1995.
Saltzer, J.H., et al.; End-to-End Arguments in System Design; pp. 1-10.
Mu Y., et al.; On the Design of Security Protocols for Mobile Communications; 13 Pgs.

Diffie W., et al.; New Directions in Cryptography; pp. 29-40.
Ylonen, T.; The SSH (Secure Shell) Remote Login Protocol; pp. 1-33; dated May 15, 1995.
Kent S. T., Laboratory for Computer Science—Massachusetts Institute of Technology; Encryption-Based Protection Protocols for Interactive User-Computer Communication; 127 Pgs.; dated May 1976.
Vittore, V.; Redefining the Push Model: Internally Developed Software Fins New Applications; Telephony Online; pp. 1-3; dated Aug. 17, 1998.
Branstad, D.K.; AIAA Paper No. 73-427, Security Aspects of Computer Networks; 10 Pgs.; dated Apr. 16, 1973-Apr. 18, 1973.
Poultney, J.; Pagers are More than a Beeper, Less than a Computer; pp. 55 & 56; MacWeek; dated Sep. 11, 1995.
Gwinn, A.; Simple Network Protocol—Version 1(b); pp. 1-7; dated Jan. 1994.
Webpage—MailStart; 6 Pgs.; dated Nov. 9, 2007.
Smith, D. R.; et al; IEEE Personal Communications, Trials of Wireless, Secure Electronic Mail; pp. 28-33; dated Aug. 1995.
Strom, D.; Executive Technology: Smart Pagers; Computerworld; p. 56; dated Aug. 17, 1998.
Goin' Postal, Version 5 (Freeware); A Mailer for DOS HP Palmtops; 30 Pgs.
File Watcher; pkg://Tnos-2.40-doc.tar.gz:228482/tnos.cfg; pp. 1-3; dated Aug. 28, 2007.
File Watcher; pkg://Tnos-2.40-doc.tar.gz:228482/readme.doc; pp. 1-2; dated Aug. 28, 2007.
Lantz, B., TNOS Release Notes—Release 2.21; File Watcher; pkg://Tnos-2.40-doc.tar.gz:228482/new2tn2.21; pp. 1-12; dated Feb. 8, 2007.
Lantz, B., TNOS Release Notes—Release 2.22; File Watcher; pkg://Tnos-2.40-doc.tar.gz:228482/new2tn2.21; pp. 1-8; dated Jun. 28, 2007.
Lantz, B., TNOS Release Notes—Release 2.30; File Watcher; pkg://Tnos-2.40-doc.tar.gz:228482/new2tn2.30; pp. 1-15; dated Sep. 14, 2007.
Lantz, B., TNOS Release Notes—Release 2.40; File Watcher; pkg://Tnos-2.40-doc.tar.gz:228482/new2tn2.40; pp. 1-9; dated Jun. 28, 2007.
The Directory Structure for TNOS; File Watcher; pkg://Tnos-2.40-doc.tar.gz:228482/structure.dir; pp. 1; dated Aug. 28, 2007.
Tnos—KA9Q-Variant TCP/IP Program; pp. 1-4; dated Sep. 15, 2003.
The KA9Q NOS TCP/IP Package; pp. 1-2; dated Mar. 15, 2002.
File Watcher; pkg://Tnos-2.40-doc.tar.gz:1239376/autoexec.nos; pp. 1-6; dated Aug. 29, 2007.
File Watcher; TNOS; pp. 1-2; dated Aug. 29, 2007.
File Watcher; Info on DJPP, pkg://Tnos-2.40-doc.tar.gz:228482/djgpp.txt; pp. 1-2; dated Aug. 29, 2007.
File Watcher; Information Servers and Tscript, pkg://Tnos-2.40-doc.tar.gz:228482/tscript.doc; pp. 1-4; dated Aug. 29, 2007.
File Watcher; Simtel Mirrors, pkg://Tnos-2.40-doc.tar.gz:228482/mirrors.dj; pp. 1-3; dated Aug. 29, 2007.
File Watcher; pkg://Tnos-2.40-doc.tar.gz:228482/tnos.cfg; pp. 1-3; dated Aug. 29, 2007.
File Watcher; pkg://Tnos-2.40-doc.tar.gz:228482/new2tn1.11; pp. 1-16; dated Aug. 29, 2007.
Karn, P. et al; Tampa Network Operating System User Reference Manual; File Watcher; pkg://Tnos-2.40-doc.tar.gz:228482/tnos.man; pp. 1-18; dated Aug. 29, 2007.
The Directory Structure for TNOS; File Watcher; pkg://Tnos-2.40-doc.tar.gz:228482/structur.dir; pp. 1; dated Aug. 29, 2007.
Upgrading TNOS to Release 1.12—http://www.lantz.com/Update1.12.html; File Watcher; pkg://Tnos-2.40-doc.tar.gz:228482/new2tn1.12; pp. 1-8; dated Aug. 29, 2007.
Upgrading TNOS to Release 1.13—http://www.lantz.com/Update1.13.html; File Watcher; pkg://Tnos-2.40-doc.tar.gz:228482/new2tn1.13; pp. 1-7; dated Aug. 29, 2007.
Upgrading TNOS to Release 1.14—http://www.lantz.com/Update1.14.html; File Watcher; pkg://Tnos-2.40-doc.tar.gz:228482/new2tn1.14; pp. 1-8; dated Aug. 29, 2007.
Upgrading TNOS to Release 2.00—http://www.lantz.com/Update2.00.html; File Watcher; pkg://Tnos-2.40-doc.tar.gz:228482/new2tn2.00; pp. 1-7; dated Aug. 29, 2007.

Upgrading TNOS to Release 2.01—http://www.lantz.com/Update2.01.html; File Watcher; pkg://Tnos-2.40-doc.tar.gz:228482/new2tn2.01; pp. 1-10; dated Aug. 29, 2007.
Upgrading TNOS to Release 2.02—http://www.lantz.com/Update2.02.html; File Watcher; pkg://Tnos-2.40-doc.tar.gz:228482/new2tn2.02; pp. 1-15; dated Aug. 29, 2007.
Upgrading TNOS to Release 2.10—http://www.lantz.com/Update2.10.html; File Watcher; pkg://Tnos-2.40-doc.tar.gz:228482/new2tn2.10; pp. 1-15; dated Aug. 29, 2007.
Lantz, B. A.; TNOS Release Notes—Release-2.20; File Watcher; pkg://Tnos-2.40-doc.tar.gz:228482/new2tn2.20; pp. 1-11; dated Oct. 5, 1996.
Lantz, B. A.; TNOS Release Notes—Release-2.21; File Watcher; pkg://Tnos-2.40-doc.tar.gz:228482/new2tn2.21; pp. 1-12; dated Feb. 8, 1997.
Lantz, B. A.; TNOS Release Notes—Release-2.22 File Watcher; pkg://Tnos-2.40-doc.tar.gz:228482/new2tn2.22 pp. 1-8; dated Jun. 28, 1997.
Lantz, B. A.; TNOS Release Notes—Release-2.30; File Watcher; pkg://Tnos-2.40-doc.tar.gz:228482/new2tn2.30; pp. 1-15; dated Sep. 14, 1997.
Lantz, B. A.; TNOS Release Notes—Release-2.40; File Watcher; pkg://Tnos-2.40-doc.tar.gz:228482/new2tn2.40; pp. 1-9; dated Aug. 29, 2007.
Welcome to TNOS Release 1.10!; File Watcher; pkg://Tnos-2.40-doc.tar.gz:228482/readme.doc; pp. 1-2; dated Aug. 29, 2007.
Welcome to TNOS Release 1.10b File Watcher; pkg://Tnos-2.40-doc.tar.gz:228482/features.110; pp. 1-13; dated Aug. 29, 2007.
What do you need?; File Watcher; pkg://Tnos-2.40-doc.tar.gz:228482/read.me; pp. 1; dated Aug. 29, 2007.
Lambert, M., PCMAIL: A Distributed Mail System for Personal Computers, MIT, Jun. 1988, 1 Page.
Pyle, L., A Jump Start to the Top Ten R3-R4 Migration Considerations, The View, Nov./Dec. 1995, pp. 3-20.
Airsoft Airaccess 2.0, Mobile Networking Software, Product Overview and Reviewer's Guide, AirSoft Inc., Jun. 21, 1994.
Corporate Backgrounder, Airsoft, Inc., Dec. 1995.
Apple Newton, PDAs the Next Generation, http://www.networkworld.com/archive/1995/95-03-13pdas.html; p. 2 of 15; dated Feb. 6, 2006.
Brown et al., The Office Guide to Lotus Software, Lotus Notes, 1995, Sybex, Inc.
Wireless Access to the Internet—Preliminary Functional Specification, 1994, Research In Motion, Lmtd.
Bruegge, B., et al.; IEEE Personal Communications, Applications of Mobile Computing and Communication; pp. 64-71; dated Feb. 1996.
Chapman et al., Building Internet Firewalls, O'Reilly & Associates, Inc., dated 1995.
Rennie, C., CC: Mail Plain & Simple, The Official Guide to Lotus Software, Sybex, Inc., 1994.
Wong, H., Casahl's Replic-Action: Delivering True Notes/DBMS Integration,Jan./Feb. 1996, The View, Wellesley Information Services, pp. 33-50.
Order, (in the US District Court for the Eastern District of Texas Marshall Division), Civil Action No. 2:03-CV-333-TJW, *Visto Corporation* vs. *Seven Networks, Inc.*, pp. 1-33.
Message Management: User's Guide. CompuServe Inc., 1988.
Grous, P., Creating and Managing a Web Site With Lotus' Internotes Web Publisher, Sep./Oct. 1995, The View, Wellesley Information Services, pp. 3-18.
Dahl, A., Lotus Notes 4 Administrator's Survival Guide, First Edition, SAMS Publishing, 1996.
Theimer et al., Dealing With Tentative Data Values in Disconnected Work Groups, Computer Science Laboratory.
Declaration of James M. Anderson III in Support of Seven Networks, Inc.'s Motion for Summary Judgment, (in the US District Court for the Eastern District of Texas Marshall Division), Civil Action No. 2:03-CV-333-TJW, *Visto Corporation* vs. *Seven Networks, Inc.*, Filed May 24, 2005, pp. 1-17.
Parker, Jr. et al., Detection of Mutual Inconsistency in Distributed Systems, IEEE Transactions on Software Engineering, vol. SE-9, No. 3, May 3, 1983, pp. 240-246.

Kaashoek et al., Dynamic Documents: Mobile Wireless Access to the WWW, MIT Laboratory for Computer Science, Proceedings of the IEEE Workshop on Mobile Computing Systems and Applications, Dec. 1994, pp. 1-6.
Schubert, E., AFS Firewall Posting, Jun. 29, 1995.
Expert Rebuttal Report of Sabin R. Head, Ph.D., (in the US District Court for the Eastern District of Texas Marshall Division), Civil Action No. 2:03-CV-333-TJW, *Visto Corporation* vs. *Seven Networks, Inc.*, Filed Jun. 6, 2005.
Expert Rebuttal Report of Steven Beckhardt, (in the US District Court for the Eastern District of Texas Marshall Division), Civil Action No. 2:03-CV-333-TJW, *Visto Corporation* vs. *Seven Networks, Inc.*, Filed Jun. 6, 2005.
Expert Report of Robert Balaban Regarding Invalidity of U.S. Patent Nos. 5,986,131; 6,023,708;6,085,192 and 6,708,221, (in the US District Court for the Eastern District of Texas Marshall Division), Civil Action No. 2:03-CV-333-TJW, *Visto Corporation* vs. *Seven Networks, Inc.*, Filed May 5, 2005.
Cheswick et al., Firewalls and Internet Security: Repelling the Wily Hacker, AT&T and Luneta Corporation, 1994.
Brubacher-Cressman, D., Facsimile Transmission, Research in Motion Ltd., Aug. 10, 1994, 1 Page.
Hansen et al., Getting in Front of Lotus Notes Replication, May 1995, Business Communications Review, vol. 25, No. 5; pp. 3 and 38-40.
GloMop Group, Glomop: Global Mobile Computing by Proxy, Sep. 13, 1995, 12 Pages.
Defendant Good Technology's First Amended Invalidity Contentions Under Patent Rule 3-3, (in the US District Court for the Eastern District of Texas Marshall Division), Civil Action No. 2:06-CV-39-TJW, *Visto Corporation* vs. *Good Technology, Inc.*, pp. 1-37.
Roberts, B., Six Key Technologies Will Tell You If You Need Notes or the Web or Notes and the Web, Byte Magazine, Jul. 1996.
Glazman, D., HTTPTOOL for Motif V1.1, HTTPtool Postin 1995.txt, May 17, 1995.
Holden et al., Mastering Netscape 2.0 for Macintosh: The Complete Guide to Netscape 2.0, Hayden Books, 1995.
How Not to Save Cached Internet Files With Roaming User Profiles, Microsoft Corp., 2003, 2 Pgs.
Husted, B., Calling Up the Future FCC Ruling Will Change the Way We Use Phones, The Atlanta Journal and Constitution, Jul. 16, 1992.
Robertson, B., In the Middle, Network Computing, Feb. 6, 2006, 3 Pages.
Press Release, Access to LAN-Based E-Mail on a Cellular Phone Offered Via Infinite Interchange and AT&T Pocketnet? Service, AT&T Wireless Services, Infinite Technologies, Feb. 18, 1997, 1 Page.
Thomas, G., Mobile Data—Information Is in the Air!, Mercury Communications Ltd., Jun. 1994, 13 Pages.
Introducing Webmail, Webmail Presentation, Infinite Technologies, Mar. 27, 2007.
Microsoft Internet Explorer, Windows History: Internet Explorer History, Jun. 30, 2003, pp. 1 and 2.
Data Communications, Juicing Up Remote-Node Links to the LAN; 2 Pgs.; dated Jan. 1998.
Kistler, J.J.; Disconnected Operation in a Distributed File System; 271 Pgs.; dated May 1993.
Kumar, P.; Mitigating the Effects of Optimistic Replication in a Distributed File System; 185 Pgs.; dated Dec. 1994.
Lambert, M., PCMAIL: A Distributed Mail System for Personal Computers, MIT, pp. 1-38; dated Jun. 1988.
Lotus Notes—Release 3.1—The Groupware Standard, Site and Systems Planning Guide; dated 1991, 1994.
Lotus Notes—Release 4—Application Developer's Guide; pp. 1-464; dated 1995.
Lotus Notes—Release 4—Database Manager's Guide; pp. 1-109; dated 1995.
Terry, D. B. et al; Managing Update Conflicts in Bayou, a Weakly Connected Replicated Storage System; pp. 172-183; dated Dec. 1995.
MobiLib-Plus Product Brief, Preliminary Interface Specification for Mobilib-Plus Session Layer; pp. 1-8; dated Sep. 24, 1991.
Mobitex User's Handbook for the Mobidem AT; pp. 1-44; dated Apr. 1993.

Marco Press Release, Motorola Rings in 1995 with the Launch of the Marco Wireless Communicator; pp. 1-3; dated Feb. 6, 2006.
Suitespot, Netscape Mail Server, Version 2.0—Administrator's Guide; dated 1995,1996.
Suitespot, Netscape Mail Server, Version 2.0—Installation Guide for Windows NT; dated 1995,1996.
Suitespot, Netscape Mail Server, Version 2.0—User's Guide—dated 1995,1996.
Netscape News Server, Installation and Reference Guide, dated 1995.
Emerson, B.; Byte Magazine—New Mobile Communicators, 1 Pg.; dated Jun. 1996.
Manual—Nokia 9000 Communicator—User's Manual.
Nokia Introduces a World First—the Nokia 9000 Communicator; pp. 1-2; dated Mar. 25, 1996.
Nokia Unveils World's First All-In-One Communicator for the Americas; pp. 1-2; dated Sep. 19, 1996.
The New York Times, Appendix A—Notes on Notes Users; pp. 1-3; dated Jun. 12, 1995.
Issued Official Action from U.S. PTO for U.S. Appl. No. 90/007,040; dated Jun. 21, 2004.
Order (Granted Jan. 31, 2005) in the US District Court for the Eastern District of Texas Marshall Division, Civil Action No. 2:03-CV-333-TJW; *Visto Corporation* vs. *Seven Networks, Inc.*
Cooper, M. A.; Overhauling Rdist for the '90s; pp. 1-8I; dated Oct. 19, 1992-Jun. 23, 1992.
An Overview of The Ram Mobile Data, Inc.-Mobitex Packet Radio Networks Including a Summary of Radio/Modem and Terminal Design Requirements an Guidelines for Application Specific Software Design, Issue 2; pp. 1-61; dated Aug. 1990.
PalmPilot Handbook; pp. 1-200; dated 1997.
Colella, V.; Playing with Firewalls; pp. 1-10; dated Mar. 10, 1997.
IBM Pull-Push Replication; pp. 1-3; dated Feb. 6, 2006.
Theisen T.; AFS Distributed Filesystem FAQ; dated Jul. 25, 1994.
Remark! MultimediaClient for Windows User's Guide—Introduction.
RemoteWare Client for Windows NT and Windows 95—User's Guide; pp. 1-185; dated 1996.
RemoteWare Client for Windows NT and Windows 95—Administrator's Guide; pp. 1-217; dated 1996.
RemoteWare Client for Windows NT and Windows 95—User's Guide; pp. 1-68.
RSYNC(1)—Faster, Flexible Replacement for RCP; pp. 1-9; dated Mar. 7, 1996.
Reiher, P.; Rumor User's Manual, Version 0.1; pp. 1-11.
Ylomen, T.; Google Printout; SSH (Secure Shell) Remote Login; pp. 1-3; dated Jul. 12, 1995.
Hickman, Kipp E. B.; The SSL Protocol; dated Feb. 9, 1995.
Satyanaryanan, M.; IEEE Personal Communications, Mobile Information Access; pp. 26-33; dated 1996.
Terry, D., et al; Session Guarantees for Weakly Consistent Replicated Data.
Seven Network, Inc.'s Motion for Leave to Amend Its Preliminary Invalidity Contentions, filed on May 10, 2005 in the US District Court for the Eastern District of Texas Marshall Division, Civil Action No. 2:03-CV-333-TJW; *Visto Corporation* vs. *Seven Networks, Inc.*
Seven Network, Inc.'s Notice to Visto Corporation Pursuant to 35 U.S.C. §282 filed on Jun. 10, 2005 in the US District Court for the Eastern District of Texas Marshall Division, Civil Action No. 2:03-CV-333-TJW; *Visto Corporation* vs. *Seven Networks, Inc.*
Defendant Seven Network, Inc.'s Third Amended Answer to First Amended Complaint for Patent Infringement and Counterclaims filed on Mar. 30, 2006 in the US District Court for the Eastern District of Texas Marshall Division, Civil Action No. 2:03-CV-333-TJW; *Visto Corporation* vs. *Seven Networks, Inc.*
Seybold Report on Desktop Publishing, vol. 9, No. 5; pp. 1-7; dated Feb. 6, 2006.
O'Malley, C.; BYTE.com, Simonizing the PDA; pp. 1-7; Dec. 1994.
Business Wire; Skytel and CompuServe Team to Provide Wireless Messaging Services in Countries Worldwide; Skytel Adds to E-Mail Connectivity Options it Provides for Business Markets; pp. 1-3; dated May 1, 1995.
Smart Computing, Lotus Notes; pp. 1-2; dated Feb. 13, 2006.

Order (Granted Apr. 18, 2006) in the US District Court for the Eastern District of Texas Marshall Division, Civil Action No. 2:03-CV-333-TJW; *Visto Corporation* vs. *Seven Networks, Inc.*

Supplemental Expert Report of Timothy Halvorsen Regarding Invalidity of U.S. Patent No. 6,085,192 filed Feb. 13, 2006 in the US District Court for the Eastern District of Texas Marshall Division, Civil Action No. 2:03-CV-333-TJW; *Visto Corporation* vs. *Seven Networks, Inc.*

Austein, R.; Synchronization Operations for Disconnected IMAP4 Clients; 1Pg.; dated Nov. 1994.

IBM; The Architecture of Lotus Notes; pp. 1-18 of 27; dated Feb. 8, 2006.

The Domino Defense: Security in Lotus Notes and the Internet; pp. 1-167; dated Dec. 1997.

The History of Notes and Domino; pp. 1-16; dated Dec. 20, 2005.

Walker, B.; The Locus Distributed Operating System; pp. 49-70; dated 1983.

The Remark! Advantage, Big Sky; pp. 1-5; dated Jan. 20, 2006.

Press Release—Nokia Pioneers New Product Category with the World's First All-in-One Communicator; 1 Pg.; dated Mar. 13, 1996.

Terry D. B.; Towards a Quality of Service Model for Replicated Data Access.

Transcript of Preliminary Injunction Before the Honorable T. John Ward, United States District Judge dated Jan. 25, 2005 in the US District Court for the Eastern District of Texas Marshall Division, Civil Action No. 2:03-CV-333-TJW; *Visto Corporation* vs. *Seven Networks, Inc.*

Luotonen, A.; Tunneling SSL Through a WWW Proxy; pp. 1-4; dated Dec. 14, 1995.

Vahdat A.; Turning the Web into a Computer; 1 Pg.; dated Jun. 6, 1996.

Vahdat, A., et al; Turning the Web into a Computer; pp. 1-14.

Vahdat, A., et al; WebFS: A Global Cache Coherent File System; 12 Pgs.

ViaCrypt PGP, Pretty Good Privacy, Mailers Add-In, Version 2.7.1—User's Guide; 6 Pgs., dated 1995.

ViaCrypt PGP, Pretty Good Privacy, User's Manual, Version 2.7.1—For Windows; 10 Pgs., dated 1995.

Virtual Voice's Back Door (http://www.virtual-voice.com/FAQS/back2.html); pp. 1-4; dated Nov. 17, 1996.

Defendant Seven Network, Inc.'s Notice of Pretrial Disclosures, filed Jun. 10, 2005 in the US District Court for the Eastern District of Texas Marshall Division, Civil Action No. 2:03-CV-333-TJW; *Visto Corporation* vs. *Seven Networks, Inc.*

Defendant Seven Network, Inc.'s Third Amended Answer to First Amended Complaint for Patent Infringement and Counterclaims, filed Mar. 30, 2006 in the US District Court for the Eastern District of Texas Marshall Division, Civil Action No. 2:03-CV-333-TJW; *Visto Corporation* vs. *Seven Networks, Inc.*

Supplemental Report of Dr. Benjamin Goldberg Regarding Materiality of the Lotus Notes Prior Art, filed Oct. 19, 2006 in the US District Court for the Eastern District of Texas Marshall Division, Civil Action No. 2:03-CV-333-TJW; *Visto Corporation* vs. *Seven Networks, Inc.*

WebMail—Q&A; 1 Pg.; dated Sep. 27, 1995.

WebMail—Q&A; pp. 1-4; dated Sep. 27, 1995.

WebMail—Tech Notes—FYIs; pp. 1-5; dated Jan. 11, 1996.

Hills, A., et al.; Wireless Data Network Infrastructure at Carnegie Mellon University; pp. 1-14; dated Feb. 1996.

Rixon, A., Google Printout, Secure File Transfer Ala Rdist; pp. 1-8; dated Jul. 17, 1995.

deLespinasse, A.; Rover Mosaic: E-Mail Communication for a Full-Function Web Browser; pp. 1-43; dated Jun. 1995.

Rdisdt—Remote File Distribution Server Program; 10 Pgs.; dated Jun. 21, 1992.

Expert Report of Robert Balaban Regarding Invalidity of U.S. Patent Nos. 5,986,131; 6,023,708; 6,085,192 and 6,708,221 w/Exhibits A-K, filed May 5, 2005 in the US District Court for the Eastern District of Texas Marshall Division, Civil Action No. 2:03-CV-333-TJW; *Visto Corporation* vs. *Seven Networks, Inc.*

Declaration of James M. Anderson III w/Exhibits 1-4, filed in the US District Court for the Eastern District of Texas Marshall Division, Civil Action No. 2:03-CV-333-TJW; *Visto Corporation* vs. *Seven Networks, Inc.*

RIM's Invalidity Contentions w/Exhibit A, Exhibit B, Exhibit C w/Appendix A, Exhibit D w/Appendix B(4) & Exhibit E w/Appendix A, filed Apr. 30, 2007 in the US District Court for the Eastern District of Texas Marshall Division; Civil Action No. 2-06-CV-181; *Visto Corporation* vs. *Research in Motion Limited, et al.*

Visto's Claim Construction Presentation; (in the US District Court for the Eastern District of Texas Marshall Division); Civil Action No. 2:06-CV-039 (TJW); *Visto Corporation* vs. *Good Technology*; pp. 1-181.

Defendant Good Technology's Claim Construction Presentation; (in the US District Court for the Eastern District of Texas Marshall Division); Civil Action No. 2:06-CV-039 (TJW); *Visto Corporation* vs. *Good Technology*; pp. 1-100; Dated Oct. 9, 2007.

Defendant Good Technology's Technology Tutorial; (in the US District Court for the Eastern District of Texas Marshall Division); Civil Action No. 2:06-CV-039 (TJW); *Visto Corporation* vs. *Good Technology*; pp. 1-39; Dated Oct. 9, 2007.

Defendant Good Technology, Inc.'s Responsive Claim Construction Brief and Exhibits 1-10; (in the US District Court for the Eastern District of Texas Marshall Division); Civil Action No. 2:06-CV-039 (TJW); *Visto Corporation* vs. *Good Technology*; Filed Sep. 10, 2007.

Visto Corporation's Opening Claim Construction Brief and Exhibits A-S; (in the US District Court for the Eastern District of Texas Marshall Division); Civil Action No. 2:06-CV-039 (TJW); *Visto Corporation* vs. *Good Technology*; Filed Aug. 28, 2007.

Visto's Reply to Good's Responsive Claim Construction Brief; (in the US District Court for the Eastern District of Texas Marshall Division); Civil Action No. 2:06-CV-039 (TJW); *Visto Corporation* vs. *Good Technology*; Filed Sep. 19, 2007.

Research in Motion's Claim Construction Brief Regarding the RIM Patents, and Exhibits A-G; filed Sep. 17, 2007 in the US District Court Eastern District of Texas Marshall Division; Civil Action No. 2:06-CV-181; *Visto Corporation* vs. *Research in Motion Limited, et al.*

Research in Motion's Reply Claim Construction Brief Regarding the RIM Patents, and Exhibits H, I and J; filed Oct. 12, 2007 in the US District Court Eastern District of Texas Marshall Division; Civil Action No. 2:06-CV-181-TJW; *Visto Corporation* vs. *Research in Motion Limited, et al.*

RIM's Responsive Brief in Support of RIM's Claim Constructions for Visto's Patents, and Exhibits A-Z and Exhibits AA & BB; filed Oct. 2, 2007 in the US District Court for the Eastern District of Texas Marshall Division; Civil Action No. 2-06-CV-181-TJW; *Visto Corporation* vs. *Research in Motion Limited, et al.*

RIM's Sur-Reply Brief in Support of RIM's Claim Constructions for Visto's Patents, and Exhibits A-B; filed Oct. 18, 2007 in the US District Court for the Eastern District of Texas Marshall Division; Civil Action No. 2-06-CV-181-TJW; *Visto Corporation* vs. *Research in Motion Limited, et al.*

Visto Corporation's Opening Claim Construction Brief, Filed Under Seal, and Exhibits A-W, filed Sep. 18, 2007 in the US District Court for the Eastern District of Texas Marshall Division, Civil Action No. 2-06-CV-181-TJW; *Visto Corporation* vs. *Research in Motion Limited, et al.*

Visto's Reply to RIM's Responsive Claim Construction Brief, Filed Under Seal, and Exhibits X-Z and Exhibit AA, filed Oct. 12, 2007 in the US District Court for the Eastern District of Texas Marshall Division; Civil Action No. 2-06-CV-181-TJW; *Visto Corporation* vs. *Research in Motion Limited, et al.*

Visto Corporation's Responsive Claim Construction Brief Regarding the RIM Patents w/Exhibits A-F; filed Oct. 2, 2007 in the US District Court for the Eastern District of Texas Marshall Division; Civil Action No. 2-06-CV-181-TJW; *Visto Corporation* vs. *Research in Motion Limited, et al.*

Visto's Response to RIM's Sur-Reply Brief Regarding Claim Constructions for the Visto Patents; filed Oct. 31, 2007 in the US District Court for the Eastern District of Texas Marshall Division; Civil Action No. 2-06-CV-181-TJW(CE); *Visto Corporation* vs. *Research in Motion Limited, et al.*

RIM's Redirector Patents, (patent No. US 6,219,694 B1 & US 6,389,457 B2); pp. 1-68.
RIM's Markman Hearing Presentation; Nov. 1, 2007, Civil Action No. 2:06-CV-181 (TJW); *Visto Corporation v. Research in Motion Ltd., et al.*; pp. 1-103.
Visto's Claim Construction Presentation; (in the US District Court for the Eastern District of Texas Marshall Division); Civil Action No. 2:06-CV-181 (TJW); *Visto Corporation vs. Research in Motion Limited, et al.*; pp. 1-79.
Visto Markman Slides; pp. 1-185.
Visto's Claim Construction Presentation on Visto's Patents; (in the US District Court for the Eastern District of Texas Marshall Division); Civil Action No. 2-06-CV-181-TJW; *Visto Corporation vs. Research in Motion Limited, et al.*; pp. 1-120.
Zelnick, N.; Service Synchronizes Users' Desktop Data Over Web; pp. 5-6; dated Oct. 20, 1997.
Seven Networks, Inc.'s Opposition to Visto's Motion to Strike Declaration of Kent Thexton in Support of Seven's Motion for a Stay of the Injunction; (in the US District Court for the Eastern District of Texas Marshall Division); Civil Action No. 2:03-CV-333 (TJW); *Visto Corporation vs. Seven Networks, Inc.*; pp. 1-3; Filed Nov. 30, 2006.
Visto Corporation's Response in Opposition to Seven Networks, Inc.'s Motion to Dismiss Visto Corporation's Counterclaim for Infringement of the '606 Patent on Grounds of Res Judicata; (in the US District Court for the Eastern District of Texas Marshall Division); Civil Action No. 2:05-CV-365 (TJW); *Seven Networks vs. Visto Corporation.*; pp. 1-11; Filed Feb. 12, 2007.
Seven Network, Inc.'s Motion to Shorten the Time to Respond to Its Motion to Compel Manatt, Phelps & Phillips, LLP's Prosecution and Litigation Billing Records (in the US District Court for the Eastern District of Texas Marshall Division); Civil Action No. 2:03-CV-333 (TJW); *Visto Corporation vs. Seven Networks.*; pp. 1-4; Filed Feb. 25, 2007.
Visto Corporation's Response to Smartner Information Systems, Ltd.'s Motion to Compel Third Parties to Comply With Deposition Subpoenas; (in the US District Court for the Eastern District of Texas Marshall Division); Civil Action No. 2:05-CV-91 (TJW); *Visto Corporation vs. Smartner Information Systems, Ltd.*; pp. 1-3; Filed Mar. 5, 2007.
Smartner Information Systems, Ltd.'s Reply Brief in Support of Its Motion to Compel Third Parties to Comply With Deposition Subpoenas and Request for Attorneys' Fees (in the US District Court for the Eastern District of Texas Marshall Division); Civil Action No. 2:05-CV-91 (TJW); *Visto Corporation vs. Smartner Information Systems, Ltd.*; pp. 1-4; Filed Mar. 9, 2007.
Declaration of Jason T. Anderson in Support of Smartner Information Systems, Ltd.'s Motion to Compel Third Parties of Comply With Deposition Subpoenas and Request for Attorneys' Fees (in the US District Court for the Eastern District of Texas Marshall Division); Civil Action No. 2:05-CV-091 (TJW); *Visto Corporation vs. Smartner Information Systems, Ltd.*; pp. 1-2; Filed Mar. 9, 2007.
Visto Corporation's Sur-Rely to Smartner Information Systems, Ltd's Motion to Compel Third Parties to Comply With the Deposition Subpoenas; (in the US District Court for the Eastern District of Texas Marshall Division); Civil Action No. 2:05-CV-91 (TJW); *Visto Corporation vs. Smartner Information Systems, Ltd.*; pp. 1-6; Filed Mar. 19, 2007.
Smartner Information Systems, Ltd.'s Opposition to Visto Corporation's Motion to Dismiss; (in the US District Court for the Eastern District of Texas Marshall Division); Civil Action No. 2:05-CV-91 (TJW); *Visto Corporation vs. Smartner Information Systems, Ltd.*; pp. 1-6; Filed Mar. 29, 2007.
Visto's Unopposed Motion for Extension of Time to File Its Surreply in Opposition to Smartner's Statement Regarding False Testimony of Greg Warder; (in the US District Court for the Eastern District of Texas Marshall Division); Civil Action No. 2:05-CV-91 (TJW); *Visto Corporation vs. Smartner Information Systems, Ltd.*; pp. 1-2; Filed Apr. 18, 2007.
Order; (in the US District Court for the Eastern District of Texas Marshall Division); Civil Action No. 2:05-CV-91 (TJW); *Visto Corporation vs. Smartner Information Systems, Ltd.*; 1 Pg.; Filed Apr. 23, 2007.

Notice of Non-Opposition to Seven's Motion for Leave to Exceed the Page Limits in Seven Networks, Inc.'s Reply in Support of Its Motion for Relief From the Judgment Based on Fraud, Other Misconduct, and Newly Discovered Evidence; (in the US District Court for the Eastern District of Texas Marshall Division); Civil Action No. 2:03-CV-333 (TJW); *Visto Corporation vs. Seven Network's, Inc.'s*; pp. 1-3; Filed May 1, 2007.
Expert Report of Timothy M. Halvorsen w/Exhibits A-C; (in the US District Court for the Eastern District of Texas Marshall Division); Civil Action No. 2:05-CV-91 (TJW); *Visto Corporation vs. Smartner Information Systems, Ltd.*; Filed Jun. 15, 2007.
Nokia 9000 Communicator; User's Manual; dated 1995.
Lotus Notes Internet Cookbook for Notes Release 4; pp. 1-37; dated Feb. 14, 1996.
Ylonen, T.; SSH—Secure Shell Client (Remote Login Program); pp. 1-7; dated Jun. 29, 1995.
Kramer, Matt; Remote Possibilities: Gateways Let Remote Users Exchange Mail Via Web Browsers; Elonex Software Solutions' HT Mail 1.3, Infinite Technologies' WebMail 1.02, and Lotus's cc: Mail for the Web; Includes a Related Article on the Test Methodology: PC Week Netweek; Software Review, Evaluation; 5 Pgs.; dated Apr. 15, 1996.
RIM's Supplemental Claim Construction Brief in Support of RIM's Claim Constructions for Visto's Patents and Exhibits A-J; *Visto Corporation v. Research in Motion* (U.S. District Court for the Eastern District of Texas—Marshall Division; Case No. 2-06-CV-181-TJW); Filed Dec. 12, 2007.
Visto's Response to RIM's Supplemental Brief Regarding Claim Constructions for the Visto Patents and Exhibits A-F; *Visto Corporation v. Research in Motion* (U.S. District Court for the Eastern District of Texas—Marshall Division; Case No. 2-06-CV-181-TJW); Filed Jan. 3, 2008.
Memorandum Opinion and Order; *Visto Corporation v. Good Tech., Inc.*; (U.S. District Court for the Eastern District of Texas—Marshall Division; Case No. 2-06-CV-039) Filed Jan. 16, 2008.
Expert Report of Timothy M. Halvorsen and Exhibits A-C; *Visto Corporation v. Smartner Information Systems, Ltd.* (U.S. District Court for the Eastern District of Texas—Marshall Division; Case No. 2-05-CV-91-TJW); Filed Jun. 15, 2007.
Lotus Notes Release 4.1 Starter Pack; North American Edition; 2 Pgs. (Defendant Ex. No. 277; SNI472986-SNI472987; Civil Action No. 2:03-CV-333-TJW).
Lotus Notes Release 4—Starter Pack; 4 Pgs.; (Defendant Ex. No. 278; SNI472988-SNI472991; Civil Action No. 2:03-CV-333-TJW).
Lotus Notes 4 Release—Internotes Web Navigator Administrator's Guide; pp. 1-56; (Defendant Ex. No. 279; SNI472992-SNI473051; Civil Action No. 2:03-CV-333-TJW).
Lotus Notes 4 Release—Internotes Web Publisher Guide; (1995, 1996) (Defendant Ex. No. 280; SNI473052-SNI473173; Civil Action No. 2:03-CV-333-TJW).
Lotus Customer Support—North American Guide; (Defendant Ex. No. 281; SNI473174-SNI473224; Civil Action No. 2:03-CV-333-TJW).
Lotus Notes Release 4—Install Guide for Servers; (1995, 1996) (Defendant Ex. No. 282; SNI473225-SNI473292; Civil Action No. 2:03-CV-333-TJW).
Lotus Notes Release 4.1—Release Notes; pp. 1-194; (1995, 1996) (Defendant Ex. No. 283; SNI473293-SNI473489; Civil Action No. 2:03-CV-333-TJW).
Lotus Notes Release 4—Migration Guide; pp. 1-104; (1995, 1996) (Defendant Ex. No. 284; SNI473490-SNI473599; Civil Action No. 2:03-CV-333-TJW).
Lotus Notes Release 4—Database Manager's Guide; pp. 1-109; (1995); (SNI473600-SNI473714).
Lotus Notes Server—Up and Running!—Release 4; pp. 1-9; (1996) (Defendant Ex. No. 286; SNI473715-SNI473727; Civil Action No. 2:03-CV-333-TJW).
Lotus Notes Release 4—Lotusscript Classes for Notes Release 4; 6 Pgs. (Defendant Ex. No. 287; SNI473728-SNI473733; Civil Action No. 2:03-CV-333-TJW).
Lotus Communications Software Agreement for cc:Mail, Notes, and Related Products; 10 Pgs. (Defendant Ex. No. 288; SNI473734-SNI473743; Civil Action No. 2:03-CV-333-TJW).

Lotus Communications Software Agreement for cc:Mail, Notes, and Related Products; 10 Pgs. (Defendant Ex. No. 289; SNI473744-SNI473753; Civil Action No. 2:03-CV-333-TJW).
Order Form for Lotus Notes and cc:Mail Products; 2 pgs. (Defendant Ex. No. 290; SNI473754-SNI473755; Civil Action No. 2:03-CV-333-TJW).
Lotus Notes Release 4—Install Guide for Workstations; pp. 1-57; (1995, 1996) (Defendant Ex. No. 291; SNI473756-SNI473822; Civil Action No. 2:03-CV-333-TJW).
Lotus Customer Support—North American Guide; pp. 1-14 (Defendant Ex. No. 292; SNI473823-SNI473851; Civil Action No. 2:03-CV-333-TJW).
Lotus—Step by Step—A Beginner's Guide to Lotus Notes; pp. 1-179; (1995, 1996) (Defendant Ex. No. 293; SNI473852-SNI474030; Civil Action No. 2:03-CV-333-TJW).
Lotus Notes Release 4—Network Configuration Guide; pp. 1-125; (1995,1996) (SNI474031-SNI474164).
Lotus Notes Release 4—Internotes Web Navigator User's Guide; pp. 1-54; (1995) (Defendant Ex. No. 294; SNI474165-SNI474220; Civil Action No. 2:03-CV-333-TJW).
Lotus Notes Release 4—Programmer's Guide (Part 1); pp. 1-594; (1995) (Defendant Ex. No. 295; SNI474221-SNI474834; Civil Action No. 2:03-CV-333-TJW).
Lotus Notes Release 4—Administrator's Guide; pp. 1-496; (1995) (SNI474835-SNI475333).
Lotus Notes Release 4—Deployment Guide; pp. 1-99; (1995) (Defendant Ex. No. 297; SNI475334-SNI475437; Civil Action No. 2:03-CV-333-TJW).
Lotus Notes Release 4—Application Developer's Guide; pp. 1-464; (1995) (Defendant Ex. No. 298; SNI475438-SNI475912; Civil Action No. 2:03-CV-333-TJW).
Lotus Notes Release 4—Programmer's Guide (Part 2); pp. 595-1036; (1995) (Defendant Ex. No. 299; SNI475913-SNI476374; Civil Action No. 2:03-CV-333-TJW).
Lotus 4.1 and Lotus Internotes (CD Copies); 5 Pgs. (Defendant Ex. No. 300; SNI476375-SNI476379; Civil Action No. 2:03-CV-333-TJW).
Lotus Notes Release 4—Desktop Packaging; 7 Pgs.; (1995) (SNI476380-SNI476386).
Lotus Notes Release 4—Install Guide for Workstations; pp. 1-18; (1995) (SNI476387-SNI476414).
Lotus Software Agreement; Notes 4.0 NA DKPT Client UPG; (SNI476415-SNI476422).
Lotus Notes Release 4—Internotes Web Navigator User's Guide; pp. 1-54; (1995) (SNI476423-SNI476478).
Lotus Notes Release 4—Release Notes; pp. 1-136; (1995) (SNI476479-SNI476617).
Lotus Notes—Step by Step, A Beginner's Guide to Lotus Notes; pp. 1-179; (1995) (SNI476618-SNI476796).
Lotus Notes 4—Installation CDs; 3 Pgs. (SNI476797-SNI476799).
Falkner, M.; How to Plan, Develop, and Implement Lotus Notes in Your Organization, Covers Version 4.0; pp. 1-520; (1996) (SNI476800-SNI477338).
Lamb, John P., et al; Lotus Notes Networks Design for Release 3 and 4; pp. 1-262; (1996) (SNI700492-SNI700769).
Lotus Notes Desktop, The Groupware Standard; (1995) (Defendant Ex. No. 315 SNI700786-SNI700793; Civil Action No. 2:03-CV-333-TJW).
Release Notes, Lotus Notes Workstation Release 3.36; Part No. 359157; (1995, 1996) (SNI700794-SNI700881).
Lotus Imaging Tools, Image Display and Fax Capability for Notes and cc: Mail; (1995) (SNI700882-SNI700900).
Lotus Upgrade Certificate, Notes NA 3.30 Desktop Client; (1994) (SNI700901-SNI700904).
Lotus Software Agreement; (SNI700905-SNI700910); (1995).
Lotus Authorized Education Center (LAEC) Program; "Now There Are More Opportunities Than Ever to Get Educated With Lotus"; (SNI700911-SNI700912).
Registration Card for Product Updates; "Don't Miss Out on Any of the Latest Information From Intel!"; (SNI700913-SNI700914).
Order Form for Lotus Notes and cc:Mail Products; "Receive Your Single Source to Lotus Notes and cc:Mail Products and Services Absolutely Free." (SNI700915-SNI700916).
Lotus Quick Reference for Smarticons; Lotus Notes Release 3.1; (SNI700917-SNI700920).
Lotus Quick Reference for Windows and Presentation Manager; Lotus Notes Release 3; (SNI700921-SNI700926).
Lotus Quick Reference for Macintosh; Lotus Notes Release 3; (SNI700927-SNI700932).
Lotus Customer Support—North American Guide; (SNI700933-SNI700961).
Lotus Notes Release 3.3, The Groupware Standard, Workstation Install for Windows, OS/2 and Macintosh; (1993, 1994, 1995); (SNI700962-SNI701008).
Overview, What Is Lotus Notespump?; (SNI701009-SNI701097).
Notespump 1.0 Release Notes; (Defendant Ex. No. 335; SNI701098-SNI701105; Civil Action No. 2:03-CV-333-TJW).
Lotus Notespump 1.0 CD; (1995) (Defendant Ex. No. 338; SNI701174; Civil Action No. 2:03-CV-333-TJW).
Lotus Notes Desktop Groupware and E-Mail for the Net, 4.5 Release; (1996); (SNI701531-SNI701541).
Lotus Communications Software Agreement for Notes, Domino, cc:Mail and Related Products; (SNI701542-SNI701559).
Lotus Customer Support Guide, Notes Desktop 4.5 NA Client; (SNI701560-SNI701557).
The View Subscription Card; (SNI701568-SNI701569).
Notes & Domino Subscription Card; (SNI701570-SNI701571).
Now There Are More Opportunities Than Ever to Get Educated With Lotus; (SNI701572-SNI701573).
Lotus—Welcome Page; (SNI701574).
Lotus Notes, Install Guide for Workstations, 4.5 Release; (1995, 1996); pp. 1-72; (SNI701575-SNI701655).
Lotus Notes, Release 4.5.7, Release Notes; (1985-1999); pp. 1-295; (SNI701656-SNI701966).
Lotus, Step by Step, A Beginner's Guide to Lotus Notes;(1995,1996); (SNI701967-SNI702210).
Lotus Notes, (Windows) The Groupware Standard; (1985; 1994); (SNI702211-SNI702217).
Lotus Notes Release 3.1, The Groupware Standard, Customer Services Application Guide; (1994); (SNI702218-SNI702263).
Lotus Notes Release 3.1, The Groupware Standard, Getting Started With Application Development; (1993,1994) (SNI702264-SNI702414).
Lotus Notes Release 3.1, The Groupware Standard, Network Driver Documentation; (1992, 1993; 1994); (SNI702415-SNI702687).
Lotus Software Agreement, Notes NA 3.30 WIN Server; (SNI702688-SNI702693).
Lotus Upgrade Certificate, Notes NA 3.30 WIN Server; (SNI702694-SNI702695).
Lotus Notes Software Registration Card; (SNI702696-SNI702697).
PC World Magazine Subscription Card; (SNI702698-SNI702699).
The Notes Report Subscription Order Form; (SNI702698-SN1702699).
Order Form for the Notes Report—The Handy, Hands-on Guide to Lotus Notes; (SNI702700-SNI702701).
Now There Are More Opportunities Than Ever to Be a Lotus Notes Expert; (SNI702702-SNI702703).
Media Exchange; (SNI702704-SNI702705).
Lotus Letter to New Purchasers; (Feb. 1995); (SNI702706-SNI702708).
Lotus Software Agreement, Notes Courseware AP DEV 1; (SNI702709-SNI702712).
Lotus Notes Data Access Tools Now Available!; (SNI702713-SNI702714).
Lotus Notes Release 3; Quick Reference for Application Developers; (SNI702715-SNI702720).
Lotus Customer Support Services, Lotus Notes Customer Support Guide; (SNI702721-SNI702753).
Lotus Notes Release 3.30 Windows, OS/2, and Macintosh; (1995); (SNI702754-SNI702842).
Lotus Notes Release 3.3; The Groupware Standard, Administration Guide; (1994, 1995); (SNI702843-SNI702862).
Lotus Notes Release 3.1; The Groupware Standard, Site and Systems Planning Guide; (1991, 1994); (Defendant Ex. No. 371; SNI702863-SNI703031; Civil Action No. 2:03-CV-333-TJW).

Lotus Notes Release 3.1; The Groupware Standard, Administrator's Guide, Server for Netware, OS/2, and UNIX; (1989, 1993, 1994); (Defendant Ex. No. 372; SNI703032-SNI703539; Civil Action No. 2:03-CV-333-TJW).

Lotus Notes CD's (Client for Windows Release 3.30) and Data Disk (Lotus Notes Courseware Application Development 1); (1995); (Defendant Ex. No. 373; SNI703540-SNI703542; Civil Action No. 2:03-CV-333-TJW).

Lotus Notes Data Disk 2 for Lotus Notes Courseware Application Development 1; (Defendant Ex. No. 377; SNI703544-SNI703545; Civil Action No. 2:03-CV-333-TJW).

Frenkel, Garry, Network Computing; Reviews—Pumping for Info: Notes and Database Integration; pp. 1-10; (May 1, 1996); (SNI703557-SNI703566).

Allchin, James E., Dissertation—An Architecture for Reliable Decentralized Systems; (1983); pp. 1-173; (SNI703584-SNI703768).

Screenshots Lotus Notes Administration Help; (SNI703769-SNI703785).

Chapter 13-1, Anatomy of a Note ID; (Defendant Ex. No. 386; SNI703786-SNI703793; Civil Action No. 2:03-CV-333-TJW).

Supplement to Seven's Preliminary Invalidity Contentions Patent Rule 3-3; *Visto Corporation* v. *Seven Networks, Inc.*.; (U.S. District Court for the Eastern District of Texas—Marshall Division; Case No. 2-03-CV-333-TJW); Filed Jan. 31, 2005.

Plaintiff Visto Corporation's Supplemental Claim Construction Brief Regarding Definiteness of 35 U.S.C. §112 ¶ 6 Claim Term and Exhibits A-K; *Visto Corporation* v. *Good Tech., Inc.*; (U.S. District Court for the Eastern District of Texas—Marshall Division; Case No. 2-06-CV-039 (TJW)) Filed Jan. 23, 2008.

Tso, Michael., et al.; Always on, Always Connected Mobile Computing; pp. 918-924; (1996).

Government Computer News; 1 Pg.; (Oct. 25, 1993).

The MMDF Frequently Asked Questions List (FAQ), http://www.faqs.org/faqs/mail/mmdf-faq/part1/; pp. 1-27; (Nov. 5, 1998).

Microsoft Exchange Server 5.0 Available; http://ww.microsoft.com/presspass/press/1997/mar97/excavapr.mspx?pf=true; pp. 1-2; (Mar. 11, 1997).

Microsoft Announces Outlook 98 Beta 2 Now Available for Web Download; Updated Beta 2 Combines Leading Internet E-Mail Support With Integrated Information Management Features. http://www.faxmarketing.co.uk/cgi-bin/stories.pl?ACCT=104&STORY=/www/story/12-1 . . . ; pp. 1-2; (Dec. 17, 1997).

Raggett, D., et al.; HTML 4.01 Specification; http://www.w3.org/TR/1999/REC-html1401-19991224/htm140.txt; pp. 1-316; (Dec. 24, 1999).

Leiba, B.; IMAP 4 Idle Command; http://www.ietf.org/rfc/rfc2177.txt?number=2177; pp. 1-4; (Jun. 1997).

Dierks, T., et al; The TLS Protocol Version 1.0; http://www.ietf.org/rfc/rfc2246.txt?number =2246; pp. 1-75; (Jan. 1999).

Montenegro, G.; Reverse Tunneling for Mobile IP; http://www.ietf.org/rfc/rfc2344.txt?number=2344; pp. 1-18; (May 1998).

Hoffman, P.; SMTP Service Extension for Secure SMTP Over TLS; http://www.ietf.org/rfc/rfc2487.txt?number=2487; pp. 1-8; (Jan. 1999).

Newman, C.; Using TLS With IMAP, POP3 and ACAP; http://www.ietf.org/rfc/rfc2595.txt?number=2595; pp. 1-15; (Jun. 1999).

Fielding, R., et al.; Hypertext Transfer Protocol—HTTP/1.1; http://www.ietf.org/rfc/rfc2616.txt; pp. 1-165; (Jun. 1999).

Mobitex Product Information, Access Products; http://web.archive.org/web/19970720041703/www.ericsson.com/US/mobitex/202.html; pp. 1-2; (Feb. 4, 1997).

EVO Virtual Office; http://web.archive.org/web/19970720041727/www.ericsson.com/US/mobitex/204.html; pp. 1-3; (Feb. 2, 1997).

Upcoming EVO Reseller Seminars; http://web.archive.org/web/19970617134010/www.ericsson.com/US/mobitex/208.html; 1 Pg.; (Feb. 11, 1997).

Mobitex Applications: Streamlining Communications in Every Industry; http://web.archive.org/web/19970720041655/www.ericsson.com/US/mobitex/201.html; pp. 1-2; (Nov. 28, 1996).

Mobitex Network Architecture; http://web.archive.org/web/19970720041712/www.ericsson.com/US/mobitex/203.html; 1 Pg.; (Nov. 28, 1996).

Mobitex Product Information; http://web.archive.org/web/19970617133949/www.ericsson.com/US/mobitex/200.h . . . ; 1 Pg.; (Nov. 28, 1996).

Mobitex Technical Assistance; http://web.archive.org/web/19970720041719/www.ericsson.com/US/mobitex/207.html; 1 Pg.; (Nov. 28, 1996).

EVO—Wireless Middleware for Back Office, Ericsson's Wireless Middleware That Lets Your LAN Go Anywhere; http://web.archive.org/web/19970617134758/www.ericsson.com/US/mobitex/209.html; pp. 1-3; (Nov. 28, 1996).

Business Wire, DTS Wireless Licenses Infowave Office Enabler, Strengthens Offerings for Corporate Market; http://thefreelibrary.com/_/print/PrintArticle.aspx?id=19170926; pp. 1-2; (Mar. 3, 1997).

Hall, R.; Allpoints Card/Wyndmail Service, Wireless Messaging Solution for the HP Palmtop; http://palmtoppaper.com/ptphtml/28/pt280025.htm; pp. 1-2; (Sep. 1, 1996).

Business Wire—Look Smart—Wyndmail Bundled With Powerbook 3400 Gives Mobile Users Wireless E-Mail, Fax, Messaging Services; Wyndmail Keeps Powerbook Users Connected Without Phone Lines, Wires, Dial-up, Long Distance Charges or Waiting; http://findarticles.com/p/articles/mi_m0EIN/is_1997_Feb_17/ai_191231 . . . ; pp. 1-2; (Feb. 10, 1997).

Zoomner Omnigo Information, Wyndmail Information; http://www.grot.com/zoomer/omnigo/wyndmail.html; pp. 1-2; (Oct. 22, 1995).

The Free Library, Announcing Zap-It Low-Cost, Full-Featured, Ready-to-Use Wireless Messaging Service; Wireless Fax, E-Mail and More From User's Laptop Computer Bundles With New IBM Wireless Modem for Mobitex for 30-Day Free Trial; pp. 1-4; (Mar. 14, 1995).

Highbeam/Business Wire—Encyclopedia; DTS Wireless Breaks Barrier in Wireless Messaging, Delivers on Customers' No. 1 Request; pp. 1-5; (Nov. 3, 1997).

Raths, D.; Portland Business Journal, DTS Chooses Portland for Roll-Out of Wireless Service; pp. 1-3; (Sep. 27, 1996).

Go America Communications, Media Center; pp. 1-2; (Jul. 14, 1998).

Business Wire, Zap-It Streamlines Incoming Messages With New Personal Toll-Free Number; pp. 1-4; (Apr. 28, 1997).

Hosseinoff, J.; PCMCIA Mobitex Cellular Modem; pp. 1-9; (Mar. 14, 1995).

The Free Library—Business Wire, DTS Wireless Promotes Purchase of Windows CE Devices With Zap-It Wireless Service Through PC Expo Special; pp. 1-4; (Jun. 12, 1997).

Portable Design, Pager Processor Problem Solved!; pp. 18 & 20; (Mar. 1997).

Radiomail Ships Wireless E-Mail Software; Product Announcement; Brief Article; No. 4, vol. 10; p. 162; ISSN: 1069-562116786996; (Apr. 1, 1995).

Churbuck, D.; Proquest, "Never Did I Think I'd Welcome a Flight Delay"; http://proquest.umi.com.myaccess.library.utoronto.ca/pqdweb?did=420000&sid=3&Fmt=3&clientID=12520&RQT=309&VName=PQD; pp. 1-2; (Oct. 12, 1992).

Shaffer, R. A.; Proquest, Express Mail, New Style; http://proquest.umi.com.myaccess.library.utoronto.ca/pqdweb?did=421032&sid=1&Fmt=3&clientID=12520&RQT=309&VName=PQD; pp. 1-2; (Mar. 1, 1993).

Plavnicky, Rick M., et al.; Internet Mail via Radio Link @ PC-Expo; http://groups.google.com/group/comp.sys.palmtops/browse_thread/thread/43bde80f561e6d . . . ; pp. 1-2; (Jun. 30, 1992).

Coursey, D.; Proquest, GE's Wireless E-MIL: "The Next Best Thing to Magic"; http://proquest.umi.com.myaccess.library.utoronto.ca/pqlink?vinst=PROD&fmt=3&start; pp. 1-2; (Sep. 14, 1992).

DeRose, James F.; The Wireless Data Handbook; pp. 1-286; (1994).

The HP Palmtop Paper, Secrets of the Super Organized; vol. 5, No. 5; 5 Pgs.; (1996).

The HP Palmtop Paper, HP Reveals New Windows CE-Based Palmtop, vol. 5, No. 66; 4 Pgs.; (1996).

The HP Palmtop Paper, The Japanese—What They're Doing With the HP Palmtop; vol. 6, No. 1; 4 Pgs.; (1997).

The HP Palmtop Paper, The PC Card Review; vol. 6., Bonus Issue 2; 3 Pgs.; (1997).

Mann, S.; Handheld Systems 5.1, Handheld News—Regulars; 1 Pg.; (Jan. 1997-Feb. 1997).

Rooney, P.; PC Week, Startup Expands Messaging Options for Remote Users; Software Taps RAM Wireless Network (Wynd Communications Corp's Wyndmail for Windows E-Mail Package); pp. 30-31; (Nov. 21, 1994).
Send and Receive Messages From Almost Anywhere; Radiomail Bundled on Motorola Envoy Personal Wireless Communicator; 2 Pgs.; (Mar. 7, 1994) Business Wire.
First Two-Way Wireless Messaging Application for Magic Cap Developed by Radiomail; 2 Pgs.; (Jan. 6, 1994) Business Wire.
Korzeniowski, P.; Users Cautiously Wade Into Wireless Services; pp. 1-20; (Nov. 14, 1994).
Terdoslavich, B.; Wireless Computing: Electronic Mail; pp. 8-9; (Sep. 12, 1994).
Radosevich, L.; E-Mail Conference Highlights Is Challenges; 2 Pgs.; (Nov. 1, 1993).
Business Wire, After a Three-Month Struggle, Laser Solutions Solved Its Wireless Messaging Problem in Three Minutes With Radiomail; pp. 27-29; (Dec. 5, 1994).
Strom, D.; Reality Communications Review; pp. 37-45; (May 1994).
Loudermilk, S.; RAM Mobile Data Partners to Link Programs Over Wireless Mail Network; RAM Mobile Data Inc.; pp. 19-20; (Nov. 2, 1992).
RAM Hard Data, vol. 3, No. 1; pp. 1-8; Spring 1993 RAM Voted Messaging Company of the Year.
Lotus cc:Mail Wireless Messaging; 2 Pgs.; (1994) RAM Mobile Data.
RadioMail Corporation; 2 Pgs.; (Jun. 1995).
Motorola—emailVClient; 2 Pgs.; (1998).
Defendant Good Technology, Inc.'s Reply to Plaintiff Visto Corporation's Supplemental Claim Construction Brief Regarding Definiteness of 35 U.S.C. §112 ¶ 6 Claim Term and Exhibit A; *Visto Corporation* v. *Good Tech., Inc.*; (U.S. District Court for the Eastern District of Texas—Marshall Division; Case No. 2-06-CV-039) Filed Jan. 30, 2008.
U.S. Appl. No. 13/038,801, filed Mar. 2, 2011, Mendez, et al.
3Com: Handbook for the Palm VTM Organizer—PDA Defense, 1998.
PDA Defense User Guide, 2000.
Infinite Technologies: Infinite Interchange User's Guide, Apr. 1997.
Melnick, Dinman, Muratov et al: PDA Security Incorporating Handhelds into the Enterprise—PDA Defense, Apr. 2003.
Microsoft TechNet: Guide to MS Windows NT 4.0 Profiles and Policies, Jul. 1993, from Jul. 25, 2013.
Microsoft Press: Windows NT Resource Guide (p. 39-48) and (p. 279-287).
Technical White Paper BlackBerry Security for Lotus Domino version 2.0 with Service Pack 1a (2001).
Microsoft Press: Microsoft Windows NT Server Networking Guide (p. 3-10 and 65-78).
Microsoft: Chapter 3—Managing User Work Environments, Jul. 25, 2013.
Microsoft: Chapter 3—Managing User Work Environments, Oct. 11, 2013.
*Visto Corp.* v *Good Technology*: Nokia 9000i Owner Manual, 1995.
PDABomb Enterprise License—PDA Defense, Jul. 26, 2013.
PDABomb Enterprise License—PDA Defense, Feb. 2001.
PDABombTM for Palm OS®—PDA Defense.
zTrace Technologies: zControlTM (zControl Datasheet).
zTrace Technologies: zSecurity Suite (Internal Process Flow), Jun. 13, 2002.
zTrace Technologies: zSecurity Suite—Features and Benefits, Jun. 13, 2002.
zTrace Technologies: zSecurity Suite (zTrace Feature Matrix), Jun. 13, 2002.
Melnikov @ zTrace Technologies: zSecurity Suite (zTrace Features Description), Jul. 29, 2013.
Altiris 6 Handheld Management Suite, Oct. 14, 2004.
Apple Newton, 1995.
AT&T PocketNet Phone, 1996.
Bitfone MVP Product and related software as described in U.S. Appl. No. 60/760,286, filed Oct. 25, 2005.
Casio Cassiopeia E-115 Pocket PC User's Guide, 2000.
Casio Zoomer, Oct. 1993.
Combining Location and Data Management in an Environment for Total Mobility, Feb. 1, 1996.
Computer Associates Unicenter TNG Asset Management Option 3.1, Jan. 2001.
Concurrent Versioning Software (CVS), 1990.
DARPA Open Object-Oriented Database Preliminary Module Specification, Change Management Module, Nov. 25, 1991.
How Not to Save Cached Internet Files with Roaming User Profiles, Dec. 5, 2003.
How to Install Microsoft Mobile Information Server 2002 Server Active Sync, Dec. 17, 2002.
IBM DataPropagator, 1994.
IBM Simon, 1994.
IBM Tivoli Configuration Manager 4.2, Aug. 2002.
IBM Tivoli Monitoring Workbench, Feb. 2002.
Microsoft Internet Explorer 3.01, Oct. 1996.
Microsoft Windows XP, Aug. 2001.
Motorola Envoy, Apr. 10, 1995.
Motorola Marco, Apr. 10, 1995.
Nokia 9000 Communicator, 1995.
Pilot Organizer, 1996.
Roam: A Scalable Replication System for Mobile and Distributed Computing, Jan. 1998.
Selective Replication: Fine Grain Control of Replicated Filed, Jan. 1995.
Sharp Zaurus, Dec. 15, 1994.
Sony Magic Link, 1994.
User's Guide: Hewlett Packard iPAQ hx2000 Series Pocket PC, 2004.
Windows History: Internet Explorer History, Jun. 30, 2003.
XcelleNet RemoteWare, 1996.
Microsoft Systems Management Server 2003 with Device Management Feature Pack.
US 5,373,559, 12/1994, Kaufman et al. (withdrawn)

\* cited by examiner

*Primary Examiner* — Backhean Tiv
(74) *Attorney, Agent, or Firm* — EIP US LLP

(57) ABSTRACT

A client stores a first set of workspace data, and is coupled via a computer network to a global server. The client may be configured to synchronize portions of the first set of workspace data with the global server, which stores independently modifiable copies of the portions. The global server may also store workspace data which is not downloaded from the client, and thus stores a second set of workspace data. The global server may be configured to identify and authenticate a user seeking global server access from a remote terminal, and is configured to provide access to the first set or to the second set. Further, services may be stored anywhere in the computer network. The global server may be configured to provide the user with access to the services. The system may further include a synchronization-start module at the client site (which may be protected by a firewall) that initiates interconnection and synchronization with the global server when predetermined criteria have been satisfied.

36 Claims, 15 Drawing Sheets

SYSTEM AND METHOD FOR GLOBALLY AND SECURELY ACCESSING UNIFIED INFORMATION IN A COMPUTER NETWORK

CROSS-REFERENCE TO RELATED APPLICATIONS

This application is a continuation and claims the benefit of priority under 35 U.S.C. §120 from U.S. application Ser. No. 11/340,083, filed Jan. 25, 2006, which is a continuation of U.S. application Ser. No. 10/741,113, filed Dec. 19, 2003, which is a continuation of U.S. application Ser. No. 09/666,877 filed Sep. 20, 2000, which is a continuation of U.S. application Ser. No. 08/903,118 filed Jul. 30, 1997, which is a continuation-in-part of co-pending patent application Ser. No. 08/766,307, filed on Dec. 13, 1996, and of co-pending patent application Ser. No. 08/841,950, filed on Apr. 8, 1997 and of co-pending patent application Ser. No. 08/835,997, filed on Apr. 11, 1997, and of co-pending patent application Ser. No. 08/865,075, filed on May 29, 1997. The entire contents of these applications are incorporated herein by reference.

BACKGROUND OF THE INVENTION

1. Field of the Invention

This invention relates generally to computer networks, and more particularly provides a system and method for globally and securely accessing unified information in a computer network.

2. Description of the Background Art

The internet currently interconnects about 100,000 computer networks and several million computers. Each of these computers stores numerous application programs for providing numerous services, such as generating, sending and receiving e-mail, accessing World Wide Web sites, generating and receiving facsimile documents, storing and retrieving data, etc.

A roaming user, i.e., a user who travels and accesses a workstation remotely, is faced with several problems. Program designers have developed communication techniques for enabling the roaming user to establish a communications link and to download needed information and needed service application programs from the remote workstation to a local computer. Using these techniques, the roaming user can manipulate the data on the remote workstation and, when finished, can upload the manipulated data back from the remote workstation to the local computer. However, slow computers and slow communication channels make downloading large files and programs a time-consuming process. Further, downloading files and programs across insecure channels severely threatens the integrity and confidentiality of the downloaded data.

Data consistency is also a significant concern for the roaming user. For example, when maintaining multiple independently modifiable copies of a document, a user risks using an outdated version. By the time the user notices an inconsistency, interparty miscommunication or data loss may have already resulted. The user must then spend more time attempting to reconcile the inconsistent versions and addressing any miscommunications.

The problem of data inconsistency is exacerbated when multiple copies of a document are maintained at different network locations. For example, due to network security systems such as conventional firewall technology, a user may have access only to a particular one of these network locations. Without access to the other sites, the user cannot confirm that the version on the accessible site is the most recent draft.

Data consistency problems may also arise when using application programs from different vendors. For example, the Netscape Navigatorm web engine and the Internet Explorerm web engine each store bookmarks for quick reference to interesting web sites. However, since each web engine uses different formats and stores bookmarks in different files, the bookmarks are not interchangeable. In addition, one web engine may store a needed bookmark, and the other may not. A user who, for example, runs the Internet Explorer™ web engine at home and runs the Netscape Navigator™ web engine at work risks having inconsistent bookmarks at each location.

Therefore, a system and method are needed to enable multiple users to access computer services remotely without consuming excessive user time, without severely threatening the integrity and confidentiality of the data, and without compromising data consistency.

SUMMARY OF THE INVENTION

The present invention provides a system and methods for providing global and secure access to services and to unified (synchronized) workspace elements in a computer network. A user can gain access to a global server using any terminal, which is connected via a computer network such as the Internet to the global server and which is enabled with a web engine.

A client stores a first set of workspace data, and is coupled via a computer network to a global server. The client is configured to synchronize selected portions of the first set of workspace data (comprising workspace elements) with the global server, which stores independently modifiable copies of the selected portions. The global server may also store workspace data not received from the client, such as e-mail sent directly to the global server. Accordingly, the global server stores a second set of workspace data. The global server is configured to identify and authenticate a user attempting to access it from a remote terminal, and is configured to provide access based on the client configuration either to the first set of workspace data stored on the client or to the second set of workspace data stored on the global server. It will be appreciated that the global server can manage multiple clients and can synchronize workspace data between clients.

Service engines for managing services such as e-mail management, accessing bookmarks, calendaring, network access, etc. may be stored anywhere in the computer network, including on the client, on the global server or on any other computer. The global server is configured to provide the user with access to services, which based on level of authentication management or user preferences may include only a subset of available services. Upon receiving a service request from the client, the global server sends configuration information to enable access to the service.

Each client includes a base system and the global server includes a synchronization agent. The base system and synchronization agent automatically establish a secure connection therebetween and synchronize the selected portions of the first set of workspace data stored on the client and the second set of workspace data stored on the global server. The base system operates on the client and examines the selected portions to determine whether any workspace elements have been modified since last synchronization. The synchronization agent operates on the global server and informs the base system whether any of the workspace elements in the second set have been modified. Modified version may then be exchanged so that an updated set of workspace elements may be stored at both locations, and so that the remote user can access an updated database. If a conflict exists between two versions, the base system then performs a responsive action such as examining content and generating a preferred version, which may be stored at both locations. The system may further include a synchronization-start module at the client site (which may be protected by a firewall) that initiates interconnection and synchronization when predetermined criteria have been satisfied.

A method of the present invention includes establishing a communications link between the client and the global server. The method includes establishing a communications link between the client and a service based upon user requests. The method receives configuration data and uses the configuration data to configure the client components such as the operating system, the web engine and other components. Configuring client components enables the client to communicate with the service and provides a user-and-service-specific user interface on the client. Establishing a communications link may also include confirming access privileges.

Another method uses a global translator to synchronize workspace elements. The method includes the steps of selecting workspace elements for synchronization, establishing a communications link between a client and a global server, examining version information for each of the workspace elements on the client and on the global server to determine workspace elements which have been modified since last synchronization. The method continues by comparing the corresponding versions and performing a responsive action. Responsive actions may include storing the preferred version at both stores or reconciling the versions using content-based analysis.

The system and methods of the present invention advantageously provide a secure globally accessible third party, i.e. the global server. The system and methods provide a secure technique for enabling a user to access the global server and thus workspace data remotely and securely. Because of the global firewall and the identification and security services performed by the global server, corporations can store relatively secret information on the global server for use by authorized clients. Yet, the present invention also enables corporations to maintain only a portion of their secret information on the global server, so that there would be only limited loss should the global server be compromised. Further, the global server may advantageously act as a client proxy for controlling access to services, logging use of keys and logging access of resources.

A client user who maintains a work site, a home site, an off-site and the global server site can securely synchronize the workspace data or portions thereof among all four sites. Further, the predetermined criteria (which control when the synchronization-start module initiates synchronization) may be set so that the general synchronization module synchronizes the workspace data upon user request, at predetermined times during the day such as while the user is commuting, or after a predetermined user action such as user log-off or user log-on. Because the system and method operate over the Internet, the system is accessible using any connected terminal having a web engine such as an internet-enabled smart phone, television settop (e.g., web TV), etc. and is accessible over any distance. Since the system and method include format translation, merging of workspace elements between different application programs and different platforms is possible. Further, because synchronization is initiated from within the firewall, the typical firewall, which prevents in-bound communications and only some protocols of out-bound communications, does not act as an impediment to workspace element synchronization.

Further, a roaming user may be enabled to access workspace data from the global server or may be enabled to access a service for accessing workspace data from a client. For example, a user may prefer not to store personal information on the global server but may prefer to have remote access to the information. Further, the user may prefer to store highly confidential workspace elements on the client at work as added security should the global server be compromised.

The present invention may further benefit the roaming user who needs emergency access to information. The roaming user may request a Management Information Systems (MIS) director controlling the client to provide the global server with the proper keys to enable access to the information on the client. If only temporary access is desired, the keys can then be later destroyed either automatically or upon request. Alternatively, the MIS director may select the needed information as workspace elements to be synchronized and may request immediate synchronization with the global server. Accordingly, the global server and the client can synchronize the needed information, and the user can access the information from the global server after it has completed synchronization.

The present invention also enables the system and methods to synchronize keys, available services and corresponding service addresses to update accessibility of workspace data and services. For example, if the user of a client accesses a site on the Internet which requires a digital certificate and the user obtains the certificate, the system and methods of the present invention may synchronize this newly obtained certificate with the keys stored on the global server. Thus, the user need not contact the global server to provide it with the information. The synchronization means will synchronize the information automatically.

DETAILED DESCRIPTION OF THE PREFERRED EMBODIMENT

Figure 1:
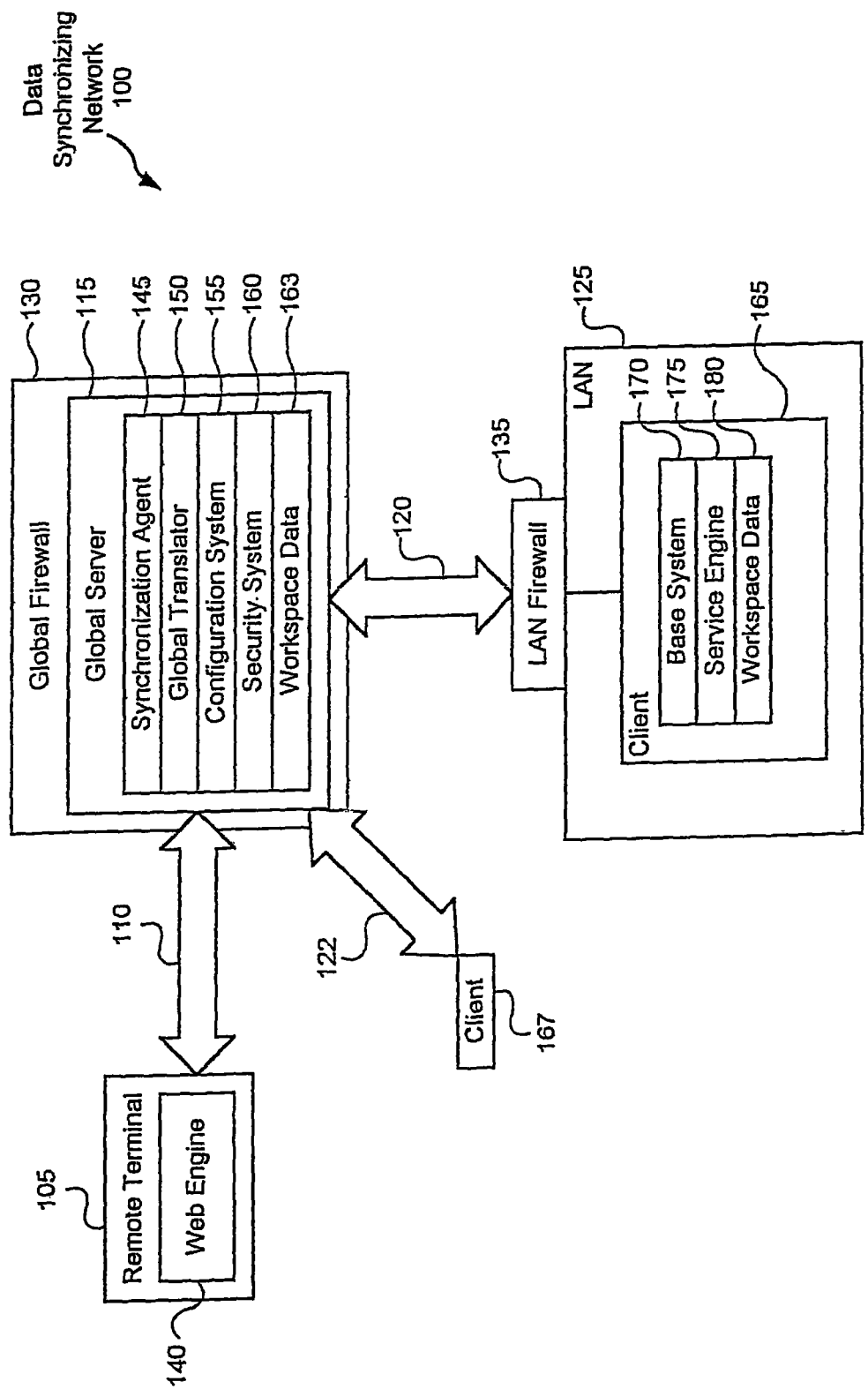
FIG. 1 is a block diagram illustrating a secure data-synchronizing remotely accessible network in accordance with the present invention.

FIG. 1 is a block diagram illustrating a network 100, comprising a first site such as a remote computer terminal 105 coupled via a communications channel 110 to a global server 115. The global server 115 is in turn coupled via a communications channel 120 to a second site such as a Local Area Network (LAN) 125 and via a communications channel 122 to a third site such as client 167. Communications channel 110, communications channel 120 and communications channel 122 may be referred to as components of a computer network such as the Internet. The global server 115 is protected by a global firewall 130, and the LAN 125 is protected by a LAN firewall 135.

Figure 7:
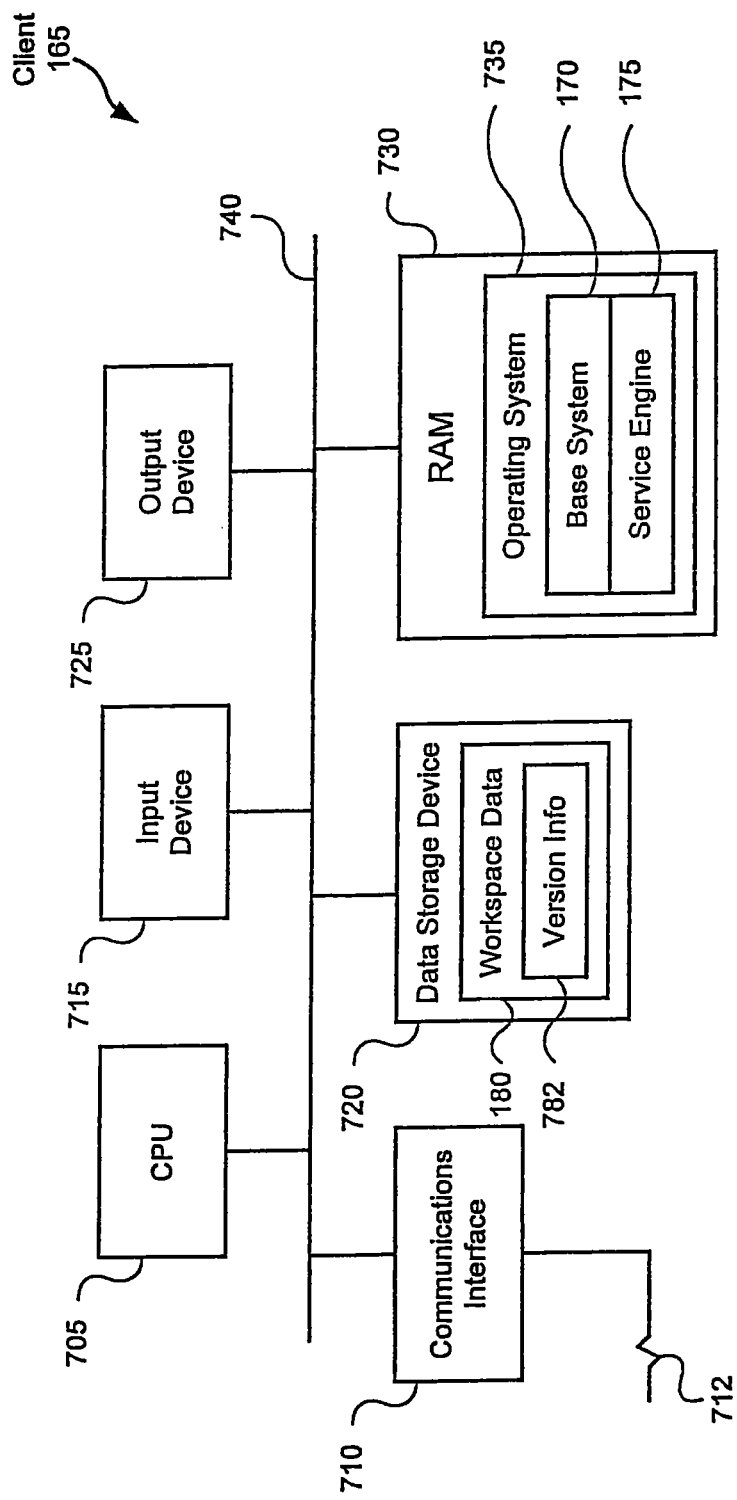
FIG. 7 is a block diagram illustrating the details of a FIG. 1 client.

The LAN 125 comprises a client 165, which includes a base system 170 for synchronizing workspace data 180 (e-mail data, file data, calendar data, user data, etc.) with the global server 115 and may include a service engine 175 for providing computer services such as scheduling, e-mail, paging, word-processing or the like. Those skilled in the art will recognize that workspace data 180 may include other types of data such as application programs. It will be further appreciated that workspace data 180 may each be divided into workspace elements, wherein each workspace element may be identified by particular version information 782 (FIG. 7). For example, each e-mail, file, calendar, etc. may be referred to as "a workspace element in workspace data." For simplicity, each workspace element on the client 165 is referred to herein as being stored in format A. It will be further appreciated that the workspace data 180 or portions thereof may be stored at different locations such as locally on the client 165, on other systems in the LAN 125 or on other systems (not shown) connected to the global server 115.

The client 167 is similar to the client 165. However, workspace data stored on the client 167 is referred to as being stored in format B, which may be the same as or different than format A. All aspects described above and below with reference to the client 165 are also possible with respect to the client 167. For example, client 167 may include services (not shown) accessible from remote terminal 105, may include a base system (not shown) for synchronizing workspace elements with the global server 115, etc.

The global server 115 includes a security system 160 for providing only an authorized user with secure access through firewalls to services. The security system 160 may perform identification and authentication services and may accordingly enable multiple levels of access based on the level of identification and authentication. The global server 115 further includes a configuration system 155 that downloads configuration data 356 (FIGS. 3 and 6) to the remote terminal 105 to configure remote terminal 105 components such as the operating system 270 (FIG. 2), the web engine 283 (FIG. 2), the applet engine 290 (FIG. 2), etc. The configuration system 155 uses the configuration data 356 to enable the remote terminal 105 to access the services provided by the service engine 175 and to provide a user-and-service-specific user interface.

The global server 115 stores workspace data 163, which includes an independently modifiable copy of each selected workspace element in the selected portions of the workspace data 180. Accordingly, the workspace data 163 includes an independently modifiable copy of each corresponding version information 782 (FIG. 7). The workspace data 163 may also include workspace elements which originate on the global server 115 such as e-mails sent directly to the global server 115 or workspace elements which are downloaded from another client (not shown). The global server 115 maintains the workspace data 163 in a format, referred to as a "global format," which is selected to be easily translatable by the global translator 150 to and from format A and to and from format B. As with format A and format B, one skilled in the art knows that the global format actually includes a global format for each information type. For example, there may be a global format for bookmarks (FIG. 5), a global format for files, a global format for calendar data, a global format for e-mails, etc.

The global server 115 also includes a synchronization agent 145 for examining the workspace elements of workspace data 163. More particularly, the base system 170 and the synchronization agent 145, collectively referred to herein as "synchronization means," cooperate to synchronize the workspace data 163 with the selected portions of the workspace data 180. The synchronization means may individually synchronize workspace elements (e.g., specific word processor documents) or may synchronize workspace element folders (e.g., a bookmark folder). Generally, the base system 170 manages the selected portions of the workspace data 180 within the LAN 125 and the synchronization agent 145 manages the selected portions of workspace data 163 within the global server 115. It will be appreciated that the global translator 150 cooperates with the synchronization means to translate between format A (or format B) and the global format. It will be further appreciated that the global server 115 may synchronize the workspace data 163 with workspace data 180 and with the workspace data (not shown) on the client 167. Accordingly, the workspace data 163 can be easily synchronized with the workspace data (not shown) on the client 167.

The remote terminal 105 includes a web engine 140, which sends requests to the global server 115 and receives information to display from the global server 115. The web engine 140 may use HyperText Transfer Protocol (HTTP) and HyperText Markup Language (HTML) to interface with the global server 115. The web engine 140 may be enabled to run applets, which when executed operate as the security interface for providing access to the global server 115 and which operate as the application interface with the requested service. Using the present invention, a user can operate any remote client 105 connected to the Internet to access the global server 115, and thus to access the services and the workspace data on or accessible by the global server 115.

Figure 2:
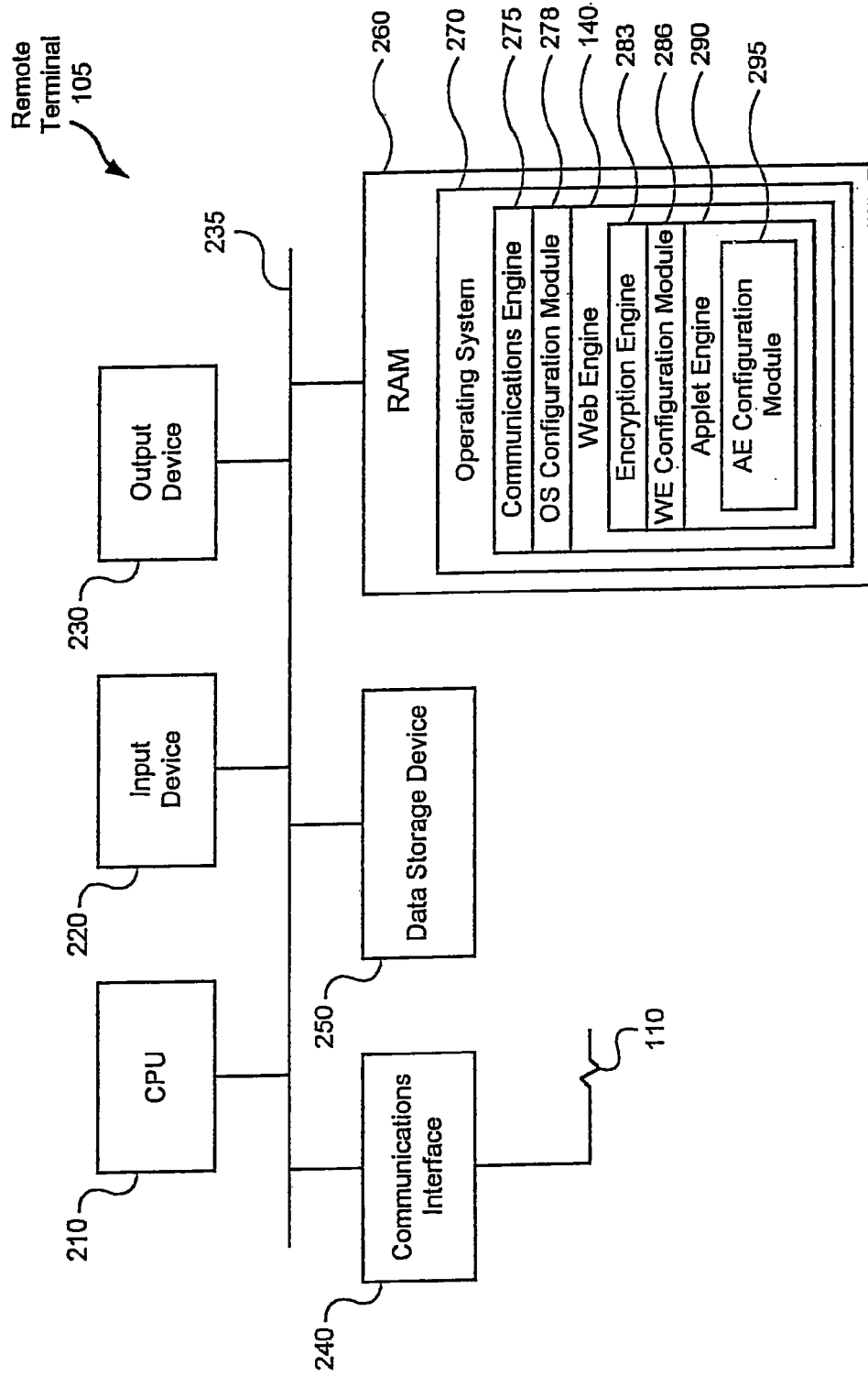
FIG. 2 is a block diagram illustrating details of a FIG. 1 remote terminal.

FIG. 2 is a block diagram illustrating details of the remote terminal 105, which includes a Central Processing Unit (CPU) 210 such as a Motorola Power PC™ microprocessor or an Intel Pentium™ microprocessor. An input device 220 such as a keyboard and mouse, and an output device 230 such as a Cathode Ray Tube (CRT) display are coupled via a signal bus 235 to CPU 210. A communications interface 240, a data storage device 250 such as Read Only Memory (ROM) and a magnetic disk, and a Random-Access Memory (RAM) 260 are further coupled via signal bus 235 to CPU 210. The communications interface 240 is coupled to a communications channel 110 as shown in FIG. 1.

An operating system 270 includes a program for controlling processing by CPU 210, and is typically stored in data storage device 250 and loaded into RAM 260 (as shown) for execution. Operating system 270 further includes a communications engine 275 for generating and transferring message packets via the communications interface 240 to and from the communications channel 110. Operating system 270 further includes an Operating System (OS) configuration module 278, which configures the operating system 270 based on OS configuration data 356 (FIG. 3) such as Transmission Control Protocol (TCP) data, Domain Name Server (DNS) addresses, etc. received from the global server 115.

Operating system 270 further includes the web engine 140 for communicating with the global-server 115. The web engine 140 may include a web engine (WE) configuration module 286 for configuring elements of the webengine 140 such as home page addresses, bookmarks, caching data, user preferences, etc. based on the configuration data 356 received from the global server 115. The web engine 140 may also include an encryption engine 283 for using encryption techniques to communicate with the global server 115. The web engine 140 further may include an applet engine 290 for handling the execution of downloaded applets including applets for providing security. The applet engine 290 may include an Applet Engine (AE) configuration module 295 for configuring the elements of the applet engine 290 based on configuration data 356 received from the global server 115.

Figure 3:
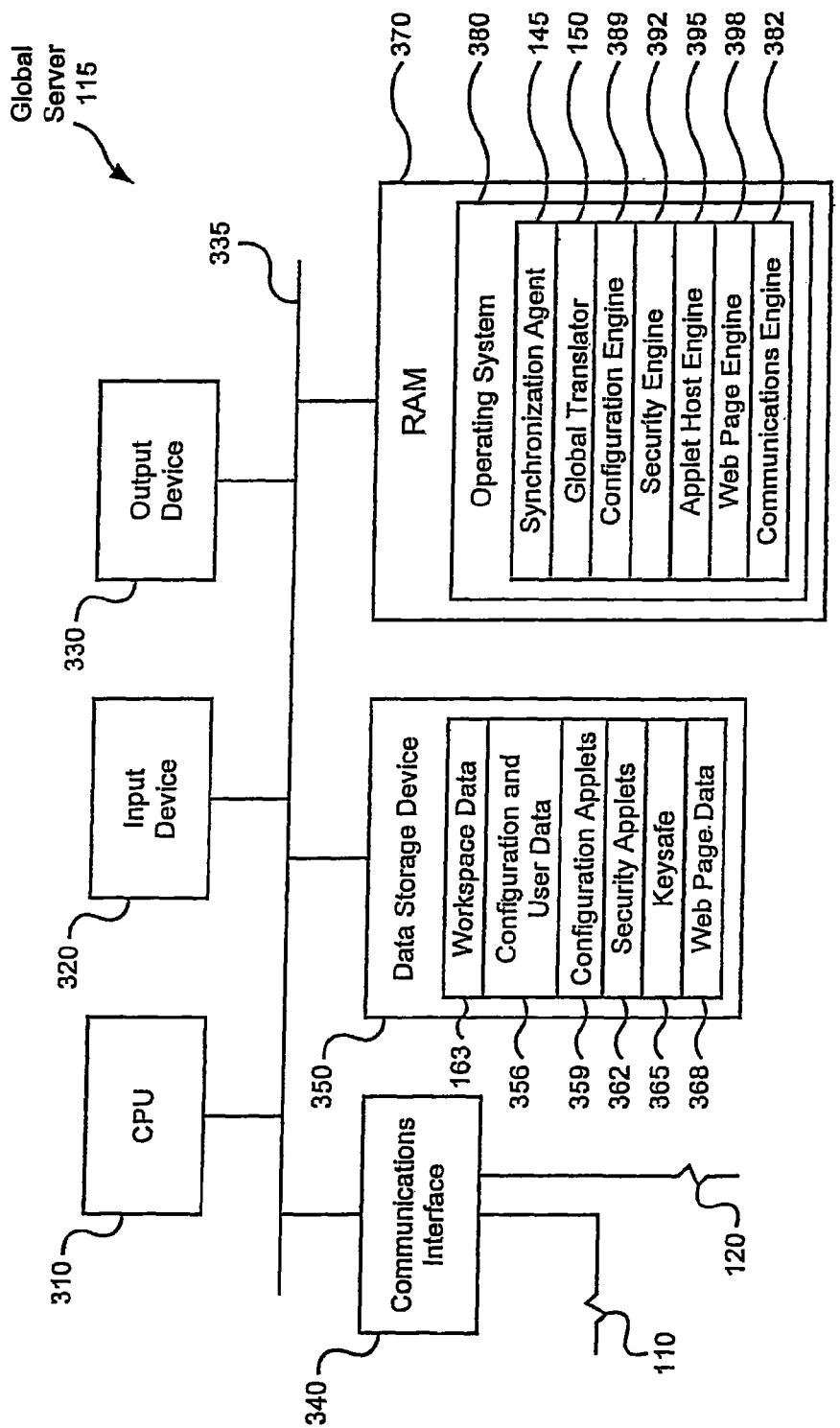
FIG. 3 is a block diagram illustrating details of a FIG. 1 global server.

FIG. 3 is a block diagram illustrating details of the global server 115, which includes a Central Processing Unit (CPU) 310 such as a Motorola Power PC™ microprocessor or an Intel Pentium™ microprocessor. An input device 320 such as a keyboard and mouse, and an output device 330 such as a Cathode Ray Tube (CRT) display are coupled via a signal bus 335 to CPU 310. A communications interface 340, a data storage device 350 such as Read Only Memory (ROM) and a magnetic disk, and a Random-Access Memory (RAM) 370 are further coupled via signal bus 335 to CPU 310. As shown in FIG. 1, the communications interface 340 is coupled to the communication: channel 110 and to the communications channel 120.

An operating system 380 includes a program for controlling processing by CPU 310, and is typically stored in data storage device 350 and loaded into RAM 370 (as illustrated) for execution. The operating system 380 further includes a communications engine 382 for generating and transferring message packets via the communications interface 340 to and from the communications channel 345. The operating system 380 also includes a web page engine 398 for transmitting web page data 368 to the remote terminal 105, so that the remote terminal 105 can display a web page 900 (FIG. 9) listing functionality offered by the global server 115. Other web page data 368 may include information for displaying security method selections.

The operating system 380 may include an applet host engine 395 for transmitting applets to the remote terminal 105. A configuration engine 389 operates in conjunction with the applet host engine 395 for transmitting configuration applets 359 and configuration and user data 356 to the remote terminal 105. The remote terminal 105 executes the configuration applets 359 and uses the configuration and user data 356 to configure the elements (e.g., the operating system 270, the web engine 140 and the applet engine 290) of the remote terminal 105. Configuration and user data 356 is described in greater detail with reference to FIG. 6.

The operating system 380 also includes the synchronization agent 145 described with reference to FIG. 1. The synchronization agent 145 synchronizes the workspace data 163 on the global server 115 with the workspace data 180 on the client 165. As stated above with reference to FIG. 1, the global translator 150 translates between format A used by the client 165 and the global format used by the global server 115.

The operating system 380 may also includes a security engine 392 for determining whether to instruct a communications engine 382 to create a secure communications link with a client 165 or terminal 105, and for determining the access rights of the user. For example, the security engine 392 forwards to the client 165 or remote terminal 105 security applets 362, which when executed by the receiver poll the user and respond back to the global server 115. The global server 115 can examine the response to identify and authenticate the user.

For example when a client 165 attempts to access the global server 115 the security engine 384 determines whether the global server 115 accepts in-bound communications from a particular port. If so, the security engine 392 allows the communications engine 382 to open a communications channel 345 to the client 165. Otherwise, no channel will be opened. After a channel is opened, the security engine 392 forwards an authentication security applet 362 to the remote terminal 105 to poll the user for identification and authentication information such as for a user ID and a password. The authentication security applet 362 will generate and forward a response back to the global server 115, which will use the information to verify the identity of the user and provide access accordingly.

It will be appreciated that a "request-servicing engine" may be the configuration engine 389 and the applet host engine 395 when providing services to a remote terminal 105 or client 165. The request-servicing engine may be the web page engine 398 when performing workspace data 163 retrieval operations directly from the global server 115. The request-servicing engine may be the configuration engine 389 and the applet host engine 395 when performing workspace data 180 retrieval operations from the client 165 or from any other site connected, to the global server 115. The request-servicing engine may be security engine 392 when performing security services such as user identification and authentication. The request-servicing engine may be the synchronization agent when the performing synchronization with the client 165. Further, the request-servicing engine may be any combination of these components.

Figure 4:
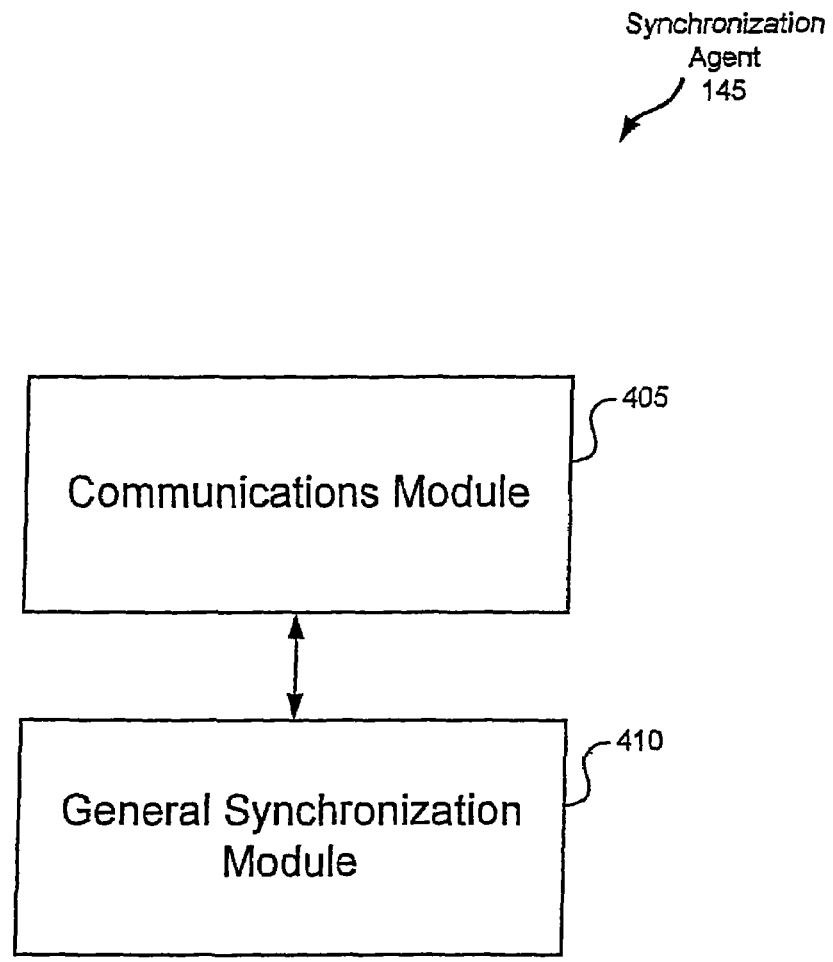
FIG. 4 is a block diagram illustrating details of a FIG. 1 synchronization agent.

FIG. 4 is a block diagram illustrating details of the synchronization agent 145, which includes a communications module 405 and a general synchronization module 410. The communications module 405 includes routines for compressing data and routines for communicating via the communications channel 120 with the base system 170. The communications module 405 may further include routines for communicating securely channel through the global firewall 130 and through the LAN firewall 125.

The general synchronization module 410 includes routines for determining whether workspace elements have been synchronized and routines for forwarding to the base system 170 version information (not shown) of elements determined to be modified after last synchronization. The general synchronization module 410 may either maintain its own last synchronization signature (not shown), receive a copy of the last synchronization signature with the request to synchronize from the base system 170, or any other means for insuring that the workspace data has been synchronized. The general synchronization module 410 further includes routines for receiving preferred versions of workspace data 180 workspace elements from the base system 170, and routines for forwarding preferred versions of workspace data 180 workspace elements to the base system 170.

Figure 5:
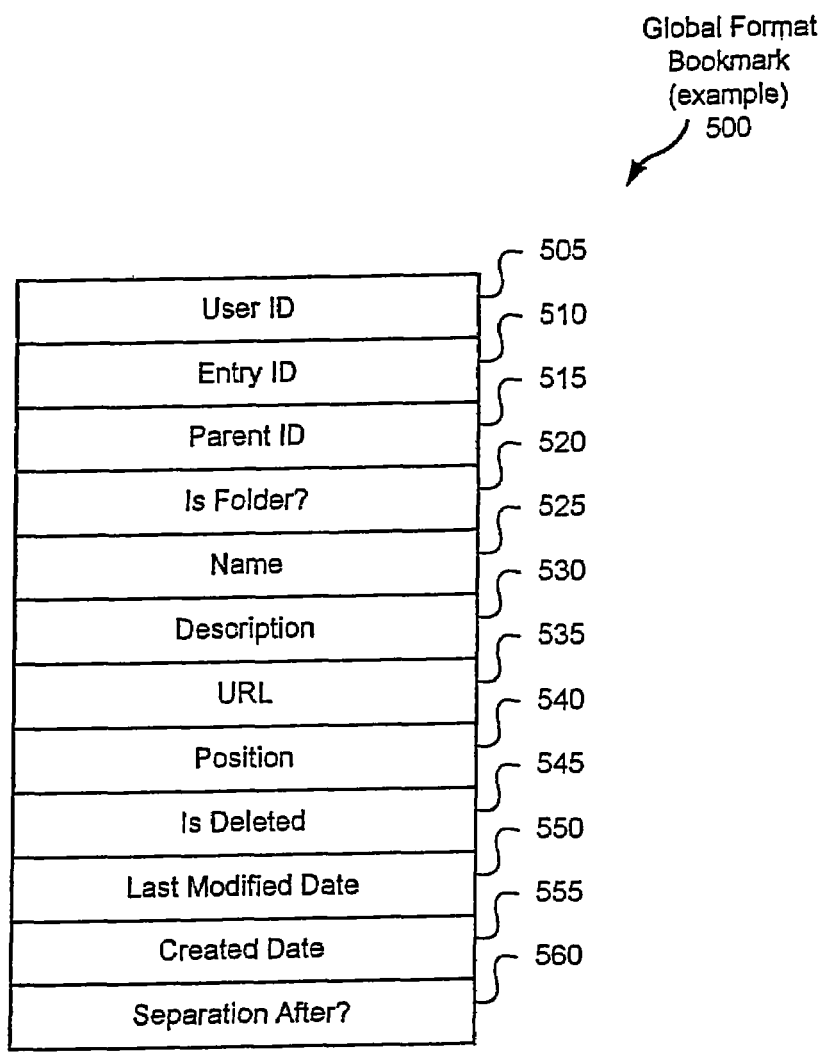
FIG. 5 is a graphical representation of an example bookmark in global format.

FIG. 5 illustrates an example bookmark workspace element in the global format. The translator 150 incorporates all the information needed to translate between all incorporated formats. For example, if for a first client a bookmark in format A needs elements X, Y and Z and for a second client a bookmark in format B needs elements W, X and Y, the global translator 150 incorporates elements W, X, Y and Z to generate a bookmark in the global format. Further, the translator 150 incorporates the information which is needed by the synchronization means (as described below in FIG. 4) such as the last modified date. Accordingly, a bookmark in the Global Format may include a user identification (ID) 505, an entry ID 510, a parent ID 515, a folder ID flag 520, a name 525, a description 530, the Uniform Resource Locator (URL) 535, the position 540, a deleted ID flag 545, a last modified date 550, a created date 555 and a separation ID flag 560.

Figure 6:
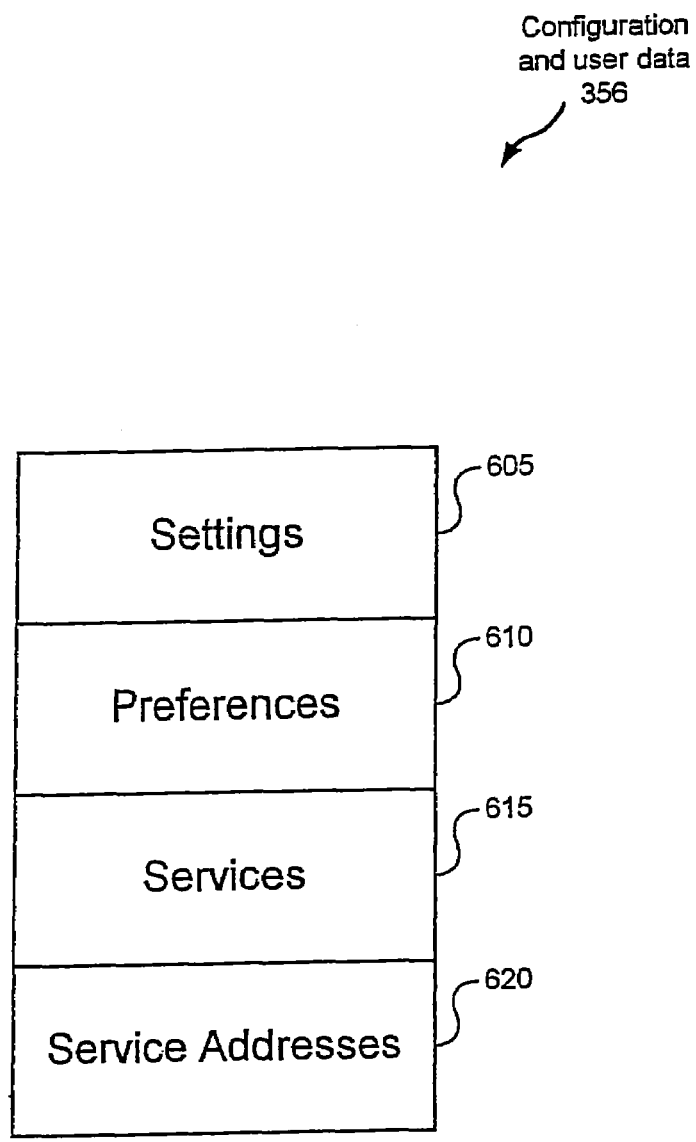
FIG. 6 is a graphical representation of the FIG. 3 configuration data.

FIG. 6 is a block diagram illustrating details of the configuration and user data 356. Configuration data 356 includes settings 605 such as TCP data and the DNS address, web browser settings such as home page address, bookmarks and caching data, applet engine settings, and applet configuration data such as the user's e-mail address, name and signature block. It will be appreciated that applet-specific configuration and user data 356 is needed, since the service may not be located on the user's own local client 165. Configuration and user data 356 further includes predetermined user preferences 610 such as font, window size, text size, etc.

Configuration data 356 further includes the set of services 615, which will be provided to the user. Services 615 include a list of registered users and each user's list of user-preferred available services 615. Services may also include a list of authentication levels needed to access the services 615. Configuration and user data 137 further includes service addresses 620 specifying the location of each of the services 615 accessible via the global server 115.

FIG. 7 is a block diagram illustrating details of the client 165, which includes a CPU 705, an input device 710, an output device 725, a communications interface 710, a data storage device 720 and RAM 730, each coupled to a signal bus 740.

An operating system 735 includes a program for controlling processing by the CPU 705, and is typically stored in the data storage device 720 and loaded into the RAM 730 (as illustrated) for execution. A service engine 175 includes a service program for managing workspace data 180 that includes version information (not shown). The service engine 175 maybe also stored in the data storage device 720 and loaded into the RAM 730 (as illustrated) for execution. The workspace data 180 may be stored in the data storage device 330. As stated above with reference to FIG. 1, the base system 170 operates to synchronize the workspace data 180 on the client 165 with the workspace data 163 on the global server 115. The base system 170 may be also stored in the data storage device 720 and loaded into the RAM 730 (as shown) for execution. The base system 170 is described in greater detail with reference to FIG. 8.

Figure 8:
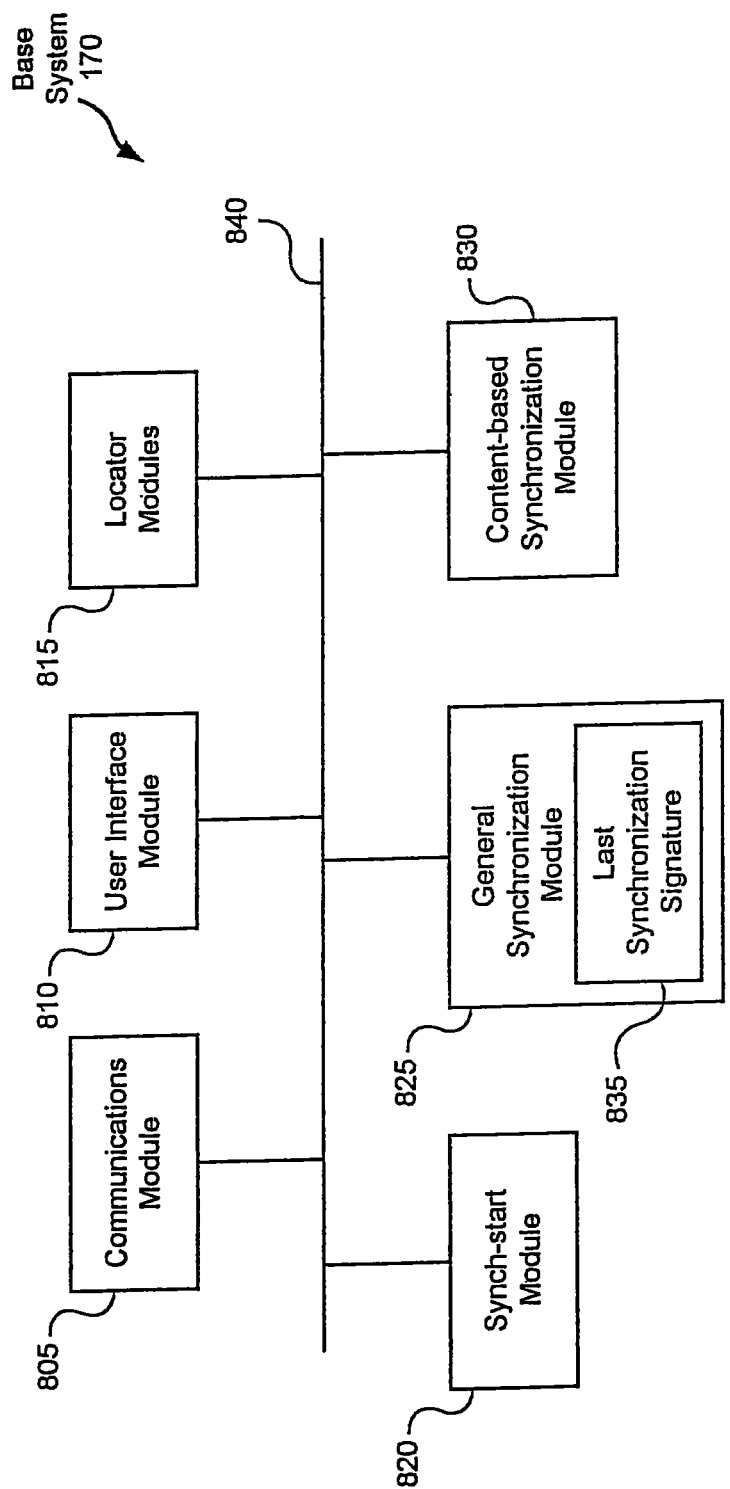
FIG. 8 is a block diagram illustrating the details of a FIG. 1 base system.

FIG. 8 is a block diagram illustrating details of the base system 170, which includes a communications module 805, a user interface module 810, locator modules 815, a synchronization-start ("synch-start") module 820, a general synchronization module 825 and a content-based synchronization module 830. For simplicity, each module is illustrated as communicating with one another via a signal bus 840. It will be appreciated that the base system 170 includes the same components as included in the synchronization agent 145.

The communications module 805 includes routines for compressing data, and routines for communicating via the communications interface 710 (FIG. 7) with the synchronization agent 145 (FIG. 1). The communications module 805 may include routines for applying Secure Socket Layer (SSL) technology and user identification and authentication techniques (i.e., digital certificates) to establish a secure communication channel through the LAN firewall 135 and through the global firewall 130. Because synchronization is initiated from within the LAN firewall 135 and uses commonly enabled protocols such as HyperText Transfer Protocol (HTTP), the typical firewall 135 which prevents in-bound communications in general and some outbound protocols does not act as an impediment to e-mail synchronization. Examples of communications modules 805 may include TCP/IP stacks or the AppleTalk™ protocol.

The user interface 810 includes routines for communicating with a user, and may include a conventional Graphical User Interface (GUI). The user interface 810 operates in coordination with the client 165 components as described herein.

The locator modules 815 include routines for identifying the memory locations of the workspace elements in the workspace data 180 and the memory locations of the workspace elements in the workspace data 163. Workspace element memory location identification may be implemented using intelligent software, i.e., preset memory addresses or the system's registry, or using dialogue boxes to query a user. It will be appreciated that the locator modules 815 may perform workspace element memory location identification upon system boot-up or after each communication with the global server 115 to maintain updated memory locations of workspace elements.

The synchronization-start module 820 includes routines for determining when to initiate synchronization of workspace data 163 and workspace data 180. For example, the synchronization-start module 820 may initiate data synchronization upon user request, at a particular time of day, after a predetermined time period passes, after a predetermined number of changes, after a user action such as user log-off or upon like criteria. The synchronization-start module 820 initiates data synchronization by instructing the general synchronization module 825 to begin execution of its routines. It will be appreciated that communications with synchronization agent 145 preferably initiate from within the LAN 125, because the typical LAN firewall 125 prevents in-bound communications and allows out-bound communications.

The general synchronization module 825 includes routines for requesting version information from the synchronization agent 145 (FIG. 1) and routines for comparing the version information against a last synchronization signature 835 such as a last synchronization date and time to determine which versions have been modified. The general synchronization module 825 further includes routines for comparing the local and remote versions to determine if only one or both versions of a particular workspace element have been modified and routines for performing an appropriate synchronizing responsive action. Appropriate synchronizing responsive actions may include forwarding the modified version (as the preferred version) of a workspace element in workspace data 180 or forwarding just a compilation of the changes to the other store(s). Other appropriate synchronizing responsive actions may include, if reconciliation between two modified versions is needed, then instructing the content-based synchronization module 830 to execute its routines (described below).

It will be appreciated that the synchronization agent 145 preferably examines the local version information 124 and forwards only the elements that have been modified since the last synchronization signature 835. This technique makes efficient use of processor power and avoids transferring unnecessary data across the communications channel 712. The general synchronization module 825 in the LAN 135 accordingly compares the data elements to determine if reconciliation is needed. Upon completion of the data synchronization, the general synchronization module 825 updates the last synchronization signature 835.

The content-based synchronization module 830 includes routines for reconciling two or more modified versions of workspace data 163, 180 in the same workspace element. For example, if the original and the copy of a user workspace element have both been modified independently since the last synchronization, the content-based synchronization module 830 determines the appropriate responsive action. The content-based synchronization module 830 may request a user to select the preferred one of the modified versions or, may respond based on preset preferences, i.e., by storing both versions in both stores or by integrating the changes into a single preferred version which replaces each modified version at both stores. When both versions are stored at both stores, each version may include a link to the other version so that the user may be advised to select the preferred version.

It will be appreciated that any client 165 that wants synchronization may have a base system 170. Alternatively, one base system 170 can manage multiple clients 165. It will be further appreciated that for a thin client 165 of limited computing power such as a smart telephone, all synchronization may be performed by the global server 115. Accordingly, components of the base system 170 such as the user interface module 810, the locator modules 815, the general synchronization module 825 and the content-based synchronization module 830 may be located on the global server 115. To initiate synchronization from the client 165, the client 165 includes the communications module 805 and the synch-start module 820.

Figure 9:
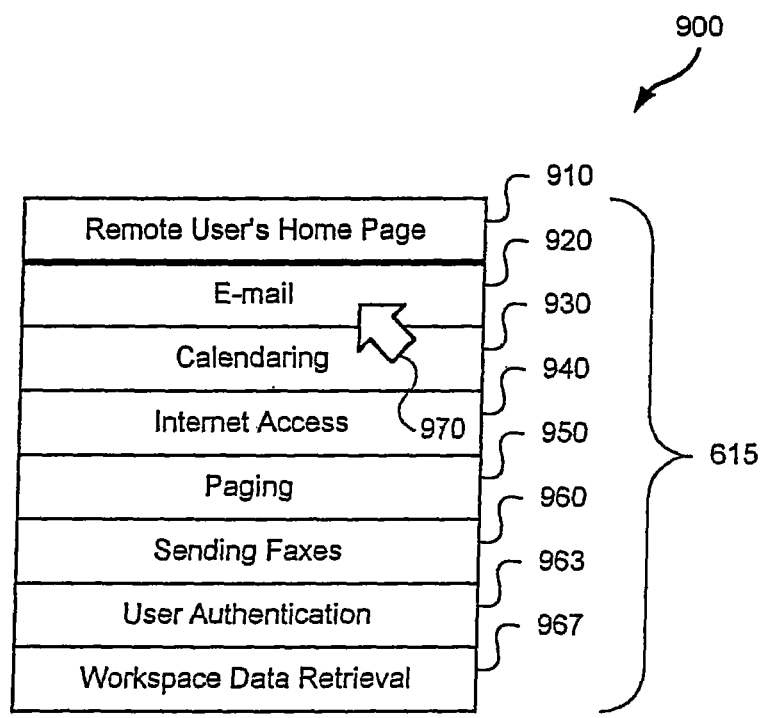
FIG. 9 illustrates an example services list.

FIG. 9 illustrates an example list 900 of accessible services provided by a URL addressable HyperText Markup Language (HTML)-based web page, as maintained by the web page engine 398 of the global server 115. The list 900 includes a title 910 "Remote User's Home Page," a listing of the provided services 615 and a pointer 970 for selecting one of the provided services 615. As illustrated, the provided services may include an e-mail service 920, a calendaring service 930, an internet access service 940, a paging service 950, a fax sending service 960, a user authentication service 963 and a workspace data retrieval service 967. Although not shown, other services 615 such as bookmarking, Quick-Card™, etc. may be included in the list 900. Although the web page provides the services 615 in a list 900, other data structures such as a pie chart or table may alternatively be used.

Figure 10:
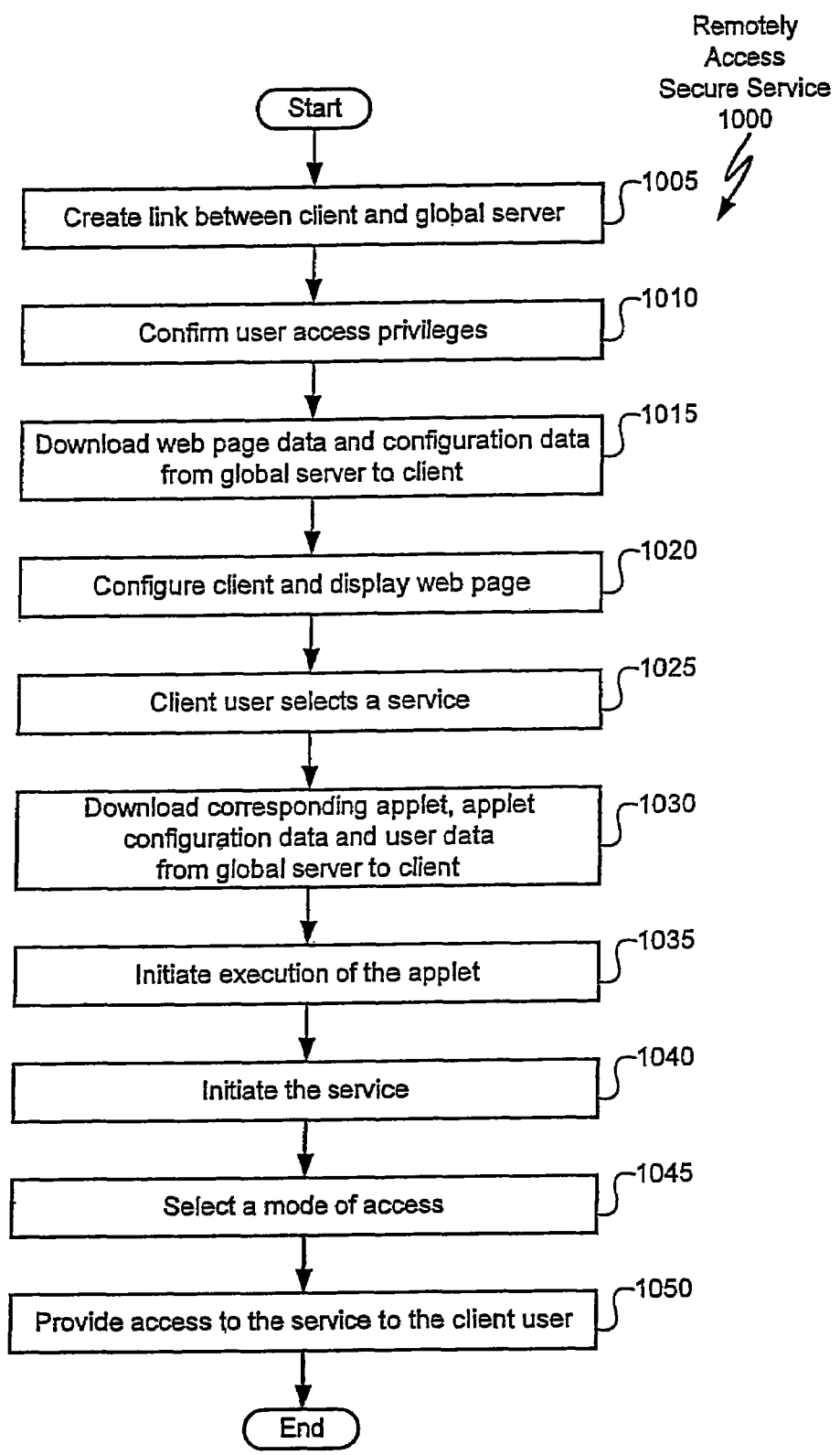
FIG. 10 is a flowchart illustrating a method for remotely accessing a secure server.

FIG. 10 is a flowchart illustrating a method 1000 for enabling a user to access the services 615 in the computer network system 100. Method 1000 begins by the remote terminal 105 in step 1005 creating a communications link with the global server 115. The global server 115 in step 1010 confirms that the user has privileges to access the functionality of the global server 115. Confirming user access privileges may include examining a user certificate, obtaining a secret password, using digital signature technology, performing a challenge/response technique, etc. It will be appreciated that the security engine 392 may cause the applet host engine 395 to forward via the communications channel 345 to the remote terminal 105 an authentication security applet 362 which when executed communicates with the global server 115 to authenticate the user.

After user access privileges are confirmed, the web page engine 398 of the global server 115 in step 1015 transmits web page data 368 and configuration and user data 356 to the remote terminal 105. The web engine 140 of the remote terminal 105 in step 1020 uses the web page data 368 and the configuration and user data 356 to display a web page service list 900 (FIG. 9) on the output device 230, and to enable access to the services 615 which the global server 115 offers. An example service list 900 is shown and described with reference to FIG. 9. Configuration of the remote terminal 105 and of the web page 700 is described in detail in the cross-referenced patent applications.

From the options listed on the web page 900, the user in step 1025 selects a service 615 via input device 220. In response, the request-servicing engine (described with reference to FIG. 3) provides the selected service 615. For example, the applet host engine 395 of the global server 115 in step 1030 may download to the remote terminal 105 a corresponding applet 359 and configuration and user data 356 for executing the requested service 615. Alternatively, the web page engine 398 may use, for example, HTTP and HTML to provide the selected service 615. As described above with reference to FIG. 6, the configuration and user data 356 may include user-specific preferences such as user-preferred fonts for configuring the selected service 615. Configuration and user data 356 may also include user-specific and service-specific information such as stored bookmarks, calendar data, pager numbers, etc. Alternatively, the corresponding applet 359 and the configuration and user data 356 could have been downloaded in step 1015. Providing access to the service by an applet 359 is described in greater detail below with reference to FIGS. 12-14.

The applet engine 290 of the remote terminal 105 in step 1035 initiates execution of the corresponding downloaded applet. The global server 115 in step 1040 initiates the selected service 615 and in step 1045 selects one of three modes described with reference to FIGS. 12-14 for accessing the service 615. For example, if the user selects a service 615 on a service server (e.g., the client 165) that is not protected by a separate firewall, then the global server 115 may provide the user with direct access. If the user selects a service 615 provided by a service server within the LAN 125, then the global server 115 may access the service 615 as a proxy for the user. It will be appreciated that each firewall 130 and 135 may store policies establishing the proper mode of access the global server 115 should select. Other factors for selecting mode of access may include user preference, availability and feasibility. The global server 115 in step 1050 uses the selected mode to provide the remote terminal 105 user with access to the selected service 615.

Figure 11:
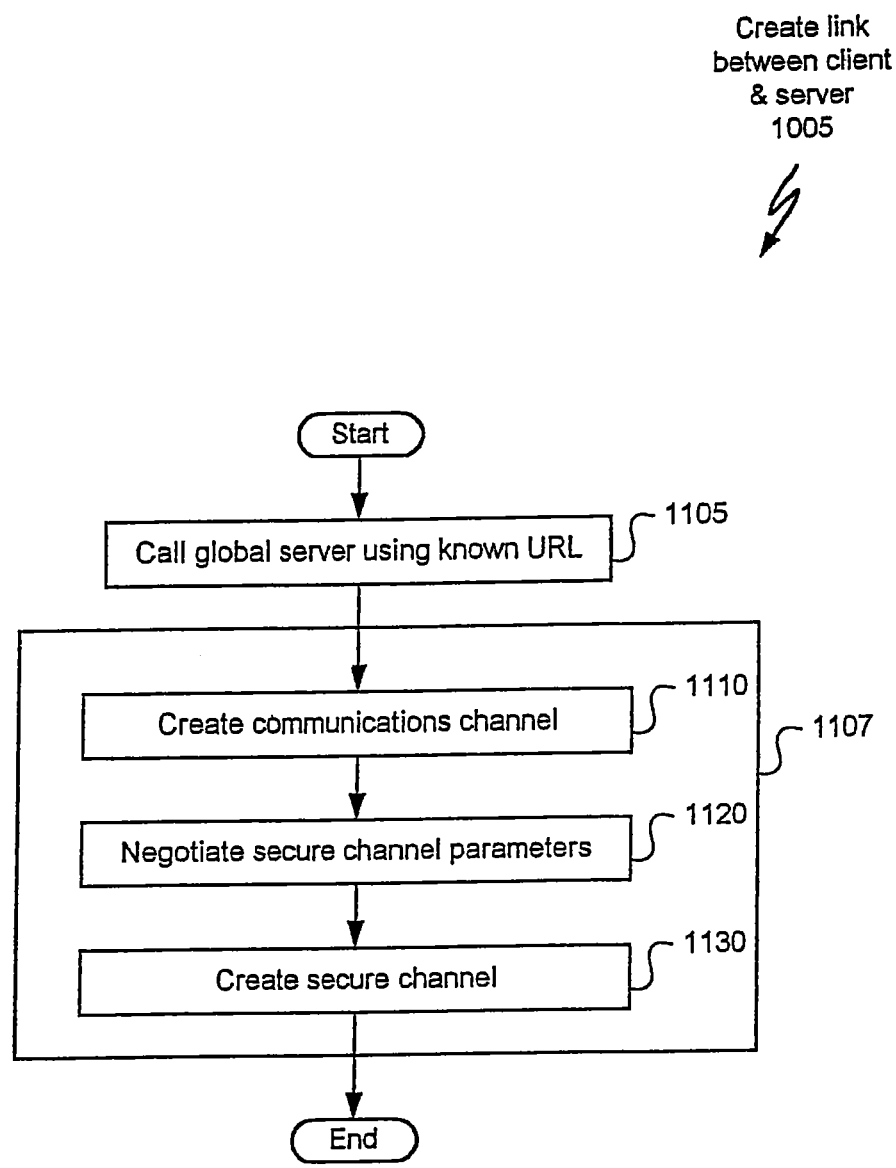
FIG. 11 is a flowchart illustrating details of the FIG. 10 step of creating a link between a client and global server.

FIG. 11 is a flowchart illustrating details of step 1005, which begins by the remote terminal 105 in step 1105 using a known Uniform Resource Locator (URL) to call the global server 115. The global server 115 and the remote terminal 105 in step 1107 create a secure communications channel therebetween, possibly by applying Secure Sockets Layer (SSL) technology. That is, the security engine 392 of the global server 115 in step 1110 determines if in-bound secure communications are permitted and, if so, creates a communications channel with the remote terminal 105. The web engine 140 of the remote terminal 105 and the security engine 392 of the global server 115 in step 1115 negotiate secure communications channel parameters, possibly using public key certificates. An example secure communications channel is RSA with RC4 encryption. Step 1115 thus may include selecting an encryption protocol which is known by both the global server 115 and the remote terminal 105. The encryption engine 283 of the remote terminal 105 and secure communications engine 392 of the global server 115 in step 1120 use the secure channel parameters to create the secure communications channel. Method 505 then ends.

Figure 12:
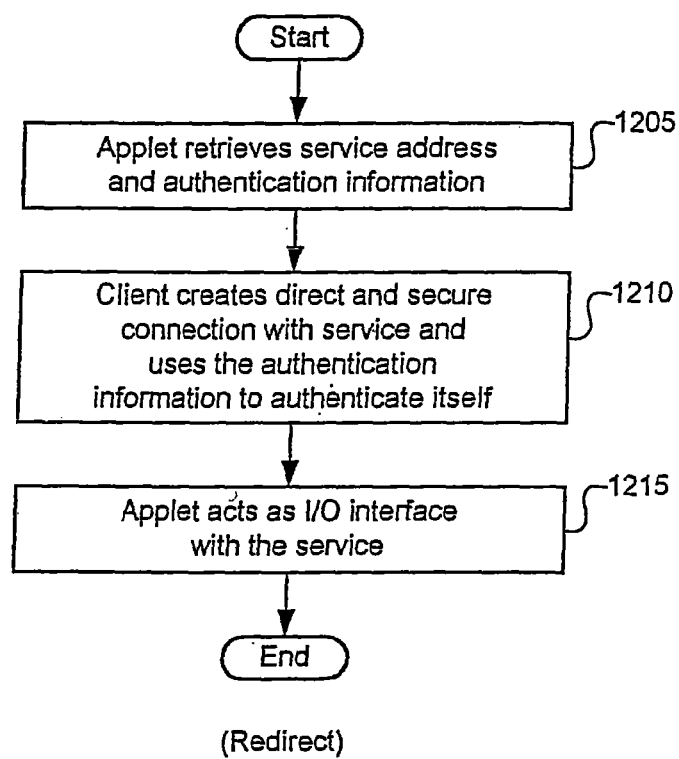
FIG. 12 is a flowchart illustrating details of the FIG. 10 step of providing access to a service in a first embodiment.

FIG. 12 is a flowchart illustrating details of step 1050 in a first embodiment, referred to as step 1050*a*, wherein the global server 115 provides the remote terminal 105 with a direct connection to a service 615. Step 1050*a* begins by the applet engine 290 in step 1205 running a configuration applet 359 for the selected service 615 that retrieves the service address 620 from data storage device 380 and the authentication information from the keysafe 365. The communications interface 340 in step 1210 creates a direct and secure connection with the communications interface 340 of the global server 115 at the retrieved service address 620, and uses the authentication information to authenticate itself. The applet in step 1215 acts as the I/O interface with the service 615. Step 1050*a* then ends.

Figure 13:
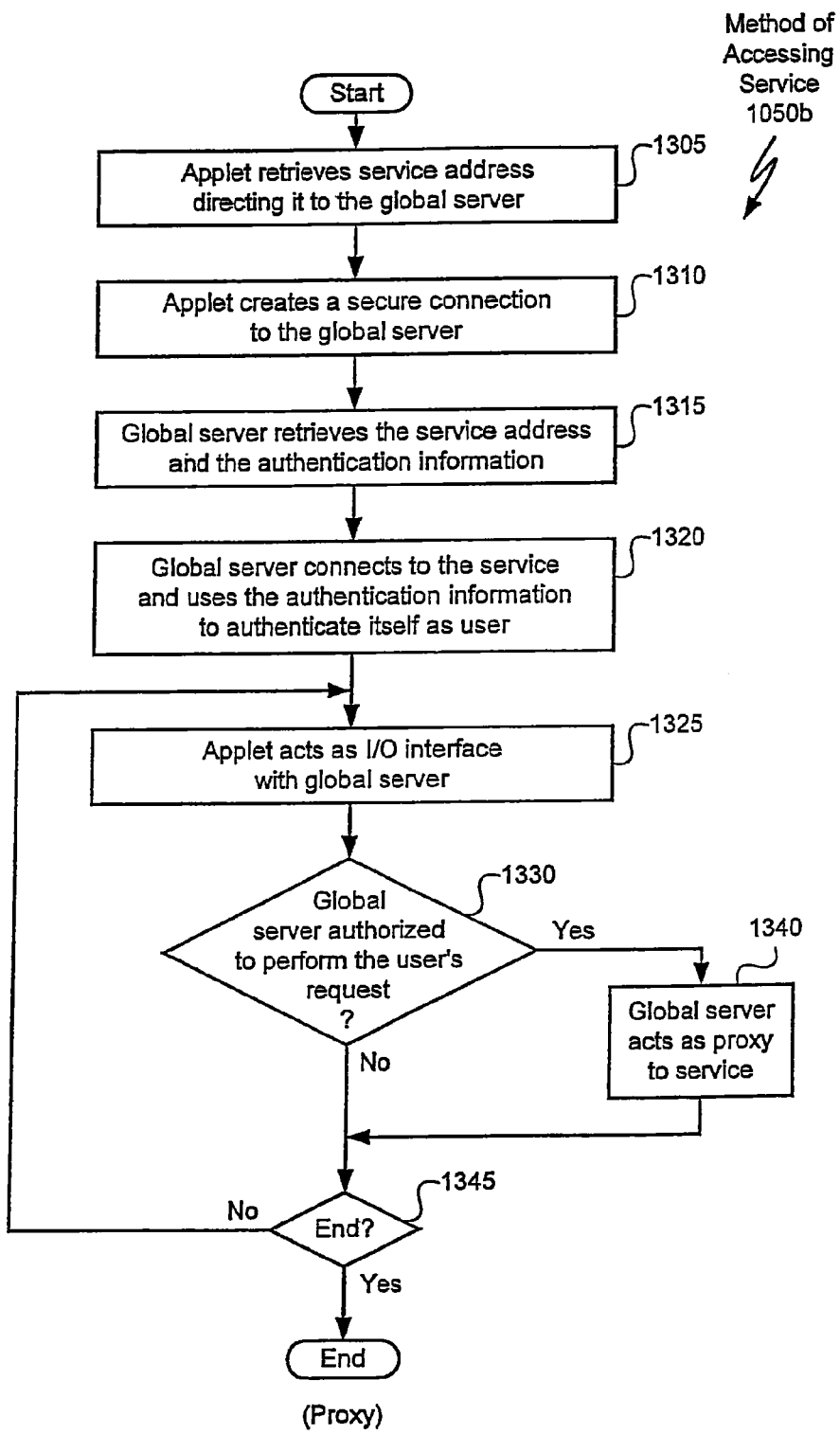
FIG. 13 is a flowchart illustrating details of the FIG. 10 step of providing access to a service in a second embodiment.

FIG. 13 is a flowchart illustrating details of step 1050 in a second embodiment, referred to as step 1050*b*, wherein the global server 115 acts for the remote terminal 105 as a proxy to the service 615. Step 1050*b* begins with a configuration applet 359 in step 1305 requesting the service address 620 for the selected service 615, which results in retrieving the service address 620 directing the applet 359 to the global server 115. The applet 359 in step 1310 creates a connection with communications interface 340 of the global server 115. The global server 115 in step 1315 retrieves the service address 620 of the selected service 615 and the authentication information for the selected service 615 from the keysafe 365. The communications interface 340 of the global server 115 in step 1320 negotiates secure channel parameters for creating a secure channel with the service server 1014. The communications interface 340 in step 1320 also authenticates itself as the user.

Thereafter, the applet 359 in step 1325 acts as the I/O interface with the communications interface 340 of the global server 115. If the global server 115 in step 1330 determines that it is unauthorized to perform a remote terminal 105 user's request, then the global server 115 in step 1345 determines whether the method 1050*b* ends, e.g., whether the user has quit. If so, then method 1050*b* ends. Otherwise, method 1050*b* returns to step 1325 to obtain another request. If the global server 115 in step 1330 determines that it is authorized to perform the remote terminal 105 user's request, then the global server 115 in step 1340 acts as the proxy for the remote terminal 105 to the service 615. As proxy, the global server 115 forwards the service request to the selected service 615 and forwards responses to the requesting applet 359 currently executing on the remote terminal 105. Method 1050*b* then jumps to step 1345.

Figure 14:
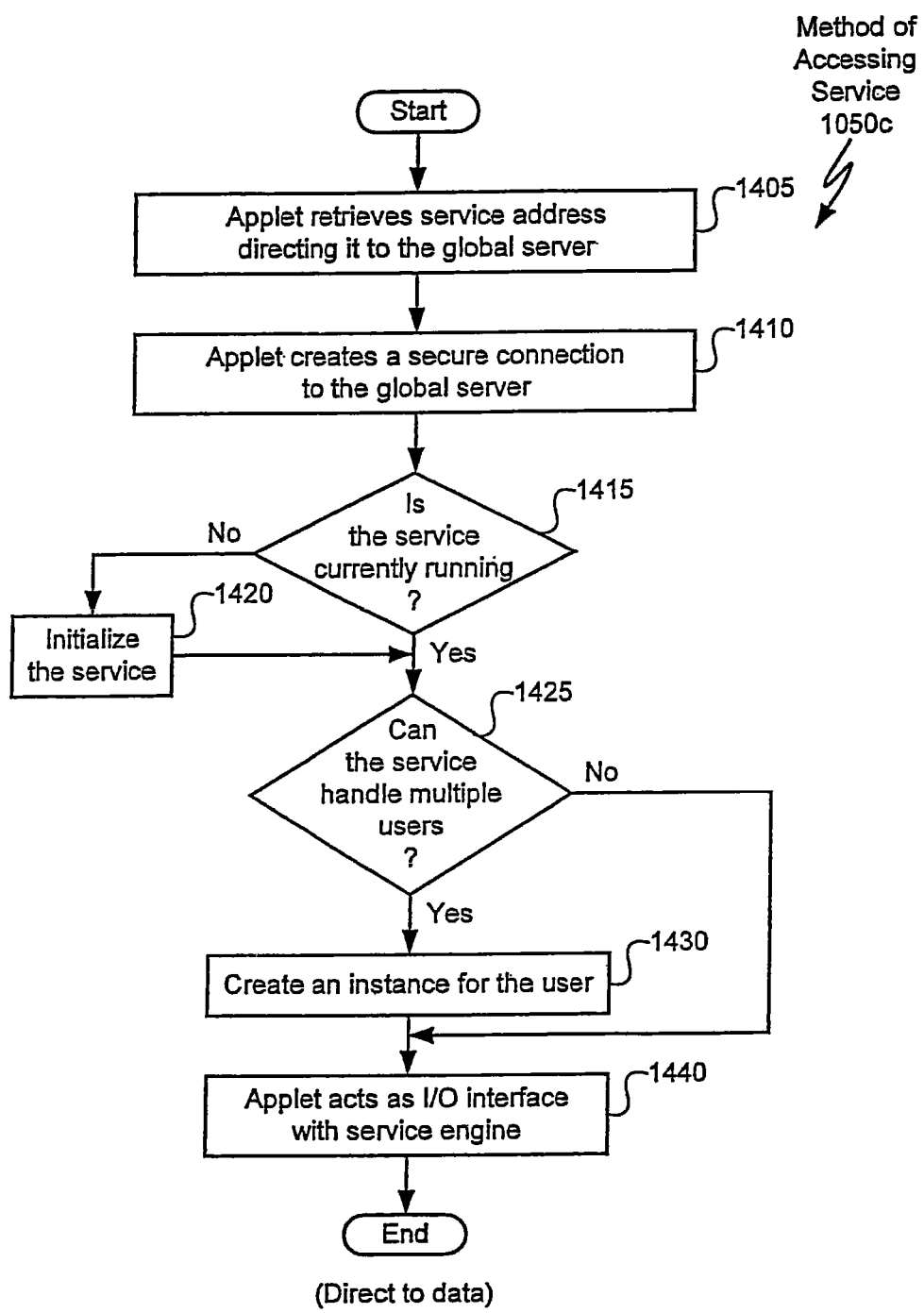
FIG. 14 is a flowchart illustrating details of the FIG. 10 step of providing access to a service in a third embodiment.

FIG. 14 is a flowchart illustrating details of step 1050 in a third embodiment, referred to as step 1050*c*, wherein the service 615 being requested is located on the global server 115. Step 1050 begins with an applet in step 1405 retrieving the service address 620 for the selected service 615, which results in providing the configuration applet 359 with the service address 620 of the service 615 on the global server 115. Thus, the applet in step 1410 creates a secure connection with the global server 115. No additional step of identification and authentication is needed since the remote terminal 105 has already identified and authenticated itself to the global server 115 as described with reference to step 1010 of FIG. 10.

In step 1415, a determination is made whether the service 615 is currently running. If so, then in step 1425 a determination is made whether the service 615 can handle multiple users. If so, then the global server 115 in step 1430 creates an instance for the user, and the applet in step 1440 acts as the I/O interface with the service 615 on the global server 115. Method 1050*c* then ends. Otherwise, if the service 615 in step 1425 determines that it cannot handle multiple users, then method 1050*c* proceeds to step 1440. Further, if in step 1415 the global server 115 determines that the service 615 is not currently running, then the global server 115 in step 1420 initializes the service 615 and proceeds to step 1425.

Figure 15:
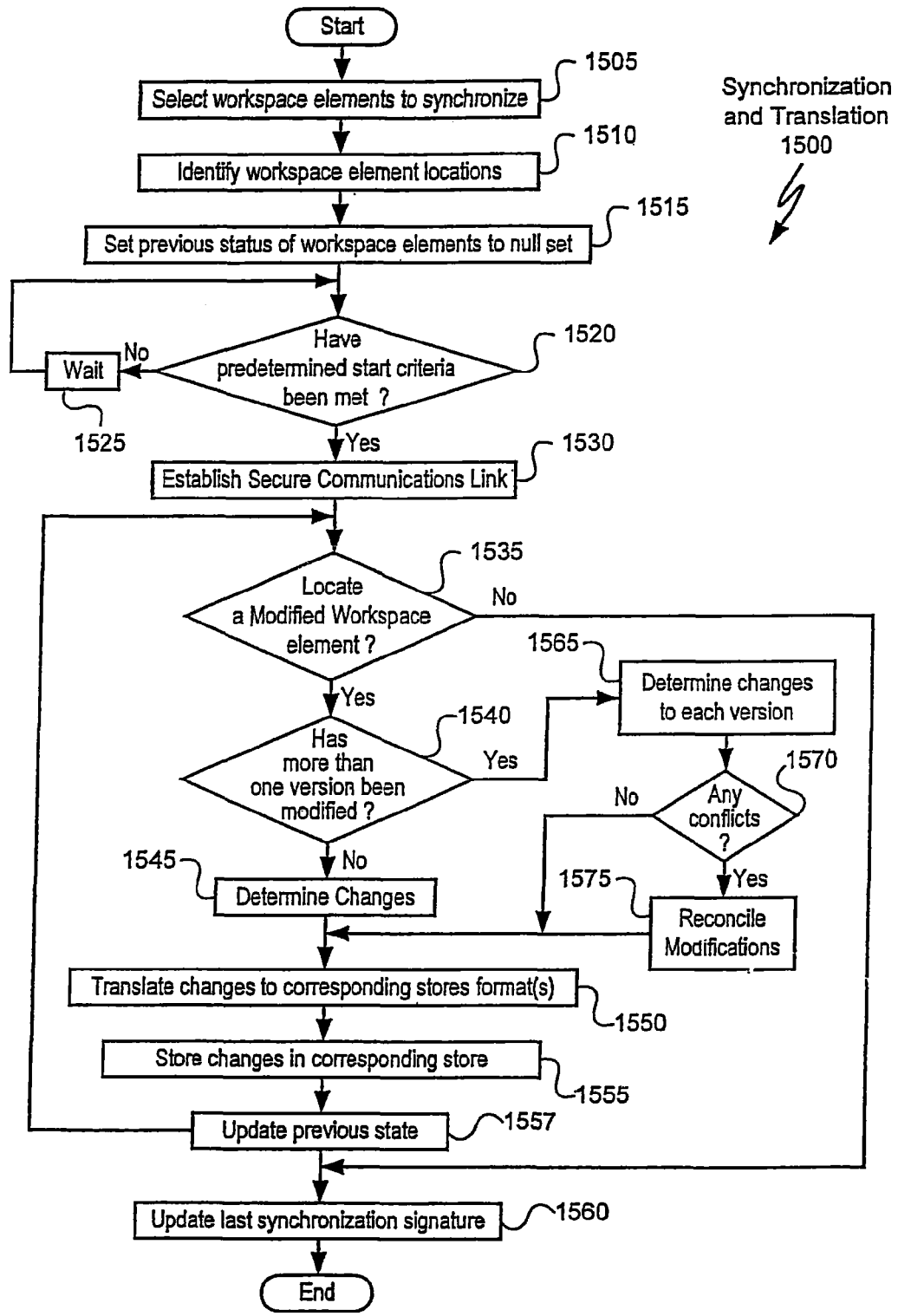
FIG. 15 is a flowchart illustrating a method for synchronizing multiple copies of a workspace element over a secure network.

FIG. 15 is a flowchart illustrating a method 1500 for using a global translator 150 to synchronize workspace data 163 and workspace data 180 in a secure network 100. Method 1500 begins with the user interface 900 in step 1505 enabling a user to select workspace elements of workspace data 163 and workspace data 180 for the synchronization means to synchronize. The locator modules 815 in step 1510 identify the memory locations of the workspace elements in workspace data 163 and workspace data 180. If a selected workspace element does not have a corresponding memory location, such as in the case of adding new workspace elements to the global server 115, then one is selected. The selected memory location may be a preexisting workspace element or a new workspace element. As stated above, workspace element memory location identification may be implemented using intelligent software or dialogue boxes. The general synchronization module 825 in step 1515 sets the previous status of the workspace elements equal to the null set, which indicates that all information of the workspace element has been added.

The synchronization-start module 820 in step 1520 determines whether predetermined criteria have been met which indicate that synchronization of the workspace elements selected in step 1505 should start. If not, then the synchronization-start module 820 in step 1525 waits and loops back to step 1520. Otherwise, the communications module 805 and the communications module 405 in step 1530 establish a secure communications channel therebetween.

The general synchronization module 825 in step 1535 determines whether any workspace elements have been modified. That is, the general synchronization module 825 in step 1535 examines the version information of each selected workspace element in the workspace data 180 against the last synchronization signature 435 to locate modified workspace elements. This comparison may include comparing the date of last modification with the date of last synchronization, or may include a comparison between the current status and the previous status as of the last interaction. Similarly, the general synchronization module 815 examines the version information of each corresponding workspace element in workspace data 163 and the last synchronization signature 435 to locate modified workspace elements.

If in step 1535 no modified workspace elements or folders are located, then the general synchronization module 825 in step 1560 updates the last synchronization signature 435 and method 1500 ends. Otherwise, the general synchronization module 825 in step 1540 determines whether more than one version of a workspace element has been modified since the last synchronization.

If only one version has been modified, then the corresponding general synchronization module 825 in step 1545 determines the changes made. As stated above, determining the changes made may be implemented by comparing the current status of the workspace element against the previous status of the workspace element as of the last interaction therebetween. If the changes were made only to the version in the workspace data 163, then the global translator 150 in step 1550 translates the changes to the format used by the other store, and the general synchronization module 410 in step 1555 forwards the translated changes to the general synchronization module 825 for updating the outdated workspace element in the workspace data 180. If the updated version is a workspace element in the workspace data 180, then the general synchronization module 825 sends the changes to the updated version to the global translator 150 for translation and then to the general synchronization module 410 for updating the outdated workspace element in the workspace data 163. The general synchronization module 825 and the general synchronization module 410 in step 1557 update the previous state of the workspace element to reflect the current state as of this interaction. Method 1500 then returns to step 1535.

If the general synchronization module 825 in step 1540 determines that multiple versions have been modified, then the general synchronization module 825 in step 1565 computes the changes to each version and in step 1570 instructs the content-based synchronization module 830 to examine content to determine if any conflicts exist. For example, the content-based synchronization module 830 may determine that a conflict exists if a user deletes a paragraph in one version and modified the same paragraph in another version. The content-based synchronization module 830 may determine that a conflict does not exist if a user deletes different paragraphs in each version. If no conflict is found, then method 1500 jumps to step 1550 for translating and forwarding the changes in each version to the other store. However, if a conflict is found, then the content-based synchronization module 830 in step 1575 reconciles the modified versions. As stated above, reconciliation may include requesting instructions from the user or based on previously selected preferences performing responsive actions such as storing both versions at both stores. It will be appreciated that a link between two versions may be placed in each of the two versions, so that the user will recognize to examine both versions to select the preferred version. Method 1500 then proceeds to step 1550.

It will be further appreciated that in step 1510 new workspace elements and preexisting workspace elements to which new workspace elements will be merged are set to "modified" and the previous status is set to the null set. Thus, the general synchronization module 825 in step 1540 will determine that more that one version has been modified and the content-based synchronization module 830 in step 1570 will determine that no conflict exists. The changes in each will be translated and forwarded to the other store. Accordingly, the two versions will be effectively merged and stored at each store.

For example, if a first bookmark folder was created by the web engine 140 on the client 165, a second folder was created by a web engine 140 on the remote terminal 105, no preexisting folder existed on the global server 115 and the user selected each of these folders for synchronization, then the synchronization means will effectively merge the first and second folders. That is, the general synchronization module 825 on the client 165 will determine that the first folder has been modified and the previous status is equal to the null set. The general synchronization module 825 will determine and send the changes, i.e., all the workspace elements in the first folder, to a new global folder on the global server 115. Similarly, the general synchronization module (not shown) on the remote terminal 105 will determine that, as of its last interaction, the previous status of each of the second and the global folders is the null set. The general synchronization module 825 will instruct the content-based synchronization module 830 to examine the changes made to each folder to determine whether a conflict exists. Since no conflicts will exist, the general synchronization module 825 will forward the changes to the global folder and the general synchronization module 410 will forward its changes to the second store, thereby merging the workspace elements of the first and second folders in the global and second folders. The general synchronization module 410 will inform the general synchronization module 825 that the global folder has been modified relative to the last interaction, and will forward the new changes to the first folder. Thus, the first and second folders will be merged and stored at each store.

The foregoing description of the preferred embodiments of the invention is by way of example only, and other variations of the above-described embodiments and methods are provided by the present invention. For example, a server can be any computer which is polled by a client. Thus, the remote terminal 105 may be referred to as a type of client. Although the system and method have been described with reference to applets, other downloadable executables such as Java™ applets, Java™ applications or ActiveX™ control developed by the Microsoft Corporation can alternatively be used. Components of this invention may be implemented using a programmed general-purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The invention is limited only by the following claims.

The invention claimed is:

1. A smartphone comprising:
a local data store configured to store a first workspace element;
a communications module configured to:
establish a direct Internet connection through a firewall and between the smartphone and a remote data store maintained on a server using a hypertext transfer protocol; and
secure the direct Internet connection; and
a synchronization module configured to:
communicate with a synchronization agent maintained on the server via the communication module;
process first modification information identifying one or more modifications of the first workspace element;
receive, from the synchronization agent, second modification information identifying one or more modifications of an independently-modifiable copy of the first workspace element stored in the remote data store;
generate a preferred version of the first workspace element based on the first modification information and the second modification information; and
store the preferred version of the first workspace element in the local data store.

2. The smartphone of claim 1, wherein the synchronization module is further configured to:
transmit, via the communication module, the first modification information to the synchronization agent,
wherein the synchronization agent is configured to update the independently-modifiable copy of the first workspace element based on the first modification information.

3. The smartphone of claim 2, further comprising a translator configured to translate the first workspace element from a first format to a second format that is different from the first format.

4. The smartphone of claim 1, wherein the synchronization module further comprises a synchronization-start module configured to initiate a synchronization.

5. The smartphone of claim 1, wherein the synchronization module is further configured to examine the first workspace element and the independently-modifiable copy of the first workspace element when the first workspace element and the independently-modifiable copy of the first workspace element have both been modified prior to a synchronization.

6. The smartphone of claim 5, wherein the synchronization module is further configured to:
determine changes made to the first workspace element and the independently-modifiable copy of the first workspace element; and
integrate the changes determined to have been made with respect to one of the workspace elements with the other workspace element.

7. The smartphone of claim 1, wherein the first workspace element includes calendar workspace data.

8. The smartphone of claim 1, wherein the first workspace element includes file workspace data.

9. A smartphone comprising:
a local data store configured to store a first workspace element;
a communications module configured to:
establish a direct Internet connection through a firewall and between the smartphone and a remote data store maintained on a server using a hypertext transfer protocol; and
secure the direct Internet connection; and
a synchronization module configured to:
communicate with a synchronization agent maintained on the server via the communication module;
process first modification information identifying one or more modifications of the first workspace element;
receive, from the synchronization agent, second modification information identifying one or more modifications of an independently-modifiable copy of the first workspace element stored in the remote data store;
select one of the first workspace element or the independently-modifiable copy of the first workspace element as a preferred version; and
store the preferred version in the local data store.

10. A non-transitory computer-readable storage medium storing computer-readable instructions thereon for execution on a smartphone comprising a local data store configured to store a first workspace element, a communications module configured to provide a direct Internet connection through a firewall and between the smartphone and a remote data store maintained on a server using a hypertext transfer protocol, and a synchronization module configured to communicate with a synchronization agent maintained on the server, the computer readable instructions, when executed on a processor on the smartphone, causing the smartphone to perform a method comprising:
communicating with the synchronization agent maintained on the server via the communication module;
processing first modification information identifying one or more modifications of the first workspace element;
receiving, from the synchronization agent, second modification information identifying one or more modifications of the independently-modifiable copy of the first workspace element stored in the remote data store;
generating a preferred version of the first workspace element based on the first modification information and the second modification information; and
storing the preferred version of the first workspace element in the local data store.

11. The non-transitory computer-readable storage medium of claim 10, wherein the computer-readable instructions, when executed on a processor on the smartphone, cause the smartphone to perform a method, further comprising: transmitting first modification information via the communication module to the synchronization agent for use in updating the independently-modifiable copy of the first workspace element.

12. The non-transitory computer-readable storage medium of claim 10, wherein the computer-readable instructions, when executed on a processor on the smartphone, cause the smartphone to perform a method, further comprising: translating the first workspace element from a first format to a second format that is different from the first format.

13. The non-transitory computer-readable storage medium of claim 10, wherein the computer-readable instructions, when executed on a processor on the smartphone, cause the smartphone to perform a method, further comprising: initiating a synchronization via a synchronization-start module.

14. The non-transitory computer-readable storage medium of claim 10, wherein the computer-readable instructions, when executed on a processor on the smartphone, cause the smartphone to perform a method, further comprising: examining the first workspace element and the independently-modifiable copy of the first workspace element when the first workspace element and the independently-modifiable copy of the first workspace element have both been modified prior to a synchronization.

15. The non-transitory computer-readable storage medium of claim 14, wherein the computer-readable instructions, when executed on a processor on the smartphone, cause the smartphone to perform a method, further comprising:
determining changes made to the first workspace element and the independently-modifiable copy of the first workspace element; and
integrating the changes determined to have been made with respect to one of the workspace elements with the other workspace element.

16. The non-transitory computer-readable storage medium of claim 10, wherein the first workspace element includes calendar workspace data.

17. The non-transitory computer-readable storage medium of claim 10, wherein the first workspace element includes file workspace data.

18. A non-transitory computer-readable storage medium storing computer-readable instructions thereon for execution on a smartphone comprising a local data store configured to store a first workspace element, a communications module configured to provide a direct Internet connection through a firewall and between the smartphone and a remote data store maintained on a server using a hypertext transfer protocol, and a synchronization module configured to communicate with a synchronization agent maintained on the server, the computer readable instructions, when executed on a processor on the smartphone, causing the smartphone to perform a method comprising:
communicating with the synchronization agent maintained on the server via the communication module,
processing first modification information identifying one or more modifications of the first workspace element;
receiving, from the synchronization agent, second modification information identifying one or more modifications of the independently-modifiable copy of the first workspace element stored in the remote data store;
selecting one of the first workspace element or the independently-modifiable copy of the first workspace element as a preferred version; and
storing the preferred version in the local data store.

19. A method of synchronizing workspace data and a remote data store maintained on a server that is located behind a firewall, the method comprising:

communicating with a synchronization agent maintained on the server via a direct Internet connection through the firewall using a hypertext transfer protocol;

processing first modification information identifying one or more modifications of a first workspace element stored in a local data store on the smartphone;

receiving, from the synchronization agent, second modification information identifying one or more modifications of an independently-modifiable copy of the first workspace element stored in the remote data store;

generating a preferred version of the first workspace element based on the first modification information and the second modification information; and storing the preferred version of the first workspace element in the local data store.

20. The method of claim 19, further comprising: transmitting the first modification information via the direct Internet connection to the synchronization agent for use in updating the independently-modifiable copy of the first workspace element.

21. The method of claim 19 further comprising: translating the first workspace element from a first format to a second format that is different from the first format.

22. The method of claim 19, further comprising: initiating a synchronization via a synchronization-start module on the smartphone.

23. The method of claim 19, further comprising: examining the first workspace element and the independently-modifiable copy of the first workspace element when the first workspace element and the independently-modifiable copy of the first workspace element have both been modified prior to a synchronization.

24. The method of claim 23, further comprising:
determining changes made to the first workspace element and the independently-modifiable copy of the first workspace element; and
integrating the changes determined to have been made with respect to one of the workspace elements with the other workspace element.

25. The method of claim 19, wherein the first workspace element includes calendar workspace data.

26. The method of claim 19, wherein the first workspace element includes file workspace data.

27. A method of synchronizing workspace data between a smartphone and a remote data store maintained on a server located behind a firewall, the method comprising:
communicating with a synchronization agent maintained on the server via a direct Internet connection through the firewall using a hypertext transfer protocol;
generating first modification information identifying one or more modifications of a first workspace element stored in a local data store on the smartphone;
transmitting the first modification information to the synchronization agent via the direct Internet through the firewall;
receiving, from the synchronization agent, second modification information identifying one or more modifications of an independently-modifiable copy of the first workspace element stored in the remote data store;
selecting one of the first workspace element or the independently-modifiable copy of the first workspace element as a preferred version; and
storing the preferred version in the local data store.

28. A smartphone comprising:
a local data store configured to store a first workspace element;
a communication controller configured to establish a direct Internet connection through a firewall and between the smartphone and a remote data store maintained on a server using a hypertext transfer protocol; and
a synchronizing controller configured to:
communicate with a synchronization agent maintained on the server via the communication controller;
process first modification information identifying one or more modifications of the first workspace element;
receive from the synchronization agent, second modification information identifying one or more modifications of an independently-modifiable copy of the first workspace element stored in the remote data store;
generate a preferred version of the first workspace element based on the first modification information and the second modification information; and
store the preferred version of the first workspace element in the local data store.

29. The smartphone of claim 28, wherein the synchronizing controller is further configured to transmit the first modification information via the communication controller to the synchronization agent.

30. The smartphone of claim 28 further comprising: a translator configured to translate the first workspace element from a first format to a second format that is different from the first format.

31. The smartphone of claim 28, wherein the synchronizing controller comprises a synchronization-start module configured to initiate a synchronization.

32. The smartphone of claim 28, wherein the synchronizing controller is further configured to examine the first workspace element and the independently-modifiable copy of the first workspace element when the first workspace element and the independently-modifiable copy of the first workspace element have both been modified prior to a synchronization.

33. The smartphone of claim 28, wherein the synchronizing controller is further configured to:
determine changes made to the first workspace element and the independently-modifiable copy of the first workspace element; and
integrate the changes determined to have been made with respect to one of the workspace elements with the other workspace element.

34. The smartphone of claim 28, wherein the first workspace element includes calendar workspace data.

35. The smartphone of claim 28, wherein the first workspace element includes file workspace data.

36. A smartphone comprising:
a local data store configured to store a first workspace element;
a communication controller configured to establish a direct Internet connection through a firewall and between the smartphone and a remote data store maintained on a server using a hypertext transfer protocol; and
a synchronizing controller configured to:
communicate with a synchronization agent maintained on the server via the communication controller;
process first modification information identifying one or more modifications of the first workspace element;
receive, from the synchronization agent second modification information identifying one or more modifications of an independently-modifiable copy of the first workspace element stored in the remote data store;
select one of the first workspace element or the independently-modifiable copy of the first workspace element as a preferred version based on the first modification information and the second modification information; and
store the preferred version in the local data store.

* * * * *

UNITED STATES PATENT AND TRADEMARK OFFICE
CERTIFICATE OF CORRECTION

| | | |
|---|---|---|
| PATENT NO. | : 8,745,167 B2 | Page 1 of 1 |
| APPLICATION NO. | : 12/480500 | |
| DATED | : June 3, 2014 | |
| INVENTOR(S) | : Daniel J. Mendez et al. | |

It is certified that error appears in the above-identified patent and that said Letters Patent is hereby corrected as shown below:

In The Specification

Column 2, line 6, "Navigatorm" should read --Navigator™--

Column 2, lines 6-7, "Explorerm" should read --Explorer™--

Column 5, line 57, "web engine 283" should read --web engine 140--

Column 7, line 9, "webengine 140" should read --web engine 140--

Column 7, line 32, "communication: channel" should read --communications channel--

Column 9, line 31, "input device 710" should read --input device 715--

Column 12, lines 61-62, "communications engine 392" should read --communications engine 382--

Column 14, line 41, "synchronization module 815" should read --synchronization module 825--

Column 15, line 36, "more that one" should read --more than one--

In The Claims

Claim 18, column 18, line 54, "communication module," should read --communication module;--

Claim 19, column 18, line 65, "synchronizing workspace data and" should read --synchronizing workspace data between a smartphone and--

Claim 28, column 20, line 10, "receive from" should read --receive, from--

Claim 36, column 20, line 62, "synchronization agent second" should read --synchronization agent, second--

Signed and Sealed this
Tenth Day of February, 2015

Michelle K. Lee
*Deputy Director of the United States Patent and Trademark Office*